US008660853B2

(12) United States Patent
Robb et al.

(10) Patent No.: US 8,660,853 B2
(45) Date of Patent: *Feb. 25, 2014

(54) APPLICATION INFRASTRUCTURE PLATFORM (AIP)

(75) Inventors: Terence A. Robb, Colorado Spring, CO (US); James Louis Standlee, Woodland Park, CO (US); Anne Elizabeth Bevis, Monument, CO (US); Amanda Jo Williams, Colorado Springs, CO (US); Michael Nash Haase, Woodland Park, CO (US); Barbara L. Hall, Palmer Lake, CO (US); Ralph Samuel Hoefelmeyer, Colorado Springs, CO (US); Theresa Eileen Phillips, Fairfax, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/357,297

(22) Filed: Jan. 24, 2012

(65) Prior Publication Data

US 2012/0124204 A1      May 17, 2012

Related U.S. Application Data

(63) Continuation of application No. 10/127,726, filed on Apr. 23, 2002, now Pat. No. 8,126,722.

(60) Provisional application No. 60/341,222, filed on Dec. 20, 2001.

(51) Int. Cl.
*G06Q 10/00* (2012.01)
*G06Q 30/00* (2012.01)

(52) U.S. Cl.
USPC ............................................ 705/1.1; 705/26.1

(58) Field of Classification Search
USPC .................................................. 705/1.1, 26.1
See application file for complete search history.

(56) References Cited

U.S. PATENT DOCUMENTS

| 6,816,905 | B1 | 11/2004 | Sheets et al. |
| 6,904,449 | B1 | 6/2005 | Quinones |
| 6,920,615 | B1 * | 7/2005 | Campbell et al. ............. 715/742 |
| 7,139,728 | B2 | 11/2006 | Rigole |
| 7,184,977 | B1 | 2/2007 | Crim et al. |
| 2002/0143906 | A1 * | 10/2002 | Tormasov et al. ............ 709/220 |
| 2004/0193694 | A1 | 9/2004 | Salo et al. |

OTHER PUBLICATIONS

Information on Excel Communication, 1996-2000, archived web pages of www.excel.com printed through www.archive.org.

* cited by examiner

*Primary Examiner* — Naresh Vig

(57) ABSTRACT

Disclosed is an application infrastructure platform (AIP) having an application service provider (ASP) environment including multiple ASP systems providing application services to customers, and a common services environment including hardware and software and management systems providing to the ASP systems applications and integrated application, back-office, and management services used by the ASP systems in delivering their application services to their customers. In another aspect, the AIP is associated with a development and test bed environment which conducts product and service development and testing.

20 Claims, 33 Drawing Sheets

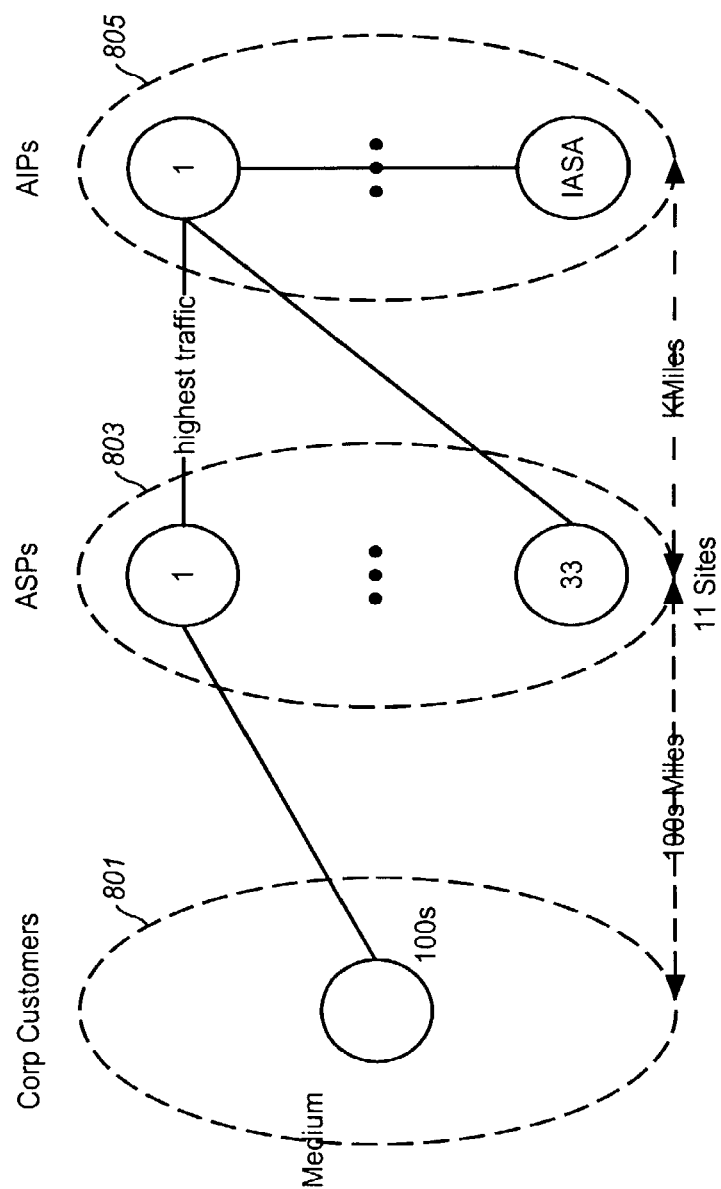

APPLICATION INFRASTRUCTURE PLATFORM (AIP)

RELATED APPLICATIONS

This application is a continuation of U.S. patent application Ser. No. 10/127,726 filed on Apr. 23, 2002 which is related to, and claims the benefit of the earlier filing date under 35 U.S.C. §119(e) of, U.S. Provisional Patent Application (Ser. No. 60/341,222), filed Dec. 20, 2001, entitled "APPLICATION INFRASTRUCTURE PLATFORM (AIP)", the contents of which are hereby incorporated by reference in their entireties.

FIELD OF THE INVENTION

The present invention relates to Information Technology (IT) systems and services, and more particularly to an Application Infrastructure Platform (AIP) providing comprehensive services including integrated Application Service Provider (ASP), Independent Service Vendor (ISV), and the like services, software and hardware.

ACRONYMS

The written description uses a large number of acronyms and technical terms to refer to various systems, services, and components. Although generally known, use of several of these acronyms or terms is not strictly standardized in the art. For purposes of this discussion, acronyms and terms therefore will be defined as follows:
AAA Authentication, Authorization, and Accounting
AIP Application Infrastructure Platform
API Application Programmers Interface
AS Application Servers
ASP Application Server Provider
ATM Asynchronous Transfer Mode
BR/FW Border Router/Firewall
BSS Business Support Services
B2B Business-to-Business
B2C Business-to-Consumer
CAD Computer Assisted Design
CCB Change Control Board
COTS Commercial Off The Shelf
CPE Customer Premise Equipment
CRM Customer Rules Management
CS Communication Server
Dev Env Development Environment
DNS Domain Name System
DMZ Demilitarized Zone
EAI Enterprise Application Integration
EJB Enterprise Java Beans
ERP Enterprise Resource Planning
GPS Global Positioning System
GW Gateway
HDML Handheld Device Markup Language
HR Human Resources
HSP Hosting Service Provider
HTML Hyper Text Markup Language
HTTP Hyper Text Transfer Protocol
IASA Integrated Application Support Architecture
IDC Internet Data Center
IDS Intrusion Detection System
IED Internet Enabled Devices
ISP Internet Service Provider
ISV Independent Service Vendor
IT Information Technology
JSP Java Server Pages
LAN Local Area Network
LDAP Lightweight Directory Access Protocol
MOM Message Oriented Middleware
MTA Message or Mail Transfer Agent
NAT Network Address Translation
NAS Network Attached Storage
NOC Network Operations Center
OSS Operational Support System
PBX Private Branch Exchange or Automatic Switch
POTS Plain Old Telephone Service
PDA Personal Digital Assistant
PKI Public Key Infrastructure
PSTN Public Switched Telephone Network
QoS Quality of Service
RA Regional Authority
RDBM Relational Database Management
RE Rules Engine
RFP Request for Proposal
RS Redirect Server
RTP Real Time Protocol
SAN Storage Area Network
SCE Service Creation Environment
SCM Service Creation Management
SI System Integration or System Integrator
SIP Session Initiation Protocol
SLA Service Level Agreement
SME Small to Medium Enterprise
SOC Security Operations Center
SS7 Signaling System 7
STT Speech to Text
SW Switch
TDM Time Division Multiplexing
TTS Text to Speech
UA Ubiquitous Access
UA/VB Ubiquitous Access Voice Browser
UM Unified Messaging
VB Voice Browser or Voice Browsing
VLAN Virtual LAN
VoIP Voice over Internet Protocol
VPN Virtual Private Network
WAP Wireless Application Protocol
WBIC Web Based Interaction Center
WFM Work Flow Management or Work Flow Manager
WFM/RE Work Flow Manager and Rules Engine
WML Wireless Markup Language
WS Web Server
XML eXtensible Markup Language
XPM X (=user, customer, service, device, security, etc.) Profile Management

BACKGROUND OF THE INVENTION

The evolution of the information technology (IT) industry has progressed from Internet Service Providers (ISPs), to Application Service Providers (ASPs), to Independent Service Vendors (ISVs), and related providers. Application Service Providers (ASPs) offer their customers a mix of custom services, off-the-shelf applications, and Independent Service Vendor (ISV) services. The end users of the ASP services are the employees or customers of the ASP corporate customers. Each ASP is a unique, one-off implementation, although the ASPs share architectures that are roughly identical. An ASP independently solves the same set of problems associated with running their business, such as service creation, provisioning, policy management, security, Customer Resource Management (CRM), directory service, access, and billing.

Concurrent with this evolution, global services companies are offering varied and comprehensive digital and e-business services; these services are similar to those of the ASP and ISV services. In many instances, such companies are also engaged in ongoing research and development activities, addressing problems on a repetitive basis and developing a portfolio of legacy technology.

The number of core features required by new applications has grown dramatically, thus requiring greater expertise in many new areas. Traditionally, common system development was predominantly confined to communication, alarming, billing, and support issues. These new areas, for example, include comprehensive security for even the smallest Internet application, the understanding and implementation of many more protocols for ubiquitous access, and a common profile management system across applications to implement a "Single-Sign-on" system.

Thus there is a need for a vehicle to enable more efficient use of available capabilities and expertise and, at the same time, effectively provide a wide variety of selectable capabilities and services of a dynamic and scalable nature.

SUMMARY OF THE INVENTION

These and other needs are addressed by the present invention in which an Application Infrastructure Platform (AIP) supplies applications and services (as well as content) to the ASPs. These applications and services are customized by the ASP for rent or resale to its customers. The AIP may aggregate its own applications and services with those of both external ASPs/ISVs and its own ASPs into an AIP's Product Catalog. The aggregate AIP Product Catalog may then be subscribed to by its ASPs. In an exemplary embodiment, the AIP delivers applications and services to the ASPs, which pass these services through to their end customers (or consumers). The AIP also provides common management services to one or more ASPs. The AIP advantageously relieves the ASPs and other service providers (SPs) of the need to be experts in building an infrastructure and allows the ASPs to focus their efforts on developing their market niche solutions.

In one aspect of an embodiment of the present invention, a method for providing services and content over a network is disclosed. The method includes presenting services including application level services common to a plurality of providers that offer the common services to a plurality of users corresponding to the plurality of providers, the services being accessible via the network. The method also includes integrating a service specific to one of the plurality of the providers, and selectively presenting the specific service associated with the one provider to another one of the plurality of providers.

In another aspect of an embodiment of the present invention, a communication system for providing services and content is disclosed. The system includes a platform that is configured to present a catalog of services including application level services common to a plurality of providers that offer the common services to a plurality of users corresponding to the plurality of providers, wherein one of the plurality of the providers provides a specific service. Also, the platform is configured to integrate the specific service and to selectively present the specific service associated with the one provider to another one of the plurality of providers.

In one aspect of an embodiment of the present invention, an approach provides an application infrastructure platform (AIP) having an ASP environment including multiple ASP systems which provide application services to customer entities for use in end user devices. In interactive conjunction with this ASP environment, there is a common services environment including hardware and software and management systems. The ASP systems are provided with applications and integrated application, back-office, and management services used by the ASP systems in delivering their application services to the customer entities for use in end user devices.

In another aspect of an embodiment of the present invention, an approach provides an application infrastructure platform (AIP) having an ASP environment with multiple ASPs providing application services to customer entities, and a common services environment providing applications and integrated application, back-office, and management services to the ASPs. The ASPs are connected by a service bus to the common services environment and are connected by a ubiquitous access system to a data network system and to the customer entities. The common services environment includes a profile management system, an enrollment and subscription system, a billing system, workflow management and rules engine systems, and a customer rules management (CRM) system.

In another aspect of an embodiment of the present invention, an approach provides an application infrastructure platform (AIP) that serves to aggregate services provided by the AIP and ASPs allowing the services to be offered as customized packages to other ASPs and their customers. The AIP leverages the service aggregation and then acts as a service broker by facilitating the delivery of the service from the source to a third party ASP and their customers.

In another aspect, the present invention provides an application infrastructure platform (AIP) that is capable of delivering any service through any device and/or media conditioning needed to provide that service to the end customer.

In yet another aspect of an embodiment of the present invention, an approach is disclosed that relates to an application infrastructure platform (AIP) associated with an interactive development and test bed environment for conducting product and service development. The AIP includes an ASP environment that has multiple ASPs providing application services to customer entities, and a common services environment that includes hardware and software and provides applications and integrated application, back-office, and management services to the ASPs. In this combination the hardware and software that is provided to the ASPs includes hardware and software from the development and test bed environment that has been incorporated into the common services environment, and is available for use by both the ASPs and development environment.

Still other aspects, features, and advantages of the present invention are readily apparent from the following detailed description, illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 9A and 9B are diagrams showing the scalability of AIP deployment, according to an embodiment of the present invention.

DESCRIPTION OF THE PREFERRED EMBODIMENT

A system, method, and apparatus for providing an Application Integration Platform (AIP) are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
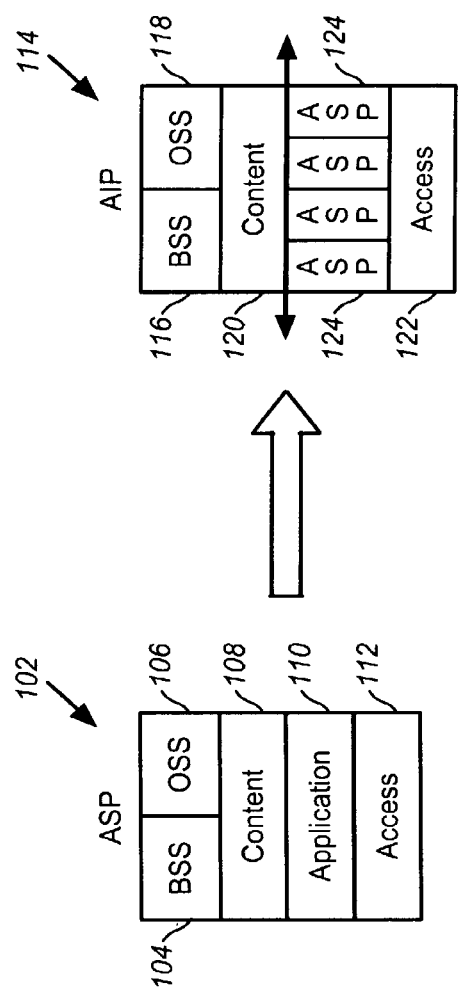
FIG. 1 shows a simplified block diagram depicting the progression from self contained ASPs to an integrated AIP architecture, in accordance with an embodiment of the present invention.

FIG. 1 shows an exemplary environment in which multiple discrete ASPs are integrated into an AIP environment. Application Service Providers (ASP) 102 have arisen as service vendors that provide web hosting services, including co-location services and hosting to customers. The ASPs 102 are attractive because they offer specialized value-added services to the employees of corporations through the corporate portal which they, together with the corporation (who is their customer), implement. Further, the ASPs 102 frequently use Internet Service Vendors (ISV) to augment their own offerings presented as blended services through a unified corporate portal. Internet Service Vendors (ISVs) offer unique collections of services over the Internet, such as business automation tools on a leased or per use basis. Unlike ASPs 102, ISVs generally are not an Internet hosting service.

An ASP 102 may customize and lease its own (or AIP-subscribed-to) applications and services to one or more of its customers. The ASP's customers are typically corporate entities, but may also include individual consumers. These corporate entities include mostly Small and Medium Enterprises (SME). In addition, the ASP 102 leases corporate portals to corporate customers. The corporate portal is customized by the ASP 102 to appear as the customer's corporate portal. The corporate customer rents their applications and services from the ASP 102 for consumption by their employees. The ASP 102 also may rent eCommerce applications to corporate customers to establish their own eCommerce site. Further, the ASP 102 may be its own eCommerce site to either Business-to-Business (B2B) or Business-to-Consumer (B2C) users.

The services offered through a corporate portal have also grown more robust. Instead of purchasing licenses (seats) for employees to use various software packages that are installed on their personal computers, many corporations find it less burdensome to lease software on a per use basis. Commonly used products such as MS EXCEL and WORD as well as a host of other products are now available for lease as thin or thick clients (as appropriate for the application) through corporate portals.

The ASP 102, to the extent of its financial and operational abilities, independently provides its own Business Support Services (BSS) 104, Operational Support System (OSS) 106, Content 108, Applications 110, and Access 112. By way of example, the BSS 104 provides various business functions, such as billing, accounting, and provisioning. The OSS 106, for example, supplies network management functionalities as well as a trouble ticketing system. The Access 112 includes communication interfaces and systems to provide ubiquitous access, which is desired by most ASPs.

By and large, independent ASPs 102 are unable to afford development and maintenance of these systems 104, 106, 108, 112. When such an ASP 102 is operated in the environment of an Application Infrastructure Platform (AIP) 114, the AIP 114 provides BSS 116, OSS 118, Content 120, and Access 122 from a well-stocked common source in systems existing in the AIP 114. The individual ASPs 102 operate with the use of these Common Services in addition to their individual customized services. Further, in an exemplary embodiment, the individual ASPs 102 may make available some of their custom services to other ASPs 102 operating within the AIP 114. Through this unique combinational arrangement, the capabilities of each ASP 102 are significantly extended.

The AIP 114, according to one embodiment of the present invention, is conceptually a provider of comprehensive services for ASPs 102—i.e., an "ASP" for ASPs. In this manner, efficiencies can be attained with respect to development cost and access to expertise. The AIP 114 provides a complete beginning-to-end capability to host ASPs 102. The AIP 114 assumes the role of ISP in that it provides an ASP 102 with access to the Internet. Also, the AIP 114 has the role of hosting web sites in that it offers web-hosting centers to house hosted and co-located servers for ASPs 102 in which it provides rack space, power, security, and network connectivity. In the role of an ASP 102, the AIP 114 provides a collection of applications and services to the hosted ASPs 102; the ASPs 102 in turn may repackage and resell to their customers as corporate portals. These packages include e-Business, e-Tailing, human relations, office automation, and others that are more cost-effectively rented than purchased by the ASP customer.

Additionally, the AIP 114 supports a development environment that is accessible from, a public data network, such as the Internet, to support development by a system integrator (SI), ASPs 102, and ISVs. The AIP 114 provides a Test Bed to integrate the solutions into a test AIP environment and for staging solutions and updates for deployment to AIPs 114 over the Internet.

The AIP 114 combines (i.e., integrates) applications, services, content to ASPs 124. By way of example, these AIP capabilities may include Profile Management, Billing, Provisioning, Customer Care, Communications, Presentation (Web), and Application Deployment. The users of the AIP may include (1) the Proprietor's personnel (e.g., engineers), and (2), the Proprietor's customers, who buy and use it to reduce their infrastructure costs by having standard access to the AIP unique suite of capabilities. These applications and services are customized by the ASP 124 for rent or resale to customers of the ASP 124.

The AIP 114 may also aggregate its own applications and services with those of both external ASPs/Internet Service Vendors (ISVs) and its own ASPs into a "Product Catalog." The aggregate AIP Product Catalog may then be subscribed to by its ASPs 124. In other words, the AIP 114 delivers applications and services to the ASPs 124, which pass these services through to their end customers (or consumers). Furthermore, the AIP 114 provides common management services to one or more ASPs 124, thereby sharing the management costs among multiple ASPs.

The AIP 114 may employ a best of breed (i.e., select-the-best) approach to implement applications and services, which may be off-the-shelf, to populate an infrastructure. The AIP 114 integrates applications and services together by binding them in a loosely coupled arrangement through the use of multiple technologies including, for example, message busses, Enterprise Java Beans (EJB), Workflow Managers (WFMs), and Rules Engines (REs). Message busses allow messages to be sent once and be received by many recipients; this has the added benefit that network traffic is reduced because messages are transmitted only once on a subnet. Enterprise Java Beans are encapsulated Java components that provide common capabilities such as transaction management, security, and resource pooling placed on servers other than a web server. This approach, thus, minimizes from the loading on the web server by load balancing across other servers. Workflow Managers support the automation of complex multi-step tasks, which may be tedious manual processes. Rule Engines provide mechanisms for determining when an activity should be initiated based on monitored events. Rules Engines and Workflow Management engines work cooperatively to determine the appropriate course of action in response to an event.

Users of the unique AIP platform may be categorized into two communities: global digital service providers—one of which may be the AIP Proprietor; and independent ASPs and XSPs, who use the AIP platform and service. The Proprietor may utilize the AIP 114 not only to serve the ASP customers, but also internally to support its own ASP and ISV services, and own development and test activities. The AIP 114 may also provide the ASPs with a way to reduce their infrastructure costs as well as a mechanism to obtain standard access to the Proprietor's unique broad range of capabilities. In addition, the ASPs 124 may use the AIP 114 for development purposes in much the same manner as the Proprietor.

Thus, the AIP 114 supplies both the Proprietor and ASPs with common services to avoid redundancy in new projects (i.e., products and services), and may also use the AIP 114 to make new services available. Because the AIP 114 provides both the software and hardware infrastructure, there are economies of scale that arise from the use of shared resources that allow the AIP 114 to deliver service at a reduced cost. The AIP 114 also provides services at a reduced service delivery cost by billing the ASP on a pay-as-you-go basis, rather than having the ASP purchase software and hardware up front.

The Proprietor, through the AIP 114, may act as an "Application Infrastructure Provider" by offering a tested and integrated environment with an infrastructure that supports the technical and business processes that underlie ASP services. The AIP 114 provides the core for "gluing" services together, and offering common services and applications that can be used in conjunction with each other and ASP-specific capabilities. The AIP 114 also provides the Proprietor the opportunity to leverage the platform to support other Proprietor projects.

As evident from the above discussion, the AIP 114 creates a unique extension of an evolutionary trend in the business use of the Internet, by combining application services in form of a product catalog. Initially, access to the Internet was provided through Internet Service Providers (ISP). The ISPs provide dial-up access, email, and general access to the Internet. These ISPs also provide web hosting services so that custom web sites could be developed and accessed. As a result, corporations have employed ISPs to provide Internet access and have developed their own internal web sites, some of which were "Internet facing" and others "employee facing." Through the Internet facing sites the corporations offer corporate information, goods, and services. Through the employee facing sites, they provide employees with a variety of self-service packages, access to human resources data, benefits data, and information on stock purchase and sales. These employee-facing sites were often not accessible from the public Internet, which limited employee access to personnel using computers in the corporate Internet.

Other corporations, without the IT assets or technical skill to implement their own internal sites, outsourced the operation of their internal web sites. These corporate web sites (or corporate portals) provide the employees with a wide variety of services including those that are provided by third party Internet Service Vendors (ISV).

The AIP architecture provides a number of advantages, such as scalability, cohesion and coupling. Under this arrangement, the ASP functionality, which is highly cohesive, is tightly coupled to common services, which is also highly cohesive. These highly cohesive areas may be successfully loosely coupled via a backbone.

Figure 2:
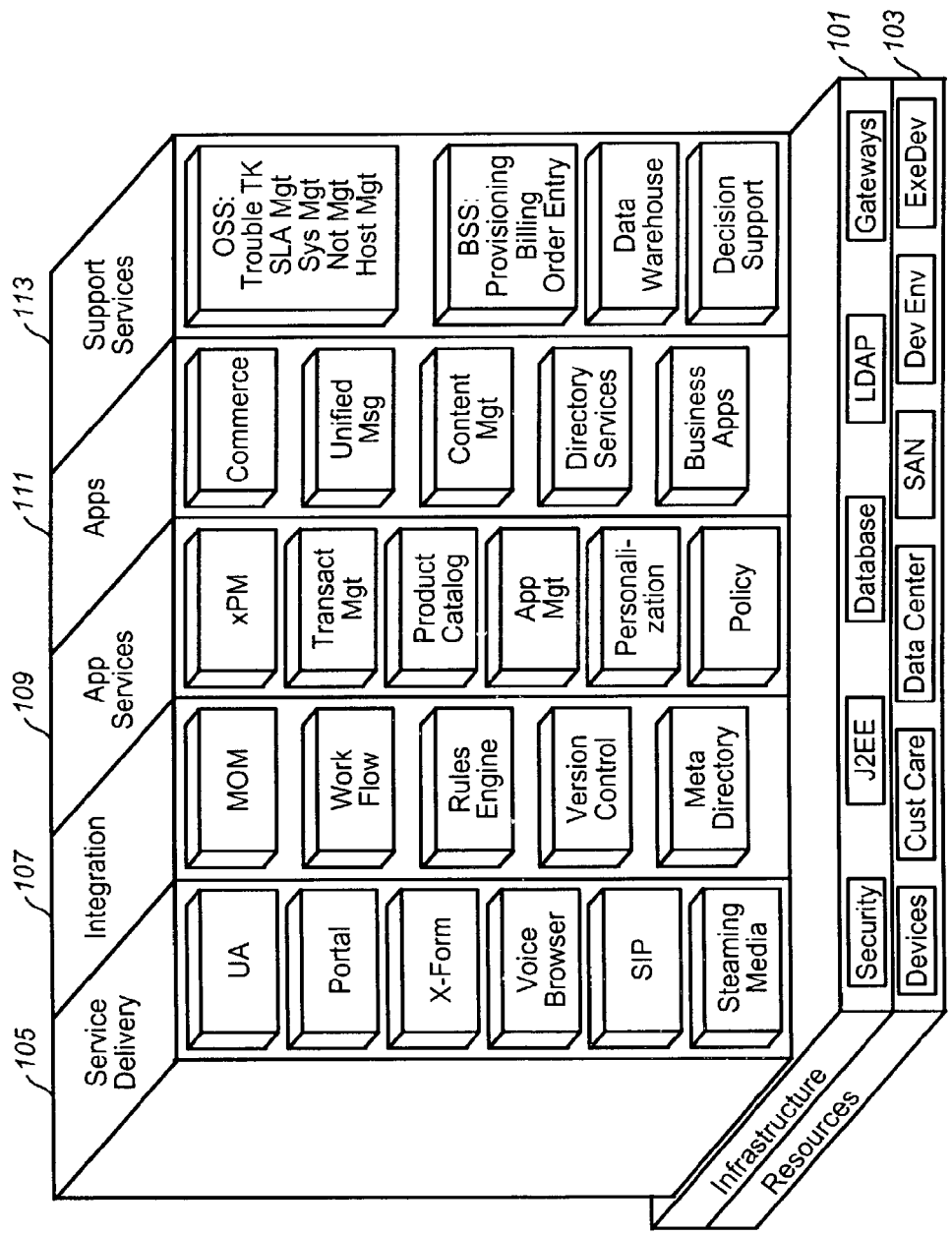
FIG. 2 is a conceptual embodiment of an Application Infrastructure Platform (AIP) Service framework, according to an embodiment of the present invention.

FIG. 2 provides a simplified conceptual depiction of the AIP Service Framework. As shown, the services available in the AIP are collected into seven logical containers 101-113. Two of these containers, Infrastructure and Resources, possess features and services that support and facilitate the operation of all AIP containers. The remaining five containers are described in order from the web-facing Service Delivery container 105 on the left, to increasingly private services on the right.

End users access the AIP through the Service Delivery container 105, which provides the functionality to transform services and content for the end user. The Integration container 107 provides the "glue" (i.e., middleware and interfaces) among the AIP Applications 111, Application Services 109, Support Services 113, and Service Delivery 105 (i.e., service bus), through the use of Message Oriented Middleware (MOM), Web Services and related technologies. The service bus 105 provides both point-to-point delivery of messages and publishes and subscribes delivery in either reliable or unreliable modes, for example.

The Application Services container 109 includes services that are shared by most of the AIP applications; such services are AIP supportive and designed for high reuse. The Application container 111 includes end-user applications that are aggregates of common AIP and unique ASP services. The Support Services container 113 includes business and operational services. The functions of these five service containers 105, 107, 109, 111, and 113 are more fully below.

To deliver services and data to end user devices, the Service Delivery container 105 performs transformation, presentation, and delivery functionalities. Specifically, the Service Delivery container 105 supports Ubiquitous Access (UA) technologies, which enable access from a multitude of networked devices: Personal Digital Assistants (PDAs), Web browsers, network appliances, Session Initiation Protocol (SIP) phones, and plain old telephone service (POTS) phones. For example, Ubiquitous Access provides the ability to access web pages using a variety of Internet enabled devices (IED); Ubiquitous Access maps web page content onto the small IED displays in such a way as to provide a content reduced, yet useful interaction.

Further, Ubiquitous Access enables wireless applications from general web site content for eCommerce activities as well as general surfing. Mobile wireless devices (e.g., smart phones and PDA combinations) may be used to make localized purchases via, for example, BLUETOOTH technology, ranging from event tickets to exit booth-shopping charges. These devices may employ data interfaces that are supported by IEEE 802.11b wireless LAN. Wireless LANs may be readily implemented in private as well as public venues (e.g., home offices, airports, shopping malls, etc.).

Portals, as part of the Service delivery container 105, provide customized content to the end user; the content can contain personal, local, group, or corporate information. That is, portals can have a specific focus, such as personal portals, business-to-business (B2B) portals, business-to-employee (B2E) portals, and wireless portals. Portals filter, aggregate, and present the data to the end user.

Further, the Service Delivery container 105 also includes X-form, voice browser, SIP, and streaming content. Traditionally, communicating programs have required that there be a relatively detailed and perhaps bit-level understanding by developers of the structure of the messages that are exchanged by the programs. As technology, and in particular, technologies supporting web-based computing, has evolved, better approaches to understanding the message structure have been developed. For example, Extended Meta-Language is a tagged field specification that allows messages to be self-defining. Thus, as long as the programmers understand what the content of the message will be, then programs can be written to recognize the XML encoding and to locate the data expected. VXML extends this capability to include the encoding of voice so that a web page, for instance, can include references to applets, servlets, and EJBs that return voice content that is played to the user from the displayed web page. XML and VXML provide capabilities fundamental to the generalization of web access through ubiquitous access.

A voice browser provides a voice path using automatic and natural language speech recognition to create an interface to web and some voice compatible applications. Sample applications range from Interactive Voice Response (IVR) used to access personalized services (e.g., bank accounts) and intelligent directory searches (e.g., closest locations), to natural speech used to query a site for Commerce search, selection, and transactions. The coupling of UA and the voice browser (i.e., HTML filtering/conversion to VXML) enables the access of web sites. SIP is an enabler of Voice Portals, which are specialized applications that are aggregated into a portal of voice accessible services and applications. Voice portals may be accessed through PSTN circuits as well as VoIP communications systems.

In an exemplary embodiment, the Integration container 107 is supported by Enterprise Application Integration (EAI) technologies, which address integration of applications using messaging technology, including a message bus, a Workflow Manager (WFM), and a Rules Engine (RE). The messaging supports point-to-point and publish and subscribe type messaging with varying quality of service (QoS) or bandwidth levels. According to one feature of the present invention, the sequential rules of a process, or Workflow Management (WFM), are defined and stored centrally in the Rules Engine instead of embedded in code throughout the system. Work Flow Management automates the sequence of actions necessary to complete a unit of work. A specific work flow is often initiated when a rule is fired in a rules engine. The Rules Engine evaluates events using a rule base and, when the criteria for a rule is met, fires the rule; rule firing can result in the initiation of a specific work flow. Integration also includes version control of services within the execution environment and joining multiple directory servers by using a Meta directory.

The Application Services container 109 provides common services for the end-user applications, such as Profile Management (xPM), Transaction Management, product cataloging, Application Management, Personalization, and Policy management. A product catalog includes the services offered by an ASP; thus, when the sum of ASP products are aggregated, the result is an aggregate product catalog. Profile Management supports the creating, editing, and deleting of customer profile information (e.g., customer, group, enterprise, and device information). Distributed transaction management allows applications to perform reliable transactions on AIP data stores. The personalization engine provides customized dynamic content based on predefined inference rules and customer usage habits.

The Applications container 111 utilizes the Application Services 109 to deliver applications to the end-users. This Applications container 111 supports eCommerce relationships, such as business-to-business (B2B) and business-to-consumer (B2C). These relationships are supported with product catalogs for the presentation and management of products, shopping carts, order management, and order processing. Unified Messaging is also a part of the Applications container 111 and provides one common format for the transmission and storage of messages such as email, voice mail, fax, and video. The Applications container 111 also includes Content Management for acquiring and aggregating of static and dynamic content, such as news, weather, stock quotes, and syndicated feeds. Directory services are also supported by the Applications container 111; for example, corporate directories may be employed to allow the lookup of employee information based on various search criteria. The AIP, through the Applications container 111, can also support a variety of business applications; e.g., GREAT PLAINS, PEACHTREE, QUICKEN, MICROSOFT OFFICE, and QUICKBOOKS. These business applications are also examples of applications that could be made available by ASPs.

Additionally, the AIP includes a Support Services container 113 to provide operational and business support components from existing systems of the AIP Proprietor (Proprietor). The container 113 includes OSS functions, such as Trouble Ticketing for defect and problem reporting and management. Another OSS function is Service Level Agreements (SLA) Management, which is supported through application monitoring and reporting. That is, Service Level Agreement Management monitors the performance of the AIP platform against criteria specified in various service level agreements and initiates actions when exceptions to agreements are detected. The SLA performance criteria may be represented by rules in a Rule Engine, and the exception action is specified in a workflow.

Other OSS functions include system management, network management, and host management. The Support Services container 113 further provides BBS functions, which include provisioning, billing, and order entry. Provisioning of new customers, services, devices, and networking are done through Provisioning Management. Billing of AIP customers is done through the Billing system. The AIP supports the ability to provide billing in several ways. The ASP can receive a detailed bill, which it then breaks down to individual corporate portals and re-bills to its corporate customers. In addition, the AIP can perform the breakdown for the ASP together with re-branding of services and provide a summary to the ASP and bill the ASPs corporate customers directly for the ASP. Also, the Support Services container 113 includes a data warehouse, as well as decision support functions.

As seen in FIG. 2, the Infrastructure services layer 101 encompasses fundamental functions that are required to run other services, such as security, databases, and gateways. Exemplary security functionality includes firewalls in a DMZ configuration, authentication and authorization, access control, and Virtual Private Network (VPN) connections to customers. Virtual Private Networking provides the ability for end users to access data stored in the AIP across the public Internet with minimum risk to data integrity and privacy.

Additionally, advanced security functions may include Public Key Infrastructure (PKI), Certificate Authorities for strong authentication for applications needed by B2Bs, Intrusion Detection Systems (IDSs), and Antivirus Scanning, as well as include distributed firewalls. The Intrusion Detection Systems recognize an unauthorized access ("hacker") attempt and to direct the attempt to a decoy system where unauthorized actions are recorded for post analysis and prosecution. The Infrastructure services layer 101 also supports the Lightweight Directory Access Protocol (LDAP), which enables highly scalable, read mostly, logically centralized, and physically distributed access to directory services. The layer 101 also has Gateways (GW) for providing protocol conversion and access control functionality needed to integrate diverse PSTN, Wireless, and Internet networks.

Below the Infrastructure services layer 101 is the Resources layer 103, which includes end user devices, platforms, data storage, and development and execution environments that are needed to field the AIP. These end user devices, for example, may include telephones, PCs, IP Appliances, Pagers, Faxes, PDAs, and wireless mobile smart phones (with PDA functionality). The platforms include routers, capacity on demand midrange servers, and various types of network elements. Data Storage includes Network Attached Storage (NAS), which are used for Customer Edge Server storage, and Storage Area Networks (SAN) that provides highly available, scalable, and secure Internet Data Center (IDC) storage. The Storage Area Network may be a dedicated switched fiber channel local area network (LAN) that is used exclusively to access disk storage, providing the ability to manage disk space globally across a suite of processors and to serve additional storage on demand.

The AIP system and methodology combines a development and execution environment into one set of capabilities to support both aspects of the operations of its customers, such as ASPs. The development environment provides the tools, component libraries, and Software Development Kits (SDKs) needed to rapidly build applications to leverage common services. The execution environment (ExeDev) provides dynamic management of highly available, scalable, and secure processes across multiple clusters of processors, including capacity-on-demand.

As evident from the above discussion, the AIP platform provides an advanced infrastructure and development environment, supplies the technical and business processes, and presents a tested and integrated environment for offering applications from a network. In addition, the AIP platform furnishes a complete, out-of-the-box ASP platform that delivers the services and features needed by an ASP for its customers.

The AIP infrastructure enables a Proprietor to service a number of different customers: Independent Service Vendors (ISVs), ISV-ASPs, ASP Resellers, ASP Aggregators, Enterprises with Proprietor Hosting, and Enterprises with Internal Hosting. An Independent Service Vendor typically seeks to offer its products through an ASP model, but does not wish to be an ASP. For example, a developer of business accounting software might convert that software so that it could be used as a service. The developer may then look for an ASP and a reseller to market, sell, and support that service.

An ISV-ASP refers to an Independent Service Vendor that aims to deliver its products through an ASP model. For example, a developer of human resource software might convert that software to an ASP format, host the application through the Proprietor's hosting, then market, sell, and support that software to the ISVs' new and existing customers. An ASP Reseller refers to an ASP that focuses on the marketing and support of specific applications developed by third parties; such an ASP does not have development expertise of its own. Rather, the ASP Reseller enters into reseller agreements with ISVs, and then delivers services to customers based on the licensed software. For example, an ASP Reseller might license software that performs calendar management, contact and sales tracking, and expense management. The ASP Reseller would learn the applications so that it could market them and provide support to business sales forces.

An ASP Aggregator refers to an ASP that goes one step beyond the ASP Reseller. This ASP develops interfaces and integrations between the applications it licenses to create application bundles with additional functionality. For example, an ASP Aggregator might license software that does calendar management, contact and sales tracking, and expense management. This user would learn the applications, so that it could market them and provide support to business sales forces. But, then it would develop communications between the applications to link expense reports to sales calls, create sales records automatically when calendar entries are made, and deliver productivity reports that combine the data of all three products. An Enterprise with Proprietor Hosting refers to a business that seeks to deliver applications to its workforce through an ASP model; exemplary applications may include commercial applications such as the MICROSOFT OFFICE suite of office productivity tools. The ASP model gives the enterprise better control over distribution and updates. Other applications may be internally developed applications. For example, an architectural firm may use an ASP model to deliver basic office software and CAD packages to staff. They may also use it to deliver internally developed job costing and RFP response applications.

An Enterprise with Internal Hosting refers to a business that delivers applications to its workforce using an ASP model. The ASP model provides the enterprise better control over distribution and updates. It is noted that applications may be internally developed by the Enterprise. The enterprise is typically a business that is sufficiently large to want to host and support its applications in its own data centers over its own network.

Through the AIP, the Proprietor can offer a value (or advantages of use) proposition to each of the various types of customers. Of the elements of the value proposition that follows, some elements are common to all customers, while other elements are unique to particular customers. Accordingly, the AIP permits ASPs to deliver services in a cost effective manner, while providing true global reach with the size and capability to support the unique needs of their customers.

In addition, the AIP platform provides a developer environment, whereby the ASPs and ISVs are supplied with the tools, re-use software repositories, workspace, and support they need to quickly prepare their applications for service delivery. The AIP platform advantageously saves the ASP and ISV from having to acquire or develop all of the supporting functionality needed to effectively deliver a service. Additionally, the AIP platform greatly shortens time to market, and minimizes start-up and operational costs.

The Proprietor may offer its customers, and thus the end users, a variety services including: developer services, hosting services, brokerage services, and marketing services. Developer services include development tools, AIP connection tools, laboratory space, professional support, professional services, re-use software repository, and application certification. Hosting services include collocated, managed, dedicated, or custom hosting. It is noted that AIP Services include the AIP service platform, which encompasses sales rather than service for the Enterprise with Internet Hosting customer. Brokerage services include ASP library listing for locating applications, demonstration environment, marketing services to ASPs, marketing services to customer prospects, service assurance options, and brokerage for marking application bundles.

Figure 3:
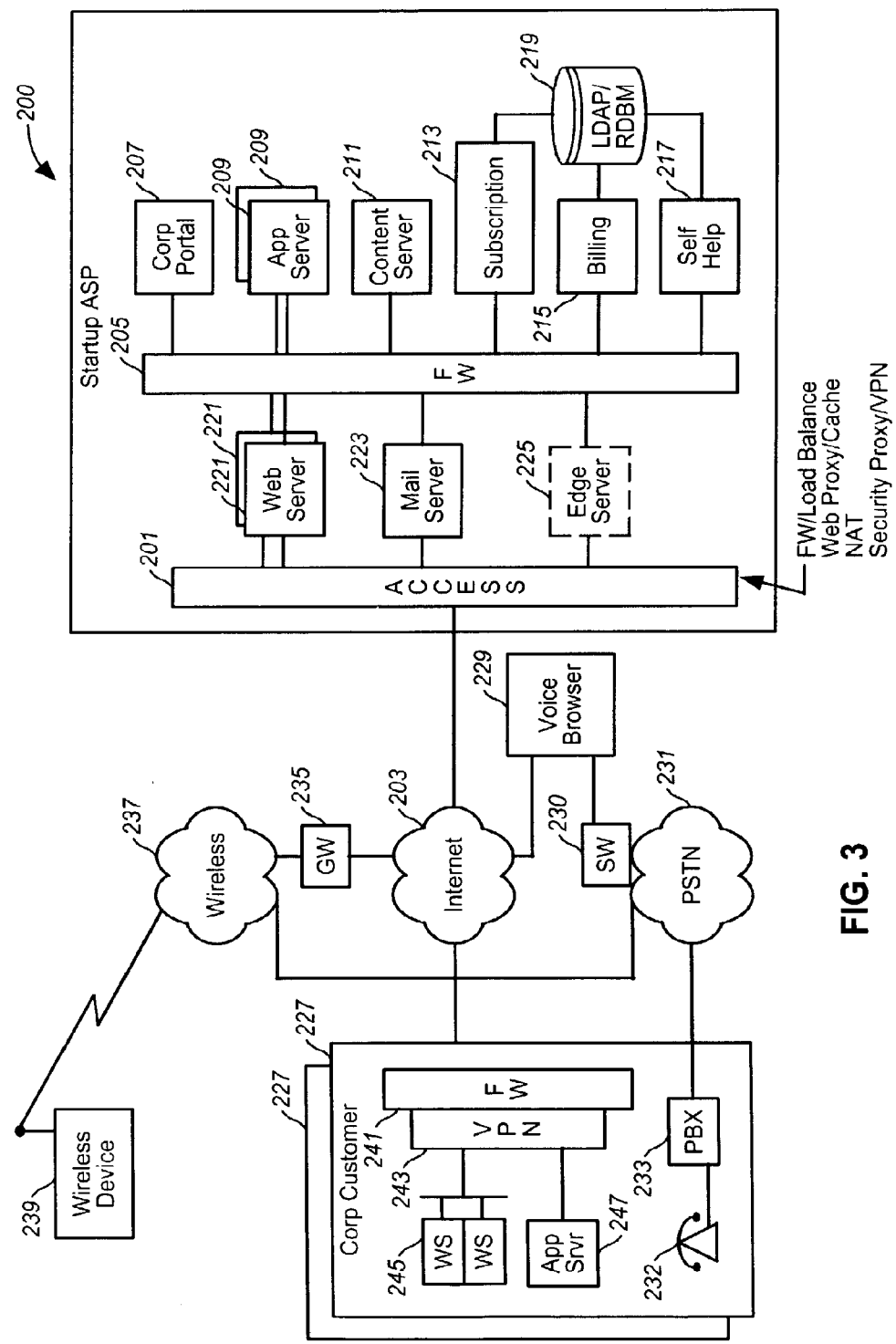
FIG. 3 is a block diagram of an ASP configuration.

FIG. 3 is a block diagram of a start-up ASP configuration. As seen, the ASP 200 is connected by an Access System 201 (i.e., access network) to the Internet 203. The Access System 201 performs numerous functions, including firewalling, load balancing, web proxying, caching, network address translation (NAT), security proxying, and virtual private networking. Load balancing distributes the web page requests from the public Internet across the web servers, in part, to enhance response time for the end user. A firewall 205 resides in front of a Corporate Portal 207, Application Servers 209, Content Server 211, Subscription system 213, Billing system 215, and Self Help system 217.

The Corporate Portal 207 aggregates corporate content, sites, applications, messaging, and directory services for presentation and selection. Corporate content is the content of a normal corporate Intranet home page, which provides linkages to other corporate sites (e.g., Human Resources, Finance, Travel, etc.), rented applications, corporate applications, unified messaging, and directory services. This home page also provides a place for either linking or incorporating a personal portal. A personal portal is a page for integrating personal linkages and services, like favorite bookmarks and sites. The rating scheme is that corporate portal is a high utility, and the usage of logon, initial application selection, or corporate portal access to corporate content is moderate.

The Subscription system 213, Billing system 215, and Self Help system 217 have access to a LDAP/RDBM storage 219. The Access network 201 also connects to one or more web servers 221, a mail server 223, and optionally an edge server 225. In an exemplary embodiment, the network devices within the ASP 200 communicate in a Virtual LAN (VLAN) environment. The web servers 221 store the web pages constituting access to the corporate portals provided by the ASPs.

Corporate Customer sites 227 can receive services from the ASP 200 over the Internet 203. A Voice Browser (VB) system 229 responds to concise set of spoken keywords to obtain information from an audio response unit (not shown); the VB system 229 connects to the Internet 203 and to a Public Switched Telephone Network (PSTN) 231 via a switch (SW) 230. The Corporate Customer sites 227 may employ telephones 232 that are served by a PBX 233, which connects to the PSTN 231.

A Gateway 235 is coupled to the Internet 203 and enables communication originating from a Wireless Network 237, which serves wireless devices 239 (e.g., PDAs, PCs, cellular phones, and etc.). A Corporate Customer site 227 may include a firewall 241, a VPN function 243 (e.g., a VPN server), work stations 245, and one or more application servers 247.

Figure 4:
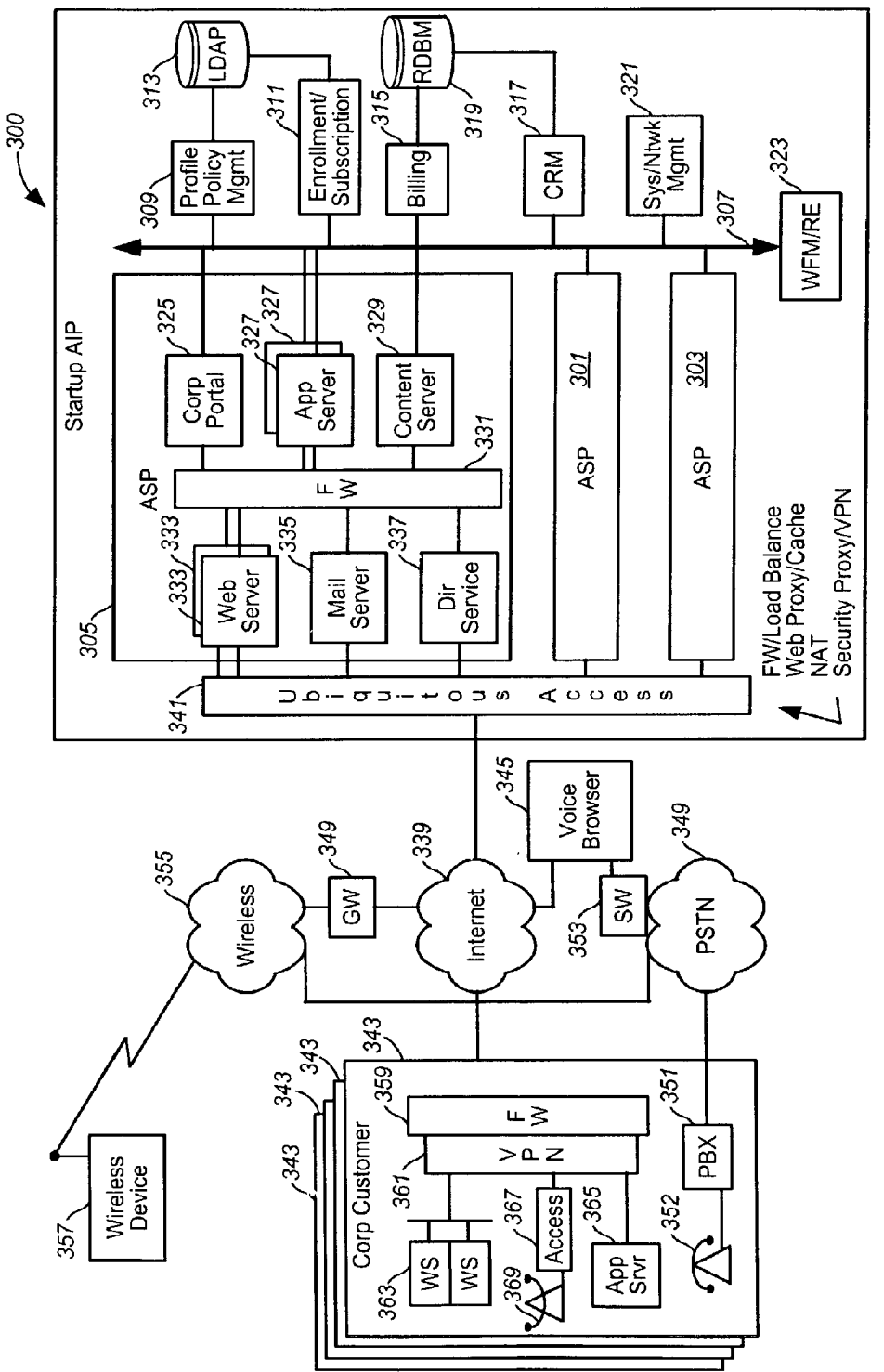
FIG. 4 is a block diagram of a centralized AIP configuration, according to an embodiment of the present invention.

FIG. 4 is a block diagram illustrating an AIP in a centralized architecture. Under this scenario, a central AIP 300 may utilize multiple ASP systems 301, 303, and 305, which couple to an AIP message bus 307, to provide application services to the ASPs (and their customers) as well as customers of the AIP 300. It is noted that, in another embodiment of the present invention, the AIP 300 may be distributed such that these ASP systems 301, 303, and 305 are serviced by numerous AIPs. An AIP Profile and Policy Management System 309 and an Enrollment and Subscription System 311 may access a Lightweight Directory Access Protocol (LDAP) directory 313. Enrollment, in an exemplary embodiment, pertains to corporate customers, whereby the corporate structure is used to build the profile. The subscription process permits the users to subscribe to service packages that are established based on the profile of the corporation. In other words, customers enroll and build the User profile, Service profile, Device profile, and Security profile to establish service packages that will be offered to a corporate staff according to the applicable profiles.

The corporate staff may then subscribe to these established packages, as permitted by the associated profiles. Profile Management system 309 structures and builds profiles based on, for example, the Organizational Name hierarchy and User, Service, Device, and Security profiles; alternatively, the system 309 utilizes the LDAP directory 313, a Meta Directory, and Join Engine to a Corporate Human Resources (HR) database (not shown).

The Billing system 315 and Customer Relationship Management (CRM) system 317 utilize a shared Relational Database Management (RDBM) storage 319. Customer Relationship Management refers to methodologies, software, and Internet capabilities that help an enterprise manage customer relationships in an organized way. The AIP 300 further provides a Network Management system 321. These systems 315, 317, 321 may communicate via the bus 307. The bus 307 also provides connectivity to a Work Flow Manager and Rules Engine (WFM/RE) system 323.

Similar to the ASP 200 of FIG. 3, the ASP 305 provides a Corporate Portal system 325, one or more Application Servers 327, and a Content Server 329, which are behind a firewall 331. On the other side of the firewall 331, one or more Web Servers 333, a Mail Server 335, and a Directory Service system 337 are situated. The AIP 300 is linked to the Internet 339 via a Ubiquitous Access system 341. As mentioned previously, the Ubiquitous Access System 341 performs multiple functions including firewall, load balancer, web proxy/cache, NAT, Security Proxy and virtual private networking. A web cache holds in physical memory on a least frequently used basis the web pages most recently displayed to end users to avoid slow retrieval from disk. A security proxy implements the AIP security policies, and maintains copies of the security profiles, so that it can rapidly assess UserID/password combinations and grant access to authorized users.

The Corporate Customer sites 343 may access the AIP 300 via the Internet 339. As with the system of FIG. 3, A Voice Browser system 345 connects to the Internet 339 as well as the PSTN 349 through a switch (SW) 353. Similarly, a gateway 349 ties a wireless network 355 with to the Internet 339. Under this arrangement, a wireless device 357 may exchange information over the Internet 339.

The Corporate customer site 343 essentially resembles that of the customer site 227 (FIG. 3). That is, a firewall 359 and a VPN process 361 exist to support communication from the workstations 363 and the Application server 365. Unlike the site 227, in this example, an IP phone 369 is provided; the IP phone 369 connects to an Access system 367 to communicate over the Internet 339.

Figure 5:
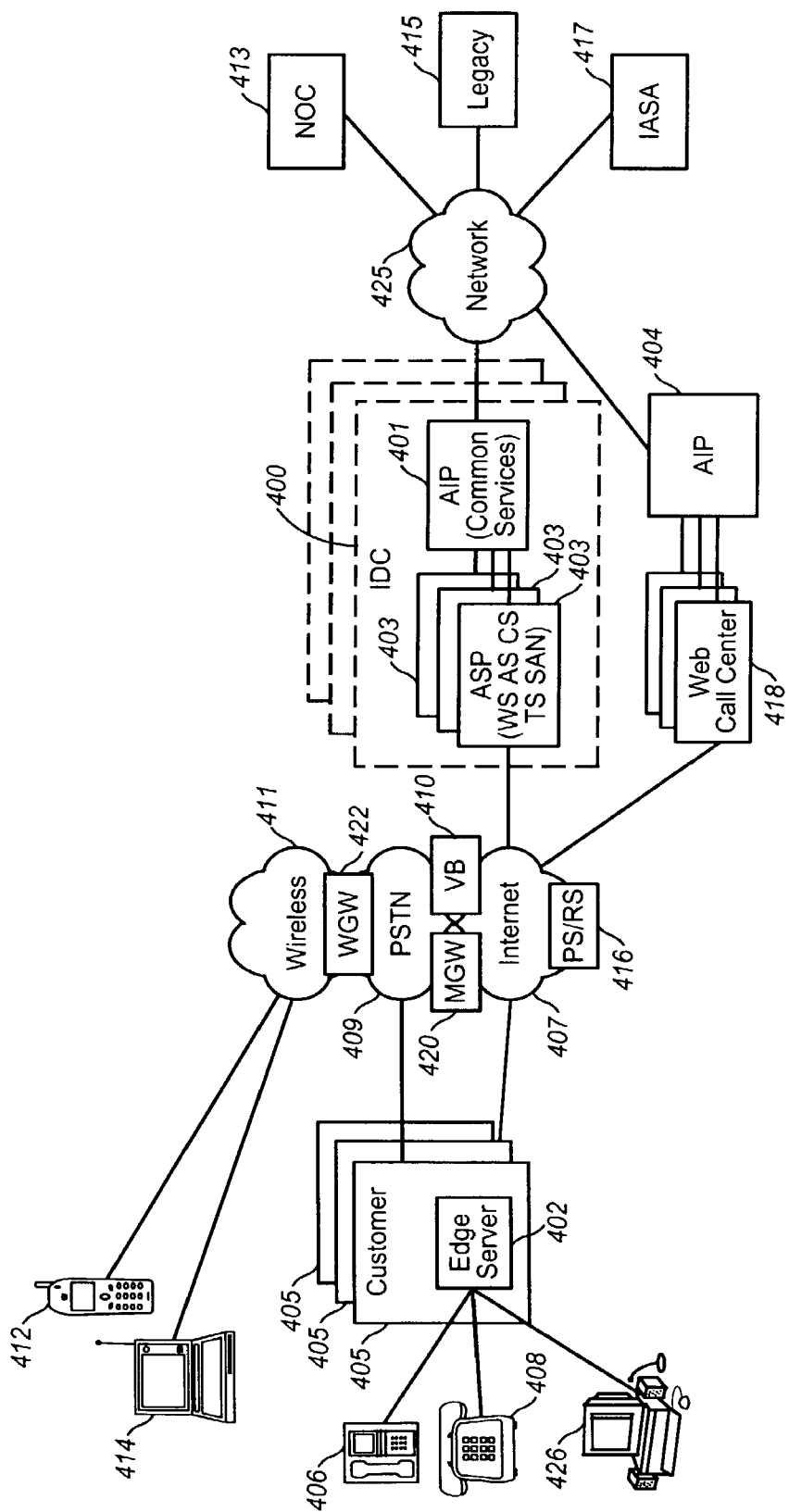
FIG. 5 is a block diagram of Internet Data Centers employing the AIP platform, according to an embodiment of the present invention.

FIG. 5 depicts an exemplary AIP configuration, as deployed in an Internet Data Center (IDC). An IDC 400 includes an AIP 401, 404 that serves one or more ASP systems 403; for example, one configuration is shown in FIG. 4. For the purposes of explanation, the AIP 401, 404 is shown as two blocks, in which block 401 refers to the common services, and the block 404 denotes the other services of the AIP. As shown, a number of IDCs 400 and associated AIP 401, 404 may exist to provide a distributed system, which enhances service availability to the users and reduces user response times.

The ASP system 403 includes Web Servers (WS), Application Servers (AS), Communication Servers (CS), Transaction Servers (TS), and a Storage Area Network (SAN). These ASP systems 403 deliver service to customers 405 via any number of networks: the Internet 407, a PSTN 409, and a wireless network 411. In this example, the Internet 407 may provide Policy Servers (PS) and Redirect Servers (RS), indicated at 416. The Internet 407 is also linked to the PSTN 409 via a media gateway 420, and the PSTN is linked to the Wireless Network 411 via a wireless gateway 422. As in the systems of FIGS. 3 and 4, a Voice Browser 410 is utilized.

The AIPs 401, 404 connect to a network 425 of the Proprietor in support of a development and test environment encompassing a Network Operations Center (NOC) 413, a Proprietor legacy system (or resources) 415, and an Integrated Application Support Architecture (IASA) 417. The IASA 417 provides support for services provisioning, CPE/circuit installation, activation, event management, and billing to AIPs for their consumption of services. In an exemplary embodiment, the network 425 may become part of the AIP 401 and used to support distributed AIP implementations. The Proprietor Legacy Resources 415 may include applications that have been developed as well as those applications that are in development; these applications may be utilized by the AIP 401 and integrated into its the common services for use by the ASPs in serving their customers.

The development applications of the Proprietor may conversely use common services of the AIP 401. The AIP 404 shows an AIP Common Services Environment connected to a series of Web call centers 418 which are connected to the Internet 407. The services of the Web call centers are also integrated into the AIP common services and available for use by the ASPs in serving their customers. The customers 405 have one or more edge servers 402 serving terminals such as telephones of varying types 406 and 408, and PCs or workstations 421. The wireless network 411 serves varying types of terminals, such as the PDA 412 and the wireless connected laptop computer or terminal 414.

When integrated with the development and test environments of the Proprietor, the AIP provides significant benefits with respect to development, design, and production of new products and services. As an example, the availability of the AIP, as an integral Proprietor entity, frees Proprietor resources for use to application specific developments. Such developments and associated resources may include end user devices, platforms, data storage, and development and execution environments, which are usable to field the AIP. The configuration facilitates the ability to constantly develop new capabilities to be incrementally incorporated into the AIP, thereby increasing the efficiency of ongoing research and development. In this manner, a project can use some of the AIP common services, rather than implement redundant capabilities. A new project can also make its services available via the AIP, thus enabling other ongoing projects to use those services. This greatly leverages the capabilities provided in ongoing new projects and minimizes redundancy. As the AIP of the Proprietor scales, the AIP becomes distributed.

Figure 6A:
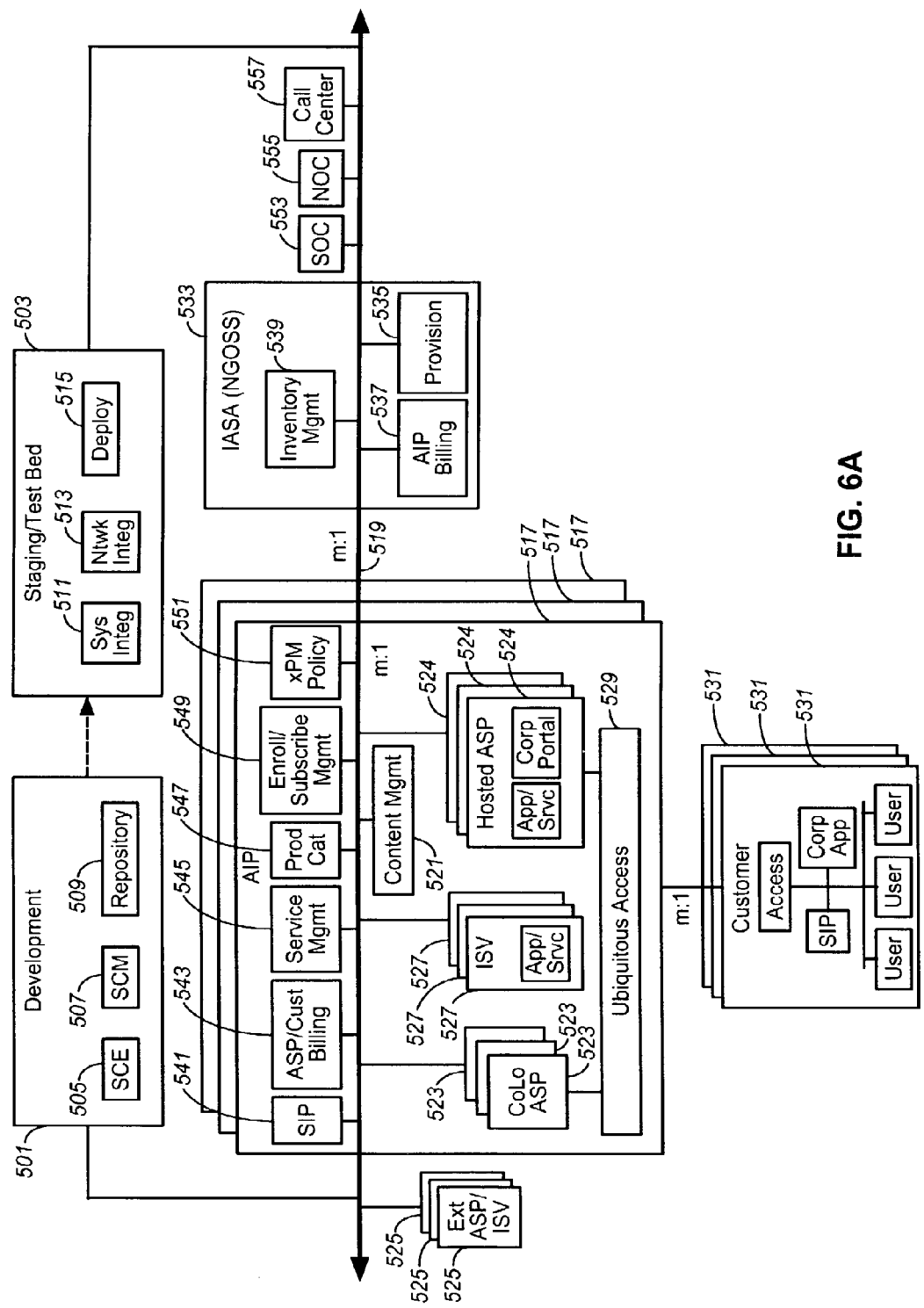
FIGS. 6A and 6B are block diagrams of a Distributed AIP Deployment Configuration along with Proprietor systems which may be associated and used with the AIP, according to embodiments of the present invention.

FIG. 6A is a conceptual block diagram illustrating a Distributed AIP deployment configuration along with Proprietor systems, which may be associated and used with the AIP. Although shown as a centralized system, a development system (or environment) 501 may be distributed and located at several sites. Similarly, a Staging and Test Bed environment 503 may be distributed, thereby providing such advantages as improved network performance and system availability. The development system 501 includes a Service Creation Environment (SCE) 505 and Service Creation Manager (SCM) 507, along with a development Repository 509 for respectively creating new services, managing the creation of such services, and providing a repository for the new services that are created. The Staging and Test Bed system 503 includes System Integration or System Integrator (SI) 511, Network Integration 513, and Deployment 515, all of which may be located at different sites. The Staging and Test Bed environment 503 may be used to integrate new applications onto systems, stage them for scaled system network test, and finally prepare them for automatic software deployment to AIP sites.

As seen in FIG. 6A, each AIP 517 may be functionally divided into a common services environment, and an ASP, ISV, XSP environment. The common services environment includes those elements which are depicted above a service or message bus 519, while the ASP, ISV, XSP environment is below the service bus 519. The common services environment, and ASP, ISV, XSP environments share Content Management 521. Content Management refers to management of data feeds, such as news, weather, sports, stock quotes and other data that end-users would find desirable.

The common services environment includes a SIP system 541, an ASP and Customer billing system 543, a Service Management system 545, a Product Catalog 547, an Enrollment and Subscription Management system 549, and an XPM and Policy Management system 551. The ASPs which are included in the XSP environment include co-located ASPs 523 and hosted ASPs 524, as well as ISVs 527. An external one or more ASP/ISVs 525 is connected to the message bus 519, and may serve to make development, staging and test bed produced applications, and software available to the AIP for inclusion in its available services.

The ASPs 523 and 524 and the ISVs 527 are connected through a Ubiquitous Access system 529 to the ASP customers 531. The external ASP/ISV 525 provides services to the AIP 517 via bus 519 and its connections to the Development environment 501 and the Staging/Test Bed environment 503.

As the number of ASPs and the customer user load grow, additional AIPs are deployed outward into existing ASP sites. Thus, one of the distributed AIPs supports multiple ASPs/ISVs at an Internet Data Center (IDC), as illustrated in the functional area diagram of FIG. 5. According to one embodiment of the present invention, services may be moved out to the edge of the network and closer to customers for improved performance. As the network expands, the initially deployed centralized sites may act as administration centers.

The service bus 519 provides communication among the various distributed instances of the AIP, as well as to link the distributed AIP to the Integrated Application Support Architecture (IASA) 533, which handles AIP/ASP provisioning 535, billing of AIPs 537, and Inventory Management 539. Under this arrangement, the customers of the Proprietor can own AIPs. The IASA 533 provides a inventory management 539 of assets, network and security operations, and support to AIPs. Also associated with the distributed AIP are the SOC 553, NOC 555, and Call Center 557.

As seen in FIG. 6A, the AIP 517 may support multiple ASP/ISVs per site. The AIP 517 also provides localized ASP customer care needed for web based enrollment of new customers, setting up of service packages, subscription support, localized event collection, billing, reporting, and localized customer support. Local Workflow Management and Rules Engines coordinate development of needed products to accomplish these tasks. All of these activities are integrated onto a common message bus (EAI/MOM). External ASP/ISV services may be integrated along with local ASP/ISV services into a common product catalog that may be used by new ASPs to select their services for customization and resale to customers.

As previously noted, the AIP 317 includes a robust set of services and applications intended to provide a full featured environment for the targeted customers, namely, ASPs. The AIP 317 retains the same architectural structure, while omitting from the structure those services and applications that are not needed to fulfill the immediate AIP Infrastructure objective. The AIP 317 advantageously provides a common service framework in which commercial applications can be implemented and launched to demonstrate the ability to reduce development cost, time to market, and maintenance costs while achieving technical goals for performance, scalability, and reliability.

Figure 6B:
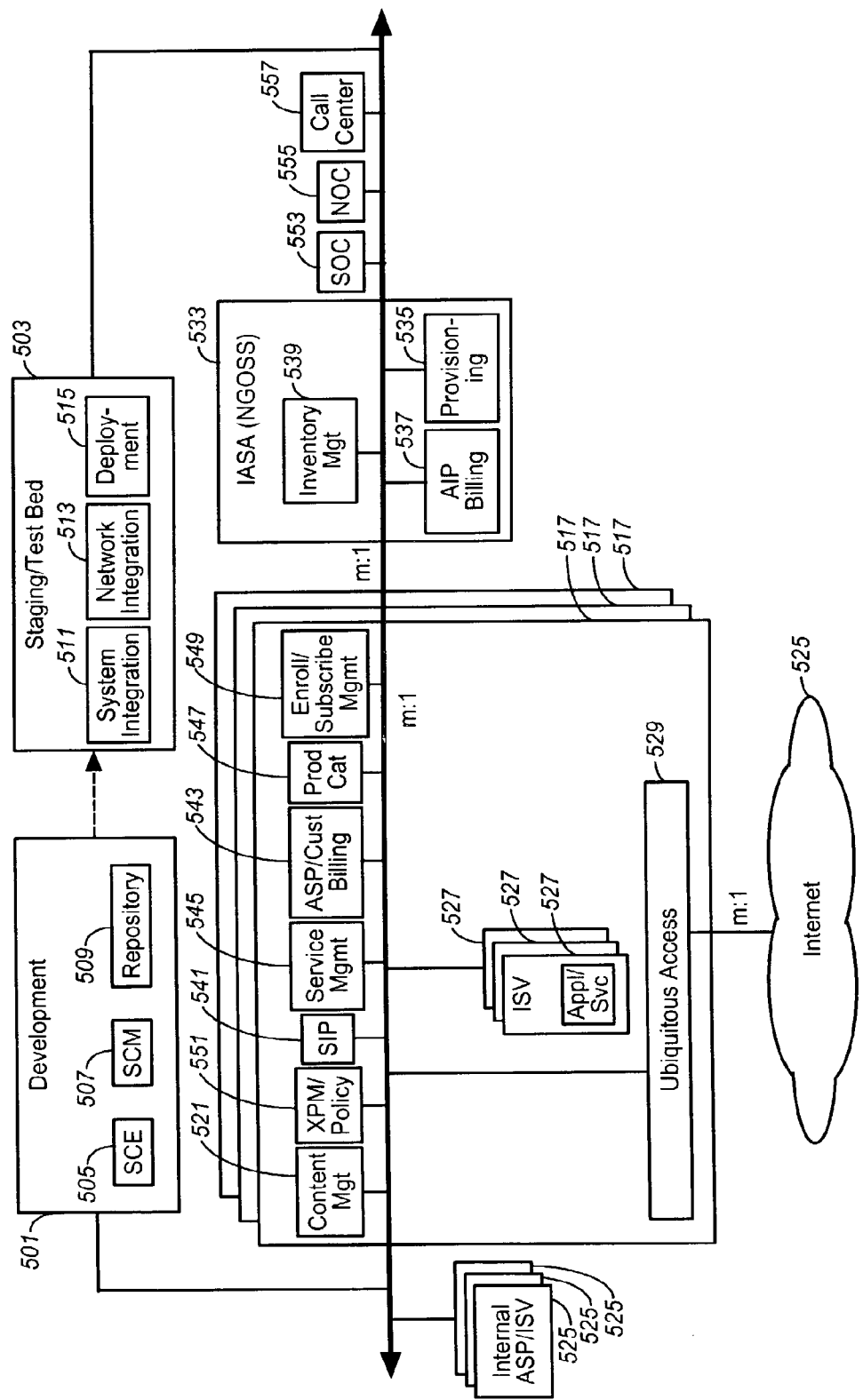

FIG. 6B shows the architecture of the AIP, whereby the AIP houses services by Independent Service Vendors (ISVs), according to another embodiment of the present invention. In this example, the architecture is largely similar to the system of FIG. 6A, with the exception that the AIPs 517 are without the ASPs 523, 524. Further, by contrast to the system of FIG. 6A, internal ASP/ISVs 559 are not within the AIPs 517, but instead are connected through the service bus 519. Accordingly, the AIPs 517 have the flexibility to provide application services from any number of sources.

Figure 7:
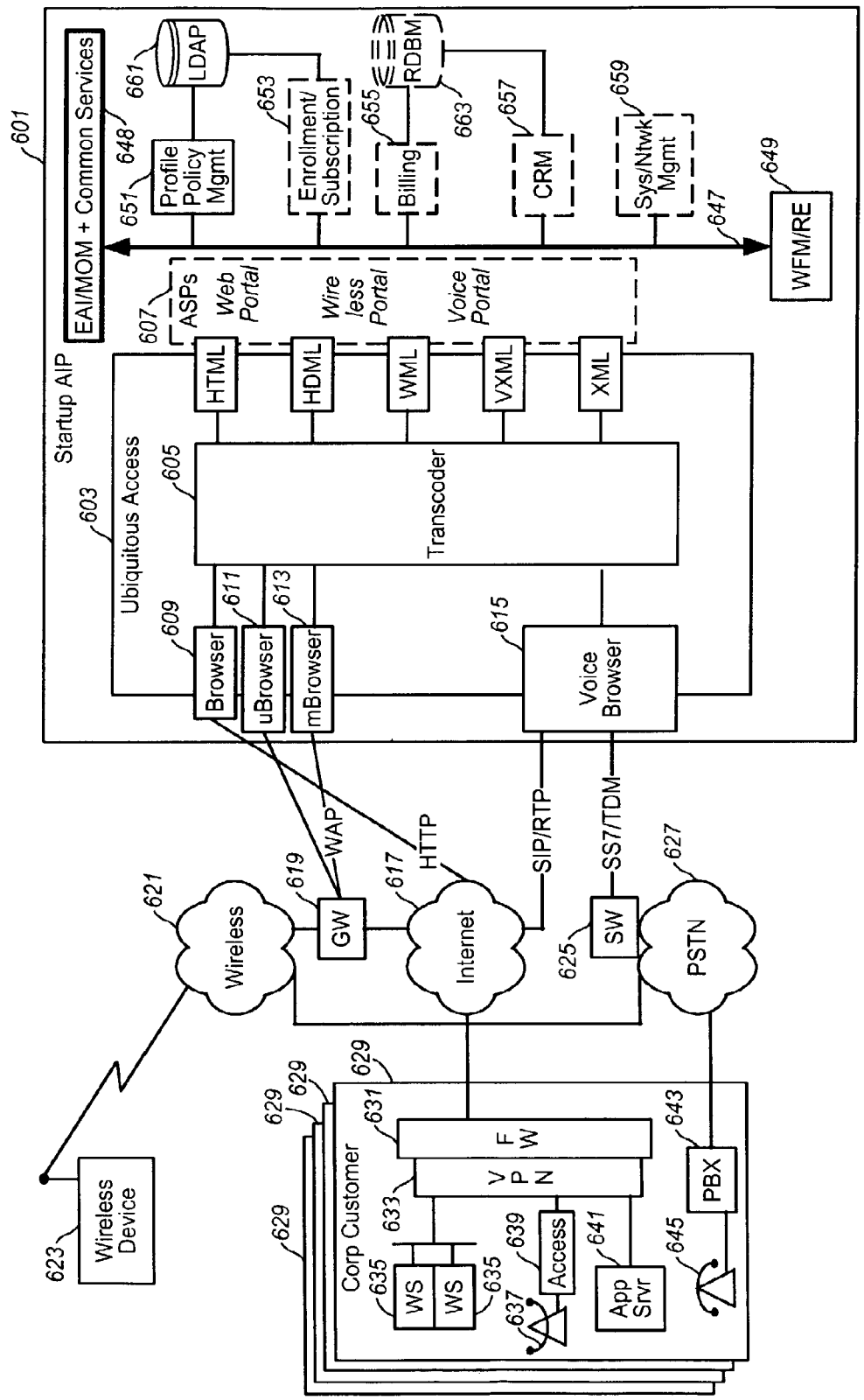
FIG. 7 is a block diagram of a system for providing Ubiquitous Access, according to an embodiment of the present invention.

FIG. 7 shows an AIP 601 that includes the Ubiquitous Access object 603. As shown, the ubiquitous access object 603 includes a Transcoder 605 which receives varied protocols from ASP Portals indicated at 607. These portals include a Web Portal, Wireless Portal, and Voice Portal. From these portals the Transcoder 605 receives the various mark up language protocols, such as the HTML, HDML, WML, VXML, and XML protocols.

The transcoder 605 translates these protocols into protocols that are readable by the various end user devices. The output of the Transcoder 605 is presented to the various networks via a series of browsers 609, 611, 613, and 615, which respectively deliver HTTP, WAP, SIP/RTP, and SS7/TDM signals. The three uppermost browsers 609, 611, and 613 handle signals for PCs and the like. In addition, these browsers 609, 611, 613, and 615 handle the varied protocols which terminate in the variety of larger or smaller displays offered in WAP devices ranging from PDAs to WAP phones. These outputs are delivered to the Internet 617, Gateway 619, and Wireless Network 621. The Wireless Network 621 links to various Wireless devices 623. The Voice Browser 615 delivers output via Switch 625 to the PSTN 627. The Internet 617 feeds a large number of Customers 629 through Firewalls 631 and VPNs 633. The VPN links to Work Stations 635 and VoIP phones 637 via access 639. The VPN 633 is also connected to an Application Server 641. The Voice Browser 615 and PSTN 627 are linked to POTS phones 645 via PBX 643.

Through a Service Bus 647, the AIP 601 provides common services 648, which are similar to those previously discussed in connection with the system of FIG. 4. The Bus 647 connects a WFM/RE 649, Profile and Policy Management 651, Enrollment and Subscription 653, Billing 655, CRM 657, and System and Network Management 659. LDAP and RDBM storages 661 and 663 are also provided.

Figure 8:
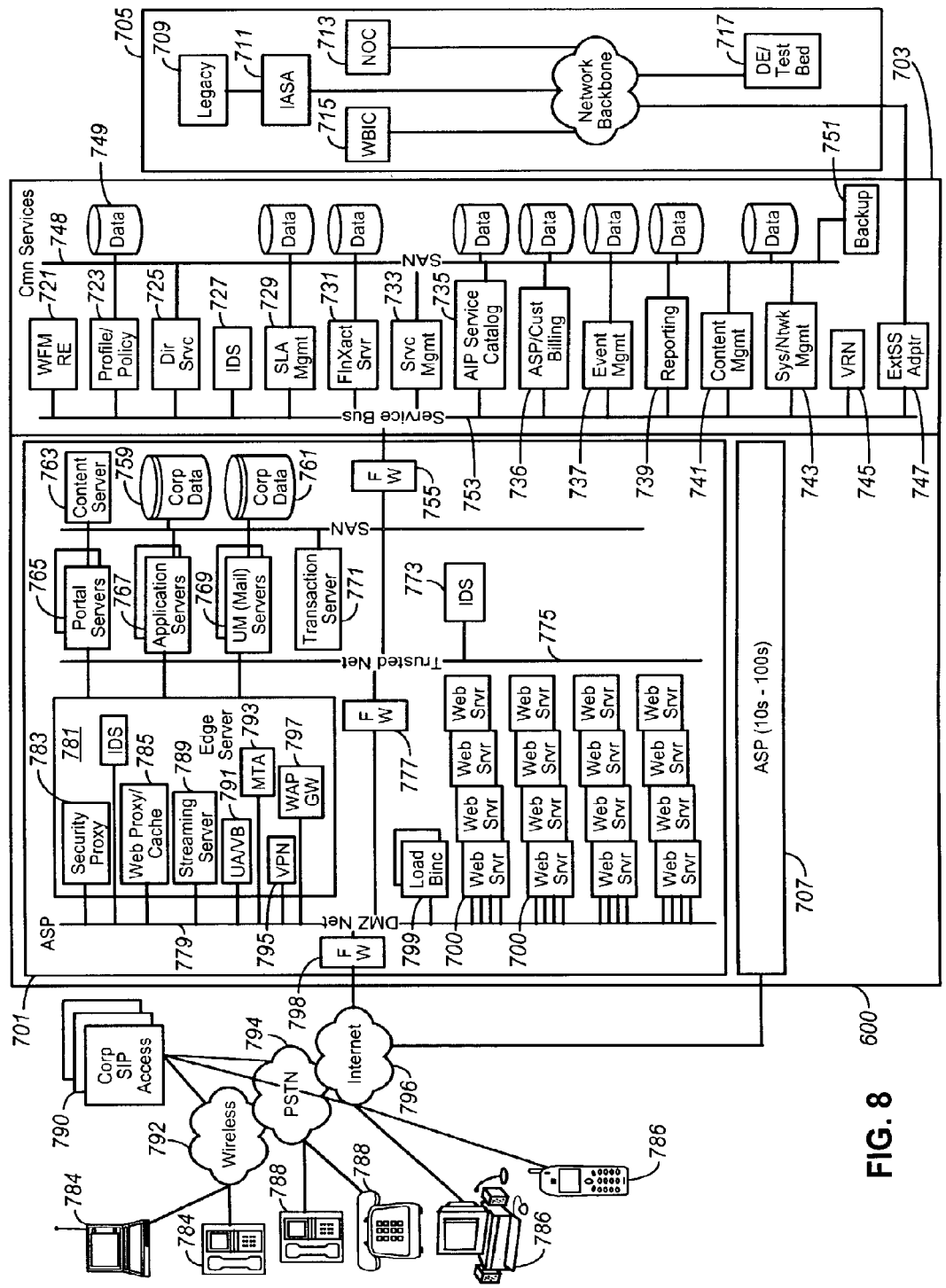
FIG. 8 is a diagram of an exemplary deployment of an AIP and its associated environments, according to embodiments of the present invention.

Referring to FIG. 8, the AIP is shown at 700, an ASP at 701, and the AIP common services environment at 703. Proprietor environments that are associated with the AIP are indicated at 705; these include the development and test bed environments are similar to those shown at 501 and 503 in FIG. 6A. In the associated Proprietor environments 705 in FIG. 8 are included the Proprietor Legacy technology 709, the IASA 711, the NOC 713, the Development and Test Bed 717, and the Web Based Interaction Center (WBIC) 715. While logical details of one ASP are shown at 701 in FIG. 8, it is shown at 707 that virtually any number of ASPs may be readily accommodated, indicative of the high scalability supported by the AIP.

In the common services environment 703 are shown the WFM/RM systems 721, the Profile and Policy Management systems 723, Directory Services 725, Intrusion Detection System (IDS) 727, SLA Management 729, the Financial Exact Server 731, Services Management 733, the AIP service catalog 735, ASP/Customer billing 736, Event Management 737, Reporting 739, Content Management 741, System and Network Management 743, VPN 745, and External Services Adapter 747.

Event Management 737 includes login/logoff, start/stop, time based, resource based, exception based and other similar kinds of event processing. Event management 737 drives the following systems: billing 736, security 727, and SLA management 729. The adapter 747 is a translator that is used in the AIP architecture to couple two communicating software components that do not naturally use the same protocols; the adapter 747, for example, may transform one representation of a business function into another. These components are all connected by the SAN 748 to the associated databases that serve them. These databases are indicated collectively at 749 with a backup 751.

Service Bus 753 is connected via a firewall 755 to the Storage Area Network 757. This network 757 has attached thereto the Corporate Data Storages here represented by storages 759 and 761. Also tied to the Storage Area Network 757 (for example, from its own VLAN) are the Content Server 763, Application Servers 767, UM Mail Servers 769, Transaction Server 771, and Intrusion Detection System (IDS) 773. These servers 765, 767, 769, 771, and 773 communicate with the Trusted Net 775, which is connected through firewall 777 to the DMZ Net 779.

The Portal Servers 765, Application Servers 767, and UM Mail Servers 769 are connected to the Edge Server 781. The Edge Server 781 includes the Security Proxy 783, Web Proxy/Cache 785, Streaming Server 789, UA/VB 791, a Mail Transfer Agent (MTA) 793, VPN 795, and WAP Gateway 797. The MTA 793 transfers email from a mail server to a mail client. These elements 783, 785, 789, 791, 793, 795, and 797 are connected to the Demilitarized Zone (DMZ) Net 779. Also connected to the DMZ Net 779 are the Load Balancers 799 and a plurality of Web Servers 1100.

If an ASP customer of the AIP has web servers available, as indicated in this diagram, the customer may choose to use those web servers. Alternatively, the AIP may house these web servers and offer web hosting services. That is, web servers used by ASPs may either be their own web servers, which are physically located at the ASP site, or may be web servers of the AIP at an AIP site. The same flexibility extends to the Edge Servers, as well as all of the other components that an ASP customer of the AIP may require. Accordingly, a customer ASP may elect to simply receive services of the AIP without the cost of acquiring and maintaining hardware or software. Although FIG. 8 shows a component in a block representing an ASP, the component need not necessarily be located at an ASP site, or at a centralized AIP site.

The AIP 700 provides reusable infrastructure components to ASP Sites. These components may include Web Servers, Application Servers, Content Servers, Transaction Servers, and Corporate Data Storage. The AIP 700 also provides infrastructure components to Customer Sites. These components may include Edge Servers, and Network Elements such as Voice Browser and SIP PS/RS. As previously stated, it is a feature of the present invention that the AIP 700 as well as the Proprietor environment may be distributed.

The DMZ Net 779 is connected via a firewall 798 to the Internet 796, PSTN 794, and Wireless Network 792. Each of the Internet 796, PSTN 794, and Wireless Network 792 are connected to Corporate SIP Access Systems 790. The PSTN 794 feeds various telephone terminals 788, while the Internet 796 feeds PC and Work Station Terminals indicated at 786. The Wireless Network 792 feeds various wireless terminals 784.

The deployment shown in FIG. 8 supports, in an exemplary embodiment, three zones of security: DMZ (demilitarized zone) Net 779, Trusted Zone Net 775, and AIP Common Service Zone (also referred to as "High Security Zone") 703. That is, the architecture supports are firewalls, which prevent the unauthorized access of AIP platforms from the public Internet 796. The DMZ (demilitarized zone) Net 779 is the entry point from the Internet 796, following the firewall 798. The DMZ Net 779 provides the initial level of protection to multiple corporate access points; that is, each corporation can have its own dedicated access components (e.g., edge server and web servers). This zone is also the lowest level of availability, usually relying upon cluster management instead of high availability solutions.

The Trusted Zone Net 775 is the behind the DMZ 779 and provides a second level of security to the applications that are accessed through the DMZ's access servers. A different type of firewall than that of the firewall 798 is employed to deter hacking through to the applications and their data. Corporate data is also stored in this zone, which runs at a higher level of availability, relying upon N+1 sparing of application servers, capacity on demand to support instantaneous loads, fail-over thread control for redundant container management in software, and backup of customer data.

The AIP Common Service Zone 703 is protected by a third firewall 755. Within the AIP 700 are common services that are supplied to ASPs and common data that is important to the operation of the AIP/ASPs. This zone 703 provides the highest level of availability relying upon capacity on demand resource pooling for adding ASPs, and high availability configurations with in site warm backup databases and disaster recovery across sites.

With respect to Infrastructure, the following systems are supported: EAI/MOM, Work Flow Manager, Adapters, API/Interfaces, LDAP, Hierarchy, Firewalls, DMZ, NAT, Web Cache and Proxy, Load Balancer, Web Server, VPN, Policy Manager, SLA Management, Authentication, Authorization and Accounting (AAA), Profile Manager, Allocated Administration, Enrollment, Subscription, Customization, Event Manager, Provisioning, flat rate or usage Billing, Operation Support, System Management, Network Management, Corporate Portal Adapter, Personalization, SIP Servers, CPE Access, e-Mail, Voice Mail, Paging, Fax, Personal Address Book, NAS/SAN, Calendar, Corporate Directory, Telco Directory, Application Manager, Thin Client, Fat Client, NAS, eCommerce Configurator, Development Environment, Execution Environment, and SIP Integration.

The Products include Corporate (B2E) web Portal "white box" (i.e., a generic or non-branded construct) customizable application and content management. Also SIP communications integration is provided for Customer Premise Equipment at customer sites and network SIP Servers needed to route and gateway calls to and from a PSTN. Unified Messaging products include SIP based voice mail, email, page, fax, and personal and corporate address books out of a common web accessible mailbox and network message store. Directory Services of national Telephony and Corporate Directories are supported. The products also include Ubiquitous access and voice portal front end to UM, Personal Portal with local content services and personal linkages, and initial B2B Portal with aggregate AIP/ASP/ISV product catalog for reselling services.

Further Applications on Demand (AOD) are provided and include Business Applications, such as HR and finance, and Personal Applications, such as MICROSOFT OFFICE. Applications on Demand (AoD) are applications that are subscribed to and paid for on an as-use basis by the corporate user. Typically these applications include personal productivity (e.g., MS Office), professional applications (e.g., analysis, design, development, simulation, test), and some general-purpose business applications (e.g., Procurement Order, Tracking/Status, T&E, etc.). An Application on Demand server is the host from which the application is served. In a thin client application, the end user has a display component on their workstation while the bulk of the application runs on the server. In a thick client instance, the application is copied from this server to the client workstation and run on the workstation.

Other products encompass Host Management Services to support rapid service creation, deployment, and support of ASP/ISV applications; advanced B2B Portal with Small to Medium Enterprises (SME) supply chain applications; more AOD (Customer Resource Mgmt, Enterprise Resource Planning, Dev Env); advanced security (Intrusion Detection System, Public Key Infrastructure, Anti Virus, Security Operations Center); Network Operations Center (SIP integrated), and ASP Customer Provisioning, Support, and Billing at distributed AIP. Enterprise Resource Planning (ERP) refers to a broad set of activities supported by multi-module application software that helps a manufacturer or other business manage the important parts of its business, including product planning, parts purchasing, maintaining inventories, interacting with suppliers, providing customer service, and tracking orders. ERP can also include application modules for the finance and human resources aspects of a business.

Additionally, technology enablers, such as Plug and Play, Best in Class, Re-use, and Adaptive technologies are supported. The adaptive technologies include the following: self-configuring networks using client and service registration with dynamic brokering; roaming-using geographic user re-registration and profile fragment following; presence-using user registered, on-line, and available indicators; and location-using devices, Global Positioning System (GPS), limited range Radio Frequency (RF), or Infrared wireless connection to IP (Internet Protocol) appliances or wireless LANs, such as BLUETOOTH and IEEE (Institute of Electrical and Electronics Engineers) 802.11b.

Further, the AIP 700 provides reusable infrastructure components to Customer Sites (Edge Server), Network Elements (Voice Browser, SIP PS/RS), and ASPs (Web Servers, Application Servers, Content Servers, Transaction Servers, Corporate Data Storage). As noted earlier, under this approach, the ASP functionality, which is highly cohesive, may be tightly coupled to common services, which are themselves highly cohesive.

Figure 9B:
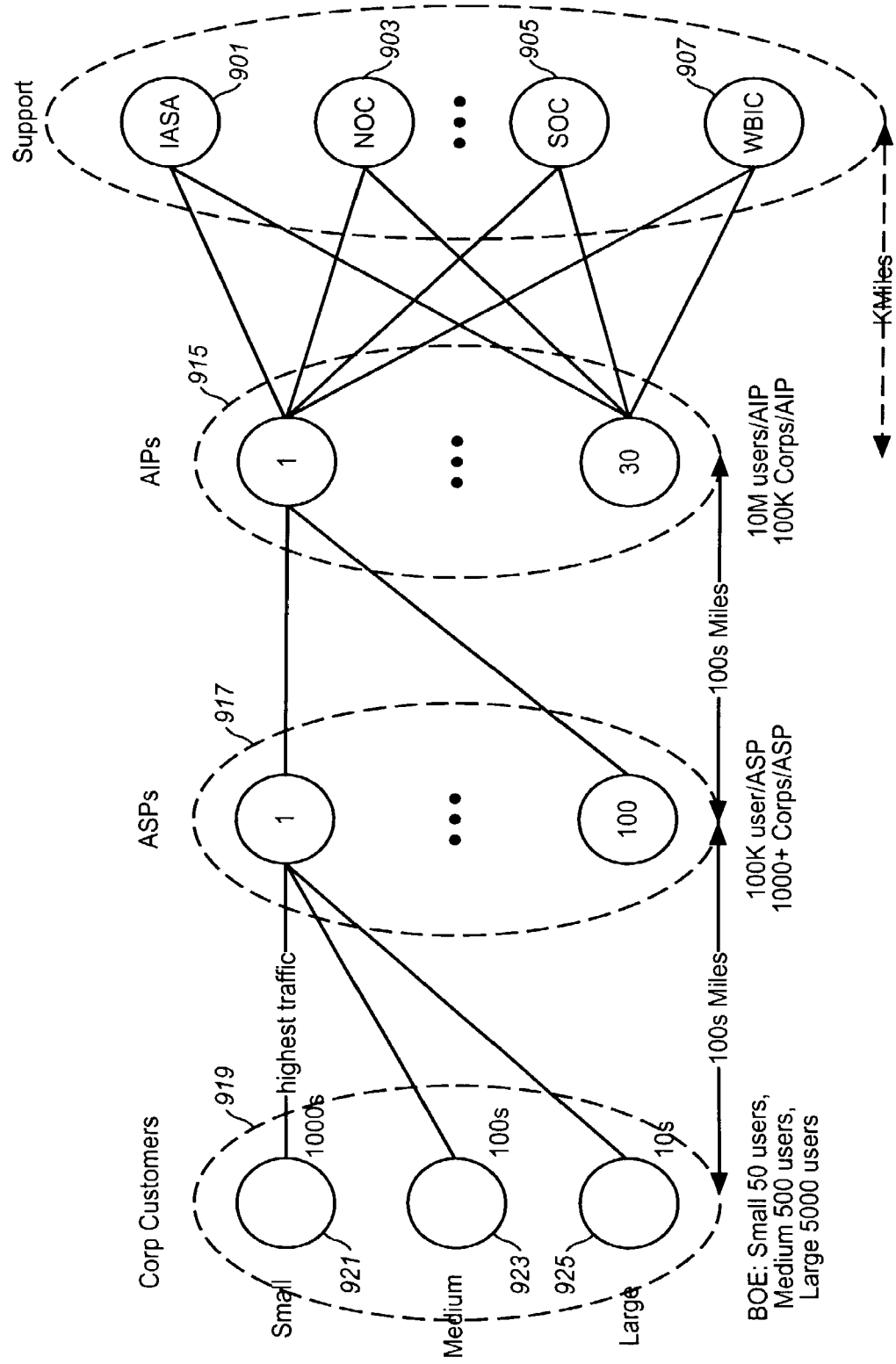

FIGS. 9A and 9B show diagrammatic illustrations of security, cohesion, and coupling enabled by the AIP. FIG. 9A shows a deployment scalability with numerous ASPs 803 servicing multiple Corporate Customers 801 at several sites supported with one centralized AIP 805. For purposes of explanation, the APSs 803 serve corporate customers that number in the hundreds.

Alternatively, the AIP deployment may be distributed, as shown in FIG. 9B. In this example, the AIP may scale to serve a large metropolitan configuration, with multiple AIPs 915 servicing many ASPs 917. In turn, the ASPs 917 offer services to many different types of clients of varying sizes: small customers 921, medium customers 923, and large customers 925. The AIPs 915 share a distributed environment of IASA 901, NOC 903, SOC 905, and WBIC 907 in support of 100 ASPs 917. In an exemplary embodiment, the ASPs 917 may thus support over a thousand Corporate Customers 919 per ASP, with 100,000 users per ASP.

As seen from FIG. 9B, the user community per AIP can grow significantly for large metropolitan areas. The AIP deployments can provide both horizontal and vertical hardware scalability, in addition to software scalability. Horizontal scalability refers to adding components, such as servers, to add system capacity. This approach of scalability may be used on a web site front end. In addition, horizontal scalable processors, which are fixed and low cost, may be managed as clusters with front end load balancers. If a horizontally scalable processor fails, the load balancer detects the failure condition and sends the next service request to the next available processor until the failed processor is replaced. Vertical scalability refers to utilizing bigger/faster servers, and translates to a multi-way symmetric multi-processing (SMP) configuration. Each customer has a dedicated pool of SMP processors, volatile memory (RAM), Input/Output, and Storage. A common pool of resources is provided for growth, either instantaneous or long term. Both types of resource growth can be supported by capacity on demand.

With respect to software scalability, modern development technology supports dynamic management of applications through, for example, Java Server Pages (JSP) and Enterprise Java Beans (EJB). These technologies use container-managed persistence to create, run, and destroy application beans, dynamically freeing up resources for other applications. Thus, applications run upon demand, and do not over consume resources, as for example a servlet does. Servlets typically only support one service per processor, whereas EJBs can support multiple dynamic application beans. According to one embodiment of the invention, software components use EJB container managed persistence service beans. This lower level of granularity allows function level beans to be built, executed and used by multiple applications.

Java provides several attractive features in the web server environment. Perhaps the most valuable is its interpreted nature: with a Java enabled browser web pages containing Java applets can be animated and reasonably be expected to behave the same on virtually every platform, operating system and browser combination. The key to this is the development of the Java Virtual Machine (JVM). JVMs are available for nearly every O/S and browser combination. While Java also supports servlets, which are executed on the web server system as opposed to applets which execute on the web browser system, the breakthrough technology is the evolution of the Enterprise Java Bean (EJB). With EJBs, web pages (actually implemented in downloaded HTML) can display results that are obtained through the invocation of EJBs which reside and execute on service platforms in the web server environment. By running the EJB on a separate server, both the web browser and web server systems are not burdened with supporting the computational activity delivered by the EJB and are able to serve and display web pages without any significant performance degradation. Further, as the EJB does not need to run on any web browser that displays the web page referencing the EJB, the EJB can be compiled into native instructions for the server on which it runs and need not be interpreted in a JVM. And this yields an EJB that demands fewer resources than would its interpretive counterpart. Finally, as Java is standards based, there are a growing body of tools and facilities based on the Java standards that will extend the capabilities of services implemented following the Java standards.

The availability of VPNs enables an AIP to receive, store and deliver data in exchanges with ASPs, and through corporate portals across the public Internet in privacy and with the assurance that the data retains its integrity. VPNs also provide the ability to restrict the access to the VPN to specific severs and services. These features enable the AIP to be able to offer its services through a wide array of ASPs and be assured that the data exchanges will be only from and to the intended party.

Figure 10:
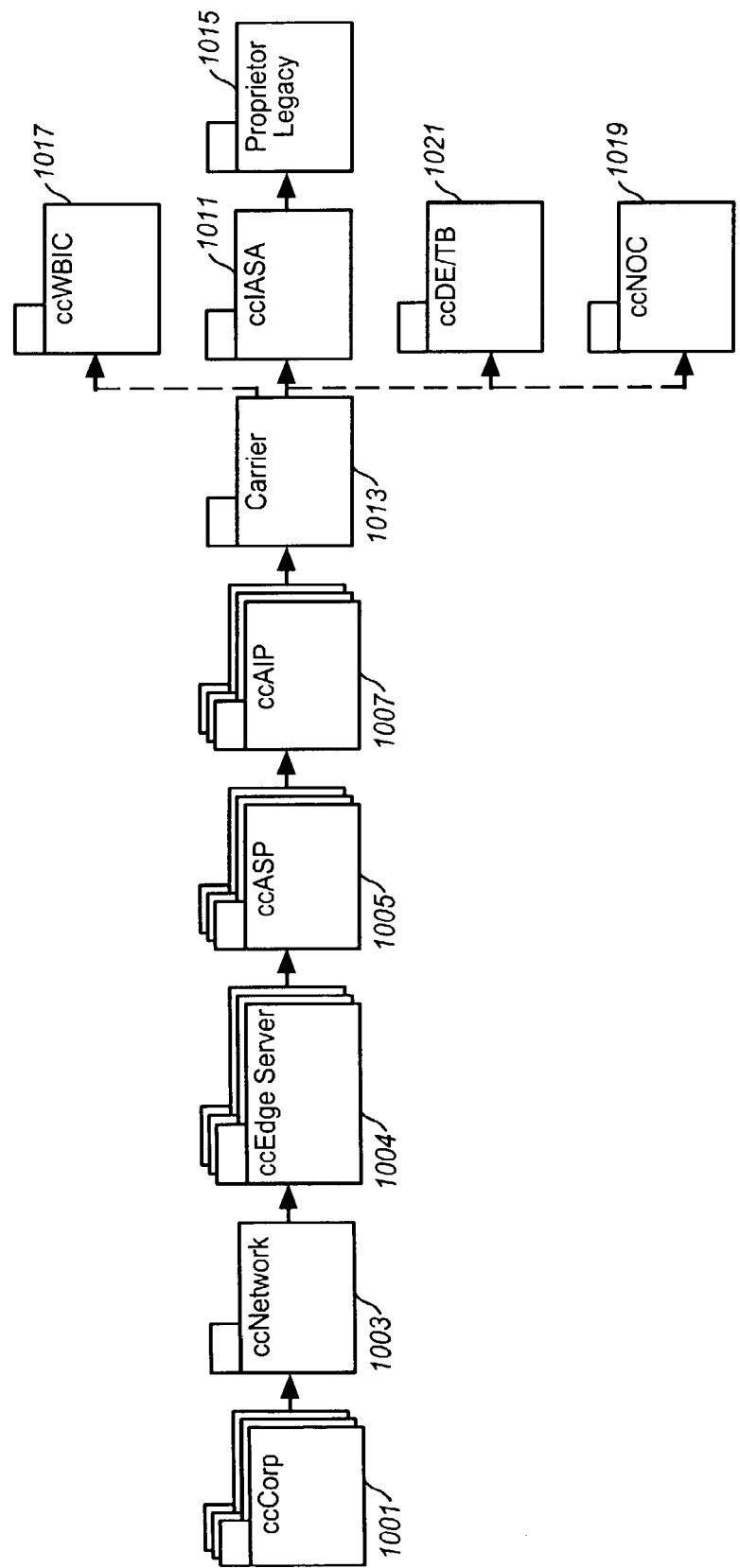
FIG. 10 is a diagram of the processing path from a customer site to legacy systems in an AIP model, according to an embodiment of the present invention.

FIG. 10 shows a top (or high level) model of the processing path from Corporate Customer to Legacy systems. The prefix (cc) indicates class category and is used to distinguish a class category from a class (overloading). Each class category is classified into its components in the following description. The dashed line between packages or blocks indicates a dependency (class category A uses class category B). The top level is a processing chain from multiple Corporation Customers 1001 per ASP through a network 1003 to multiple ASPs 1005 per AIP 1007. The Corporate Customer 1001 can have edge servers 1004 to support multimedia or to add an intranet corporate page (i.e., a corporate portal); such a scenario is reflective of larger corporations that have intranets. If the corporation is too small to maintain an intranet, then the edge server may be within the ASP site. The ASP 1005 is a commercial venture that sells (or rent) applications to many corporations 1001. The AIP 1007 provides an extensive set of common services to the ASPs 1005 that they cannot afford to provide themselves. The components 1001-1907 are more fully described below with respect to FIGS. 11, 12, 14, and 15.

IASA 1011 is connected to the AIP by a carrier network 1013 and is connected to the Proprietor Legacy Technology 1015. IASA supports such services as SIP and WBGS or UDS. WBIC 1017 provides web support center capabilities to ASPs 1005 and customers 1001. NOC 1019 supports the network and DE/TB 1021 supports development, testing, and integration of new services.

Figure 11:
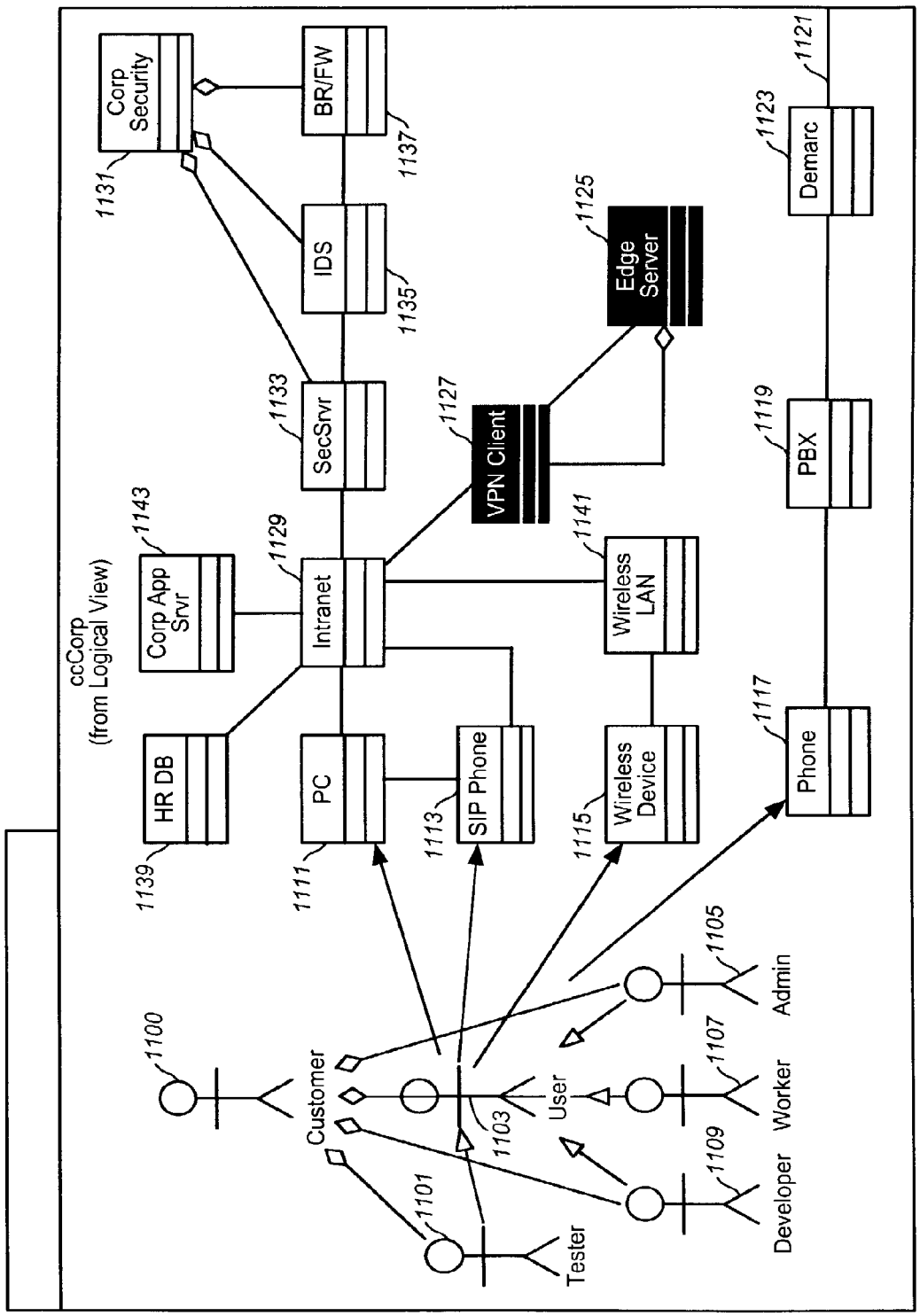
FIG. 11 is a diagram of a logical view of typical corporate customer infrastructure.

FIG. 11 shows a corporate customer model, which is a logical object oriented depiction of typical corporate customer infrastructure relationships. A Corporate Customer may be a Small to Medium Enterprise (SME) or Large Enterprise that seeks to outsource services to avoid product lifecycle costs and to reduce its own information technology organization costs. Accordingly, referring to the actor hierarchy at the left side of the figure, the Customer 1100 is a generic entity. The Customer could be a Tester 1101, User 1103, Administrator 1105, Worker 1107, or Developer 1109. Further, the User 1103 could be a Tester 1101, User 1103, Administrator 1105, Worker 1107, or Developer 1109. The User 1103 may access the customer infrastructure via a PC 1111, SIP Phone 1113, Wireless device 1115, POTS phone 1117. The phone 1117 is linked to a PBX 1119 connected to a PSTN link 1121 via a demarcation interface 1123. The customer is linked to the serving ASP/AIP via the AIP Edge Server 1125, VPN client 1127, and Intranet 1129.

Corporate Security 1131 is enabled by a Secure Server 1133, Intrusion Detection System (IDS) 1135, and Border Router/Firewall (BR/FW) 1137. The Human Resources Database (HR DB) 1139 is utilized in user sign-on. As stated, the User 1103 accesses the infrastructure services via various types of terminals, here shown as PCs 1111, SIP phones 1113, Wireless devices 1115 linked to the wireless LAN 1141, and POTS phones 1117 linked to the PBX 1119 and Demarcation interface 1123. A Corporate Application Server 1143 is available via the Intranet 1129. As previously described in connection with FIGS. 6 and 7, FIG. 11 is a logical diagram wherein the presence of a component signifies its use, but does not necessarily indicate its physical presence. Thus, the Edge Server 1125, HR Database 1139, Corporate Application Server 1143, and Security components 1131, 1133, 1135, and 1137, while shown here in Customer Infrastructure, are found in the combined AIP/ASP environments, such as shown in FIG. 8, according to one embodiment of the present invention.

In this scenario, Corporate Customers are renting the following services: Corporate Portal, Unified Messaging, Applications on Demand, Directory Services, ubiquitous access to applications, network application storage/backup/recovery, and security. These portals, applications, and services are branded in their own corporation brand and appear to users to be local. This is accomplished using an Edge Server that acts as a local server and redirects the portal, application, and service requests to the ASP (or ASPs) providing them. The ASP provides bills to the Corporation broken down by department and services used.

As seen in the Corporate Customer model shown in FIG. 11, in the lower left portion thereof, that a significant usage of the system of the present invention involves voice traffic. Thus, FIG. 11 shows the Corporate Customer infrastructure utilizing POTS phones 1117, SIP phones 1113, and Wireless devices 1115.

Figure 12:
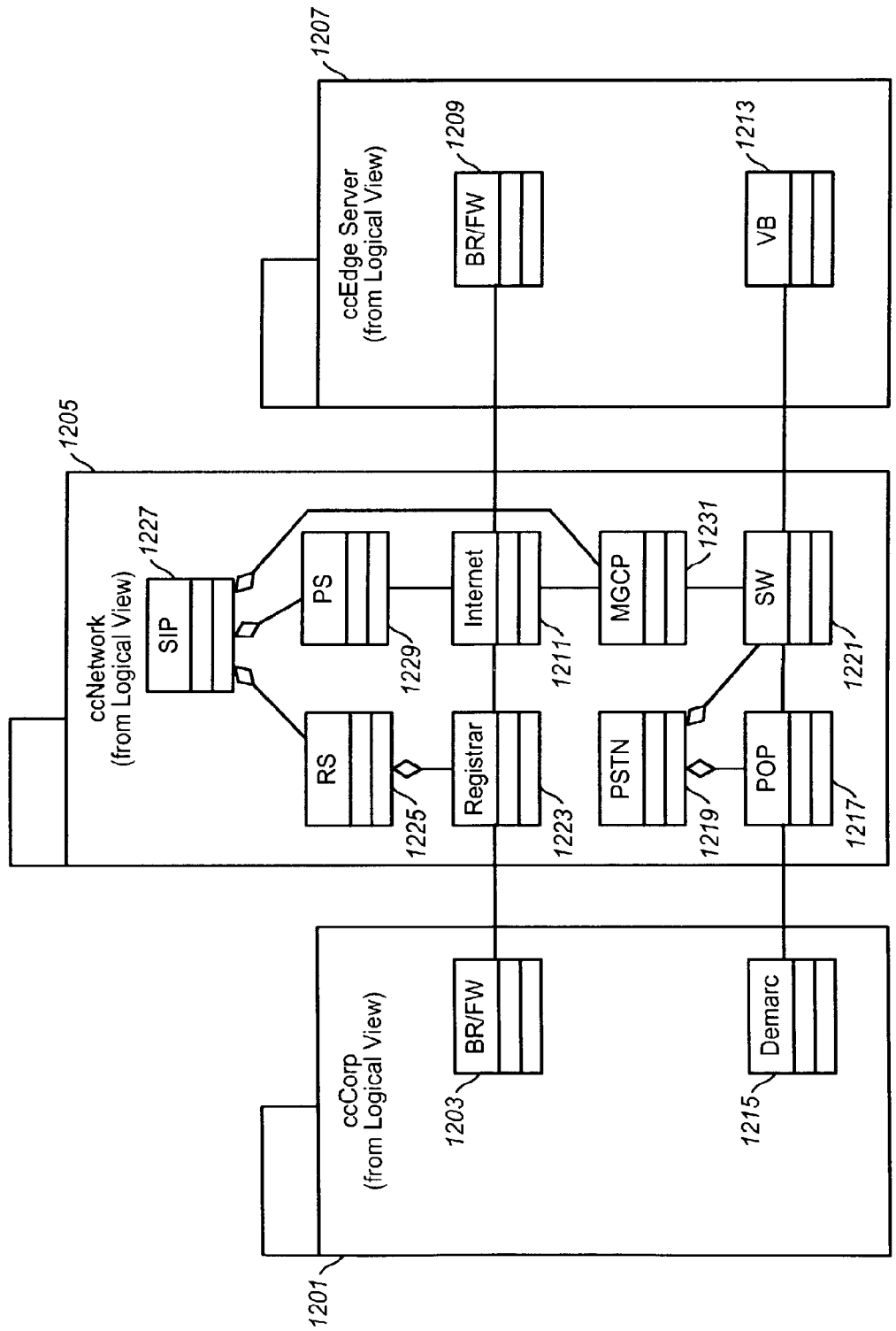
FIG. 12 is a logical diagram of network components involved in voice calls in the operation of the AIP, according to an embodiment of the present invention.

Reference is now made to FIG. 12, which is a logical object oriented diagram showing a network model for handling voice calls originating with the Corporate Customer. The network comprises the Internet, the PSTN, and Wireless. SIP servers (at least location servers) are also considered to be network elements. These include user device registration (Registrar) as part of the Redirect Server, which indicates to the Proxy Server where a user currently is located.

FIG. 12 shows a Corporate Customer site 1201 containing a BR/FW 1203. The BR/FW 1203 links the Customer 1201 to the network components shown at 1205. An edge server 1207 has a BR/FW 1209, which links it to the Internet 1211, and a voice browser (VB) 1213. The browser 1213 provides voice menus with Speech to Text (STT) and Text to Speech (TTS) conversion.

The site 1201 can support POTS calls as well as VoIP calls. POTS phone voice calls are processed first by a customer Demarcation interface 1215, and then at the POP 1217 to the PSTN 1219. A Voice Browser 1213 connects to a switch (SW) 1221, which attaches to PSTN 1219. PSTN Points of Presence (POPS), in an exemplary embodiment, are digital access points for the Internet. VoIP calls are handled using the Registrar 1223, the Redirect Server 1225, SIP 1227, the Internet 1211, and the Media Gateway 1231. VoIP calls also may travel the Media Gateway 1231, Switch 1221, PSTN 1219, and POP 1217. The Redirect Server 1225 locates users in the appropriate storages, while the Proxy Server 1229 establishes their authorization. The Registrar 1223, SIP 1227, Redirect Server 1225, and Proxy Server 1229 determine the routing of a SIP call. The Proxy Server 1229 is tied to the Domain Name Service (DNS) and translates URLs to corresponding IP Addresses.

Figure 13:
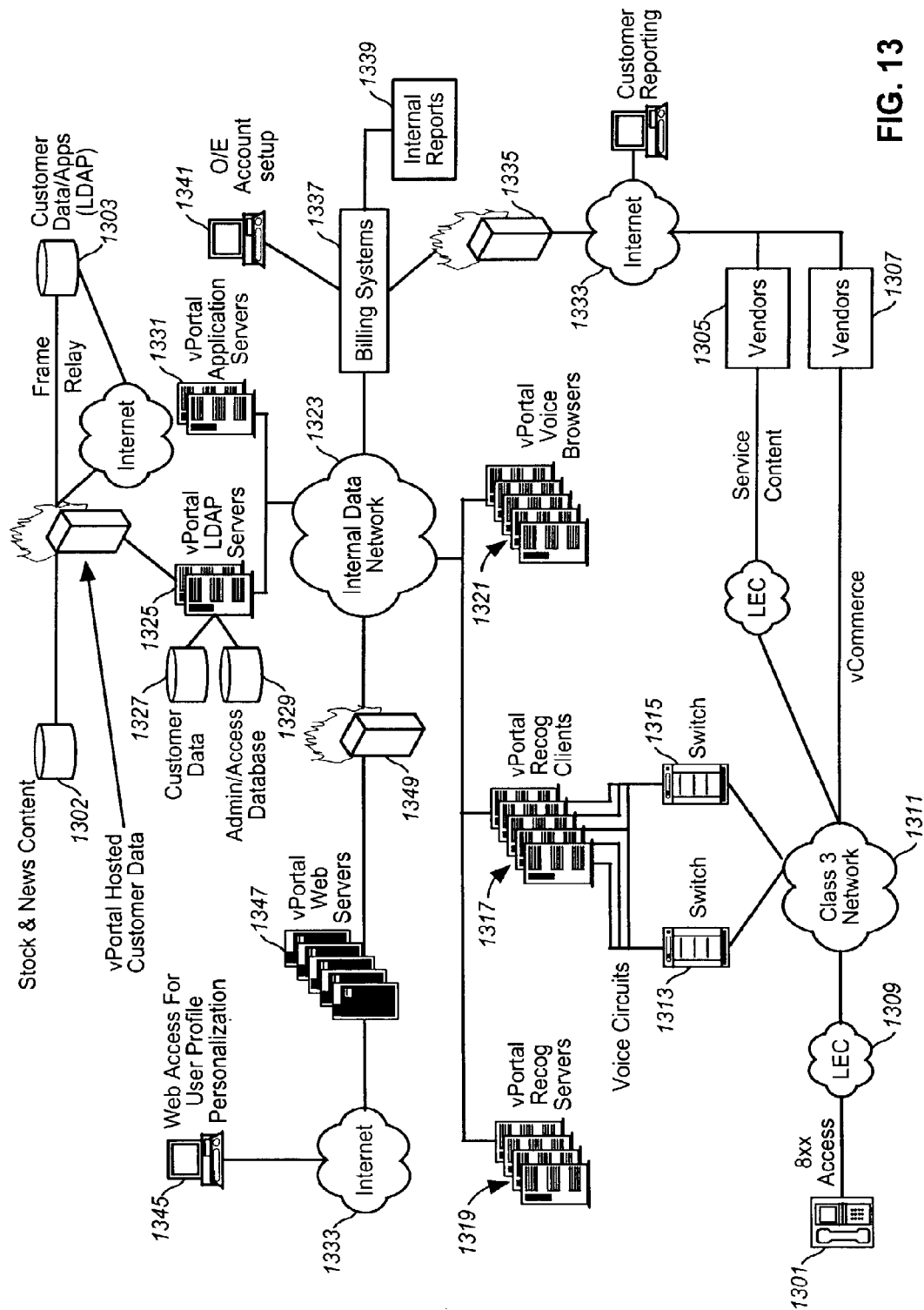
FIG. 13 is a diagram of a Proprietor Voice Portal Architecture for enabling voice browsing in AIP operation, according to an embodiment of the present invention.

FIG. 13 provides a depiction of Proprietor Voice Portal Architecture for enabling voice browsing in AIP operation. Under one operational scenario, a POTS phone 1301 originates an 8xx (or toll free) call to gain access to the network. The call may seek data or information, such as Stock and News content 1302, or other Content 1303, which is provided by a customer (e.g., vendors 1305 and 1307) of a Proprietor AIP.

The Vendor 1305 returns voice responses, while the Vendor 1307 returns e-commerce responses, such as to a PDA or the like terminal. While the Vendors 1305 and 1307 operate the service for making the information available, the involved hardware, software, and service may be provided by the AIP. The call originating at the telephone 1301 passes via the LEC 1309 to the AIP network 1311. From the Proprietor network 1311 the call is directed to a Switch 1313 or 1315, and then to Voice Portal Recognition Clients 1317.

The voice recognition clients work with Voice Recognition Servers 1319 and Voice Portal Browsers 1321. The voice signal is converted into text, which may represent voice requests or commands. The command, which originates from an identified source or user, is next sent via the AIP Internal Data Network 1323 to Voice Portal LDAP servers 1325 and to Voice Portal Application Servers 1331. The LDAP servers 1325 access the Customer Data storage 1327 and Administration and Access Database 1329. Also, the LDAP servers 1325, in conjunction with the Application Servers 1331, determine whether the requesting party is entitled to the service or information requested. After ascertaining that the requester is entitled to have the request filled, the information is transmitted back through the Voice Recognition Servers, Clients, and Browsers 1319, 1317, and 1321. The requested information is then converted into speech and is delivered over the phone 1301. Information regarding the transaction is reported by the Vendor 1305, 1307 via the Internet 1333 through Firewall 1335 to the AIP Billing Systems 1337.

The Billing Systems 1337 prepare Internal Reports 1339 and communicate with a Terminal 1341 for setting up Accounts. The PC or Workstation 1345 may be used to obtain Web Access for Profile Personalization. It is recognized that an authorized user may access information over the phone or a PC (or Work Station) 1345 over the Internet 1333. The PC 1345 provides a means for establishing such access through the Internet 1333, Firewall 1349, and AIP Internal Data Network 1323.

Figure 14:
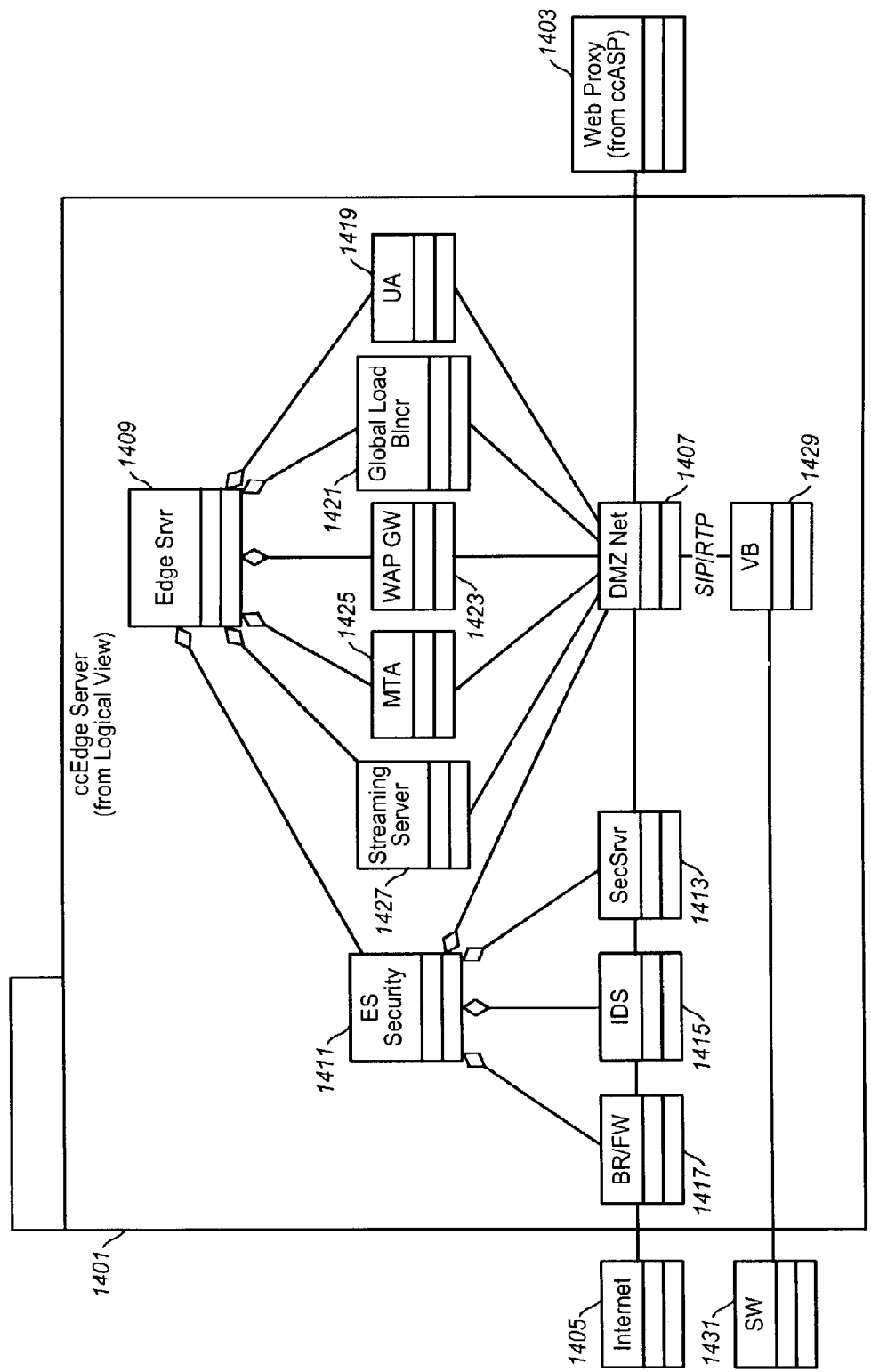
FIG. 14 is a logical diagram of the elements involved in providing edge server service in the environment of the AIP methodology, according to an embodiment of the present invention.

FIG. 14 is a diagram of an edge server service environment, according to an embodiment of the present invention. An AIP Edge Server environment 1401 provides common access mechanisms for multiple ASPs. For small sites, the environment 1401 may be shared among such sites; however, for large ASPs, a dedicated environment 1401 may be employed. The AIP Edge Server environment 1401 moves performance sensitive services closer to the end customer, in which the higher the correlation of load to performance, the more likely edge servers can improve performance.

The Edge Server environment 1401 communicates with a Web Proxy 1403 from an ASP and has connectivity to the Internet 1405. The Edge Server environment 1401 establishes the forward boundary of the DMZ (Demilitarized Zone), in form of a DMZ network (Net) 1407.

As shown, the Edge Server environment 1401 also includes a Proprietor Edge Server 1409, and the Edge Server Security 1411. The Edge Server Security 1411 interacts with an Intrusion Detection System 1415, a Border Router/Firewall 1417, and a Secure Server 1413. The Edge Server 1409 provides the services of ubiquitous access 1419, Global Load Balancing 1421, WAP Gateway 1423, MTA 1425, and Streaming Server 1427. The DMZ Net 1407 also supports SIP/RTP messages from a Voice Browser (VB) 1429, which communicates with a Switch 1431.

Figure 15:
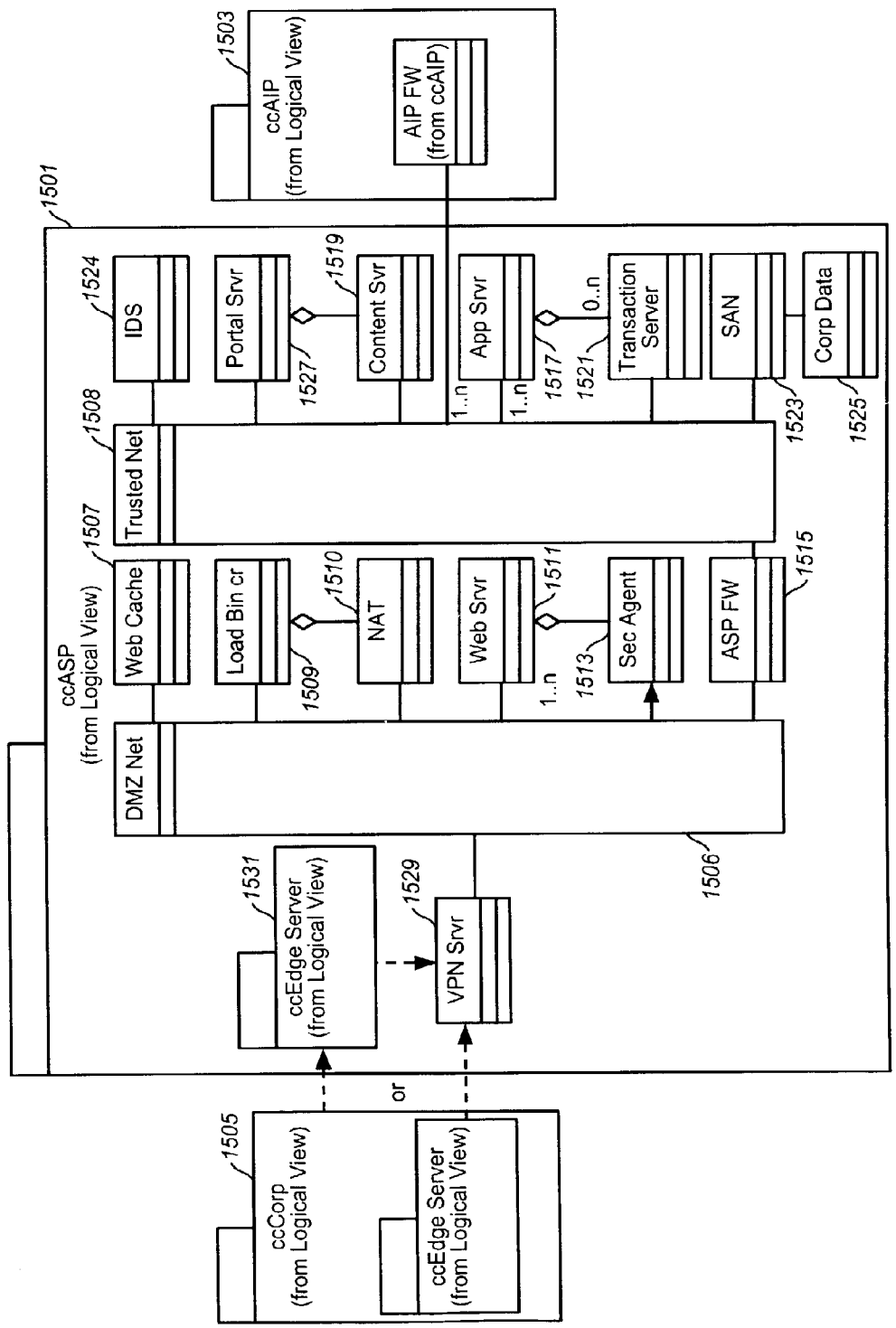
FIG. 15 is a logical diagram of an ASP model, according to an embodiment of the present invention.

FIG. 15 is a logical diagram showing an exemplary ASP providing AIP services to a customer site. An ASP 1501 has a VPN Server 1529, Edge Server 1531, and the DMZ network 1506 (whether incorporated within the ASP or supported through an Edge Server), serving as a front end to the customer site 1505. The DMZ network 1506 provides a firewall protected LAN segment to which various ISP components are connected, including a Web Cache 1507, a Load Balancer 1509, a NAT 1510, a Web Server 1511, a Security Agent 1513, and an ASP Firewall 1515. The Web Server 1511 includes a security agent 1513 that sends initial unauthorized access to the Security Server for authentication. Initial access authorization might require accessing the policy manager (part of the AIP). The Applications are protected by an ASP firewall 1515 between the DMZ 1506 and Trusted Net 1508 LAN segments, thus imposing at least two firewalls before reaching the applications and application content/data.

The ASP backend includes an IDS 1524, a Portal Server 1527, and an Application Server Environment 1517 (e.g., ASP/JSP and Servlet/EJB containers and service beans). Dynamic pages are generated from function selections at the web server and are passed on to the ASP/JSP for page generation. Content may come from Portal links to Content Servers 1519 or Application links to data. Transaction Servers 1521 support applications that require transaction operations on data. Data 1525 is stored on securely Storage Area Network 1523 partitions by the corporation.

Figure 16:
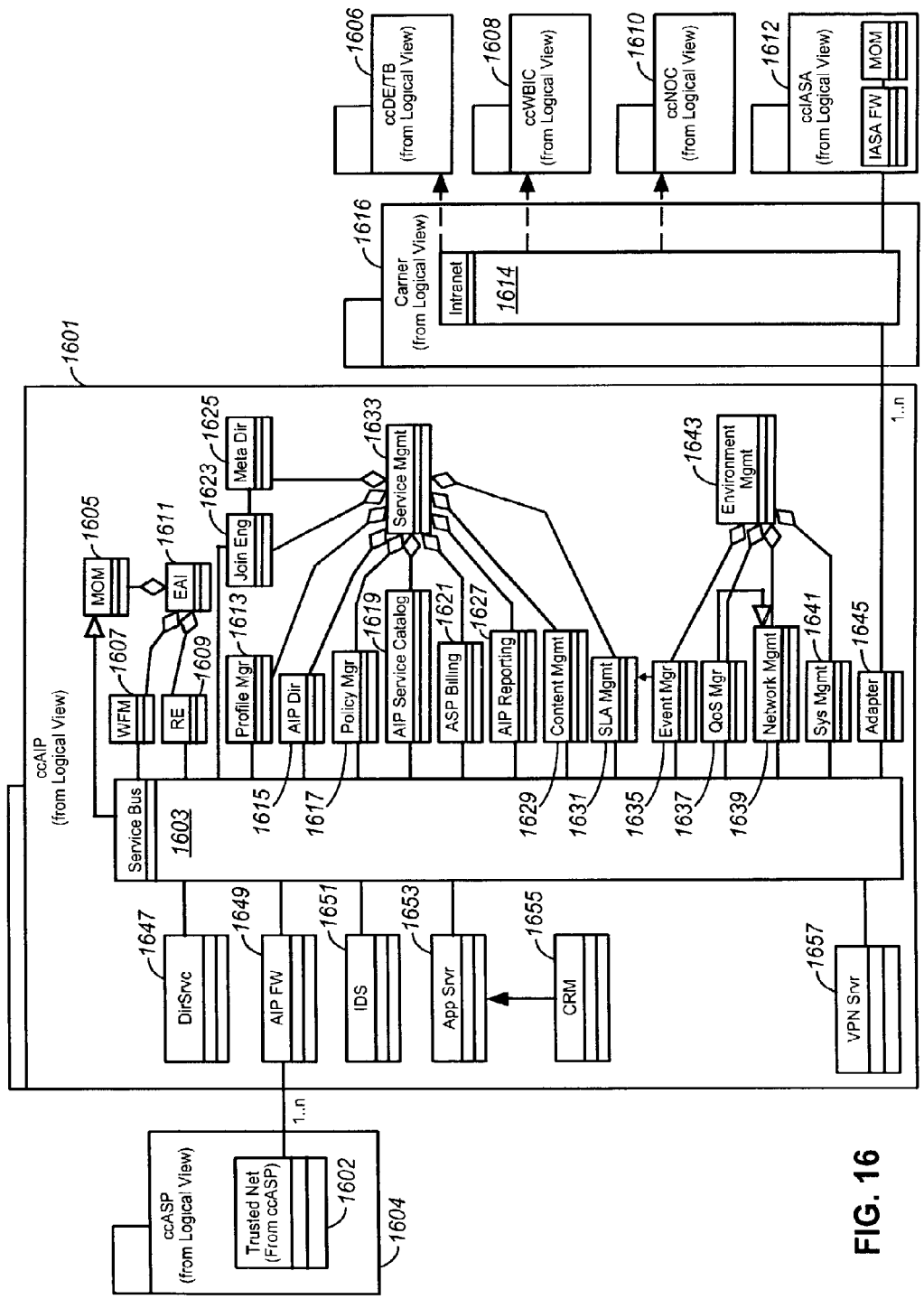
FIG. 16 is a diagram of a logical view of AIP Common Services, according to an embodiment of the present invention.

FIG. 16 shows an AIP Services Model, according to an embodiment of the present invention. While the customer ASPs may select from among numerous services in the AIP product catalog, the core services support the optional services and are included in the basic services offered to the ASPs. As shown, an AIP 1601 utilizes a Service Bus 1603 to provide these core services, which are delivered to the ASP 1604 Trusted Net 1602. The AIP is supported by DE/TB 1606, WBIC 1608, NOC 1610, and IASA 16012, via Intranet 1614 and a carrier network 1616.

The core service elements include MOM 1605, WFM 1607, RE 1609, EAI 1611, Profile Manager 1613, Join Engine 1623 and Meta Directory 1625, AIP Directory 1615, Policy Manager 1617, AIP Service Catalog 1619, ASP Billing 1621, AIP Reporting 1627, Content Management 1629, and SLA Management 1631. Profile Manager 1613, Join Engine 1623 and Meta Directory 1625, AIP Directory 1615, Policy Manager (xPM) 1617, AIP Service Catalog 1619, ASP Billing 1621, AIP Reporting 1627, Content Management 1629, and SLA Management 1631 are controlled by Service Management 1633.

The AIP Service Catalog 1619 aggregates applications and services from multiple sources into bundles that may be subscribed to by their ASPs and delivered to the ASP's customers. The aggregate product catalog enables service providers to leverage more customers by wholesaling or leasing to other service providers than they can address on their own. The Profile Manager 1613 provides generic user, service, device, and security profiles populated to customer hierarchies, service packages, device characteristics, and security characteristics. These profiles may be stored in an LDAP directory and may be populated by using a Meta Directory and Join Engine to pull in corporate data. The Policy Manager 1617 provides rules for managing access control, quality of service delivery based on SLA, service/device dependencies, and presence management. Policy Management is often combined with profile management that is provided by the Profile Manger 1613. Service Management 1633 controls many aspects of service creation, usage and reporting.

The Billing system 1621 generates invoices for aggregation of applications and services to a customer, an ASP, or an AIP, depending upon how the invoices are to be delivered. By way of example, the IASA bills an AIP for services delivered. The AIP may process the bill for itself, its ASPs, and its ASP's customers based on accounts. SLA Management: SLA Management 1631 provides for comparison of application or network events that affect delivery of applications and services to customers based on SLA criteria and the adjustment of billing based on out-of-availability conditions with or without human intervention. This is a specialized instance of the more generalized Policy Manager 1617.

The AIP Reporting system 1627 provides AIP aggregated event, financial, support statistics, and detailed reports via the web or electronic delivery to customers, ASPs, AIPs, support centers (NOC, SOC, WBIC), and IASA. Standard and customized reports may be made available and result in additional revenue to the AIP. Report sources are Event Management, SLA Management, Billing, Application/System/Network Management, and CRM/ERP.

Content Management 1629 provides for authoring, collecting, packaging, configuration managing, deployment, recovery, and serving of different types of content used by corporations and service providers to their customers. Content Management 1629 is may be implemented as standalone COTS integrated with profile and policy management.

In addition, other core services include Event Manager 1635, which is linked to SLA Management 1631, Quality of Service Manager 1637 and Network Management 1639, which is linked to Quality of Service Management 1637, and System Management 1641. Event Management 1635 provides the capability to instrument applications, collect events, classify events, filter/sort/aggregate events, and deliver alarms, statistics, and details to the appropriate consumer of events. Event driven systems, of which AIP is a prime example, use MOM 1605 to deliver events. Also, along with WFM 1607 and RE 1609, Event Management 1635 creates products and routes them to the correct consumers as the result of events. In general, events can be triggered by applications, systems, and network elements, like error conditions, alarms, heartbeats, performance counter statistics, and billable events.

The Environment Management 1643 provides Application/System/Network Management tools, which use events to determine their health and availability. In addition, events may be used to determine the health and availability of applications. These events may be captured in log files or MIBs or by other instrumentation (e.g., SNMP or JMX agents). Events are usually stored for particular amounts of time and then archived and overwritten, as in circular log files. In addition, these events may be filtered and correlated at the network and system level to determine significance.

The Event Manager 1635, the Quality of Service Manager 1637, Network Management 1639, and System Management 1641 are controlled by Environment Management 1643. Further, other core services of the AIP are as follows: Adapter Services 1645, Directory Service 1647, AIP Firewall 1649, IDS 1651, Application Server 1653, CRM 1655 (which controls the Application Server 1653), and VPN Server 1657. This entire array of common core services may be made available to all ASP, ISV, and XSP customers of the AIP, in addition to the optional services elected by individual customers.

The AIP 1601 includes many common services that are used by the ASPs within the same site. The core of the AIP 1601 is the EAI 1611 that includes a MOM 1605, WFM 1607 and RE 1609 that control (business) process execution. Service Management 1633 supplies many common services that are involved in service delivery. For instance, when the Profile Manager 1613 creates and imports a new corporation hierarchy, the data that is needed by any other service is propagated to those services via pub/sub channels on the MOM 1605. Policy Manager 1617 interprets the service delivery means (UA) and the associated security that is needed to satisfy a security request.

The AIP 1601 has a service catalog 1619 that aggregates internal and external services (and rate/revenue sharing plans) that can be resold by any ASP within its domain. Billing 1621 supports collection of billable events, aggregating, rating, taxing and invoice line item preparation for the ASP to bill their customers. Reporting 1627 supports revenue, usage, statistics and problem summarization and detail reports for ASPs, their customer and external service providers (e.g., ISVs). Content Management 1629 builds the content that the ASP content servers use. SLA Management 1631 uses application/system/network events to determine service availability and delivery compliance. SLA Management 1631 feeds automatic bill corrections upon exception.

Environment Management 1643 provides a set of services that are needed to manage the AIP/ASP environments. Event Management 1635 collects and classifies event data, and makes the data available to an ASP billing system 1621 and an ASP reporting system 1627. QoS Management 1637 manages bandwidth, content and priorities in accordance with SLA agreements (as a type of network management). Network Management 1639 monitors, controls network resources and provides events to the SLA Management 1631 and reporting. System Management 1627 monitors, controls system resources, and provides events to SLA Management and Reporting 1631.

Micro Services are services that are delivered through ASPs to their customers, and include Directory Services (Global and Corporate), which may be expanded to include localized directory resources (e.g., closes venue). The AIP 1601 may also include applications that can be used by ASPs and their customers; such applications include CRM 1655 (uses Event Management and Revenue reporting data to show effectiveness of service revenue by ASP/Customer).

VPN 1657 is used to protect Adapter 1645 connections via network facilities 1646, 1648 to other global support systems (e.g., IASA 1650, NOC 1652, WBIC 1654, DE/TB 1656).

AIP Enterprise Application Integration (EAI) 1611 supports automation and integration mechanisms for the following: Message Oriented Middleware (MOM) 1605, Work Flow Management (WFM) 1607, and Rules Engine (RE) 1609. The MOM 1605 provides publish and subscribe, point-to-point, and guaranteed delivery messaging. The WFM 1607 automates business processes, both with manual decision intervention and with rules engine to automate decisions based on events/conditions/actions, including those supported by the AIP Common Services. The Rules Engine (RE) 1609 provides automation of business rules that direct business processes either to manned decisions or automated (event, condition, action) decisions.

Figure 17:
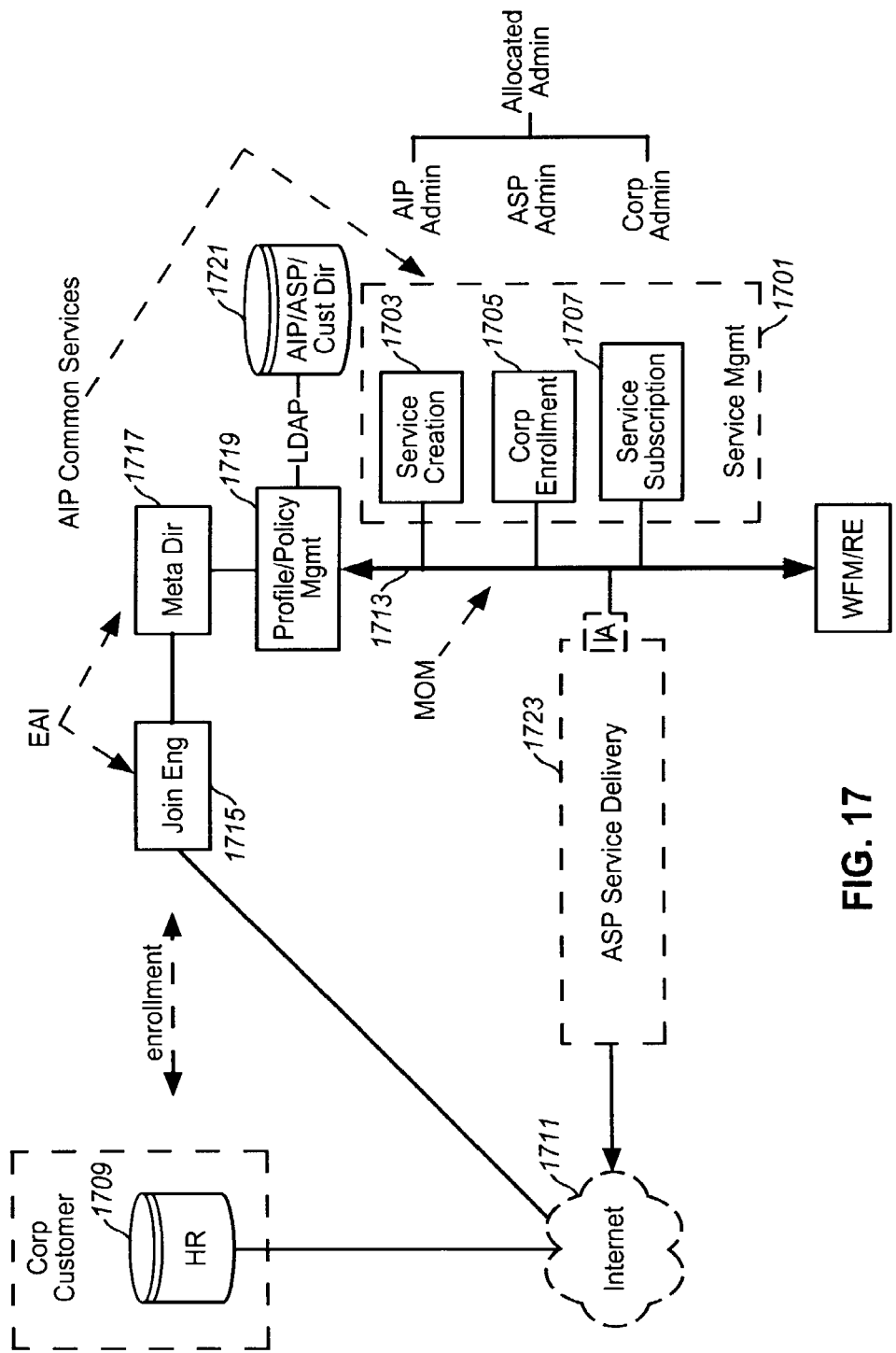
FIG. 17 is a diagram of a service management system employed in an AIP environment, according to an embodiment of the present invention.

FIG. 17 is a diagram of a service management system employed in an AIP environment, according to an embodiment of the present invention. In an exemplary embodiment, a Web Page listing the AIP services is provided by an ASP service delivery system 1723. AIP common services are managed by a Service Management system 1701, which in an exemplary embodiment, supports administration functions at a number of levels: AIP Administration, ASP Administration, and customer (e.g., Corporate) Administration. The Service Management system 1701 controls the entry of new services through a Service Creation component 1703. The Service Management system 1701 also regulates users into the system, establishing appropriate profiles outlining their authorized activities; these functions are provided by an Enrollment component 1705 and a Service Subscription component 1707.

The Services Management system 1701 may access, via MOM 1713, services and data that are provided by the Join Engine 1715, the Meta Directory 1717, Profile and Policy Management 1719, and the AIP/ASP Customer Directory 1721. The Join Engine 1715 is also connected to the Internet 1711, so that the information which it obtains from the Meta Directory 1717, Profile and Policy Management 1719, and the AIP/ASP Customer Directory 1721 are also available via that medium and any VPNs and secure links that the AIP may establish via the Internet 1711. This arrangement permits the Join Engine 1715 and Meta Directory 1717 to perform their conventional functions to access and correlate data.

A customer site may include a Human Resources (HR) database 1709 that is accessible over the Internet 1711. Accordingly, data may be obtained from the HR database 1709 and the AIP/ASP Customer Directory 1721. Enrolling customers are entered into the AIP/ASP Customer Directory 1721, and customers or users who are signing on are checked against that data as well as the appropriate profiles and policy management information via the Join Engine 1715 and the Meta Directory 1717. Users subscribe and customize a profile via the Service Subscription component 1707 and the Profile and Policy Management system 1719. The services selected may combine services from other ASPs, including external ASPs and Development ASPs, such as the ASP 525 previously described in connection with FIG. 6. The subscribed ASP services 1723 may be delivered via the bus 1713 and Internet 1711.

Figure 18:
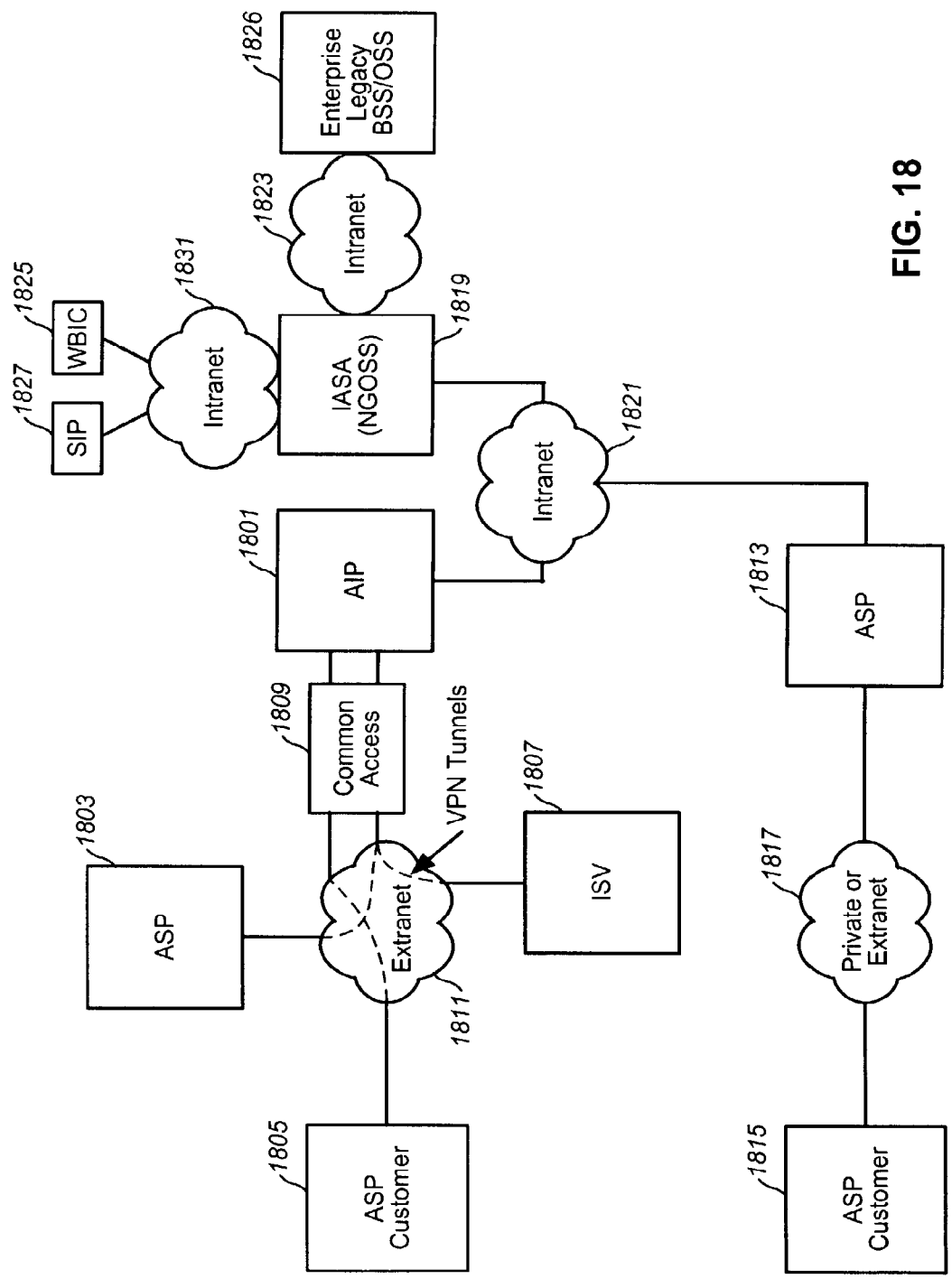
FIG. 18 is a diagram showing the relationship of an Integrated Applications Support Architecture (IASA) with the Proprietor, according to an embodiment of the present invention.

FIG. 18 is a diagram showing the relationship of an Integrated Applications Support Architecture (IASA) with the Proprietor, according to an embodiment of the present invention. A pre-AIP model delivers Proprietor global services to Proprietor customers, while an AIP generation model delivers any service, Proprietor or external service provider (generically referred to as an ASP), to any service provider's customer. The AIP model may be referred to as an ASP delivery model. Both models exist within the Proprietor, but there may be an evolution from the first to the second over time.

The IASA 1819 supports provisioning, billing, and SLA Management of the Proprietor global services in legacy systems, e.g., for circuit or customer premise equipment (CPE). Proprietor global services are any service provided by internal products and services, which are sold and/or supported directly to or by Proprietor.

Referring to FIG. 18, AIP 1801, in an exemplary embodiment, represents the entire logical AIP, which may exist in distributed physical locations. ASP 1803, ASP customers 1805, and ISV 1807 are linked to the AIP 1801 via Extranet 1811 and Common Access 1809. As discussed, the AIP 1801 provides service registration, aggregation and brokering capabilities to other products and services of the Proprietor 1813 and hosted ASPs 1803, as well as common service management capabilities. Such services may be supplied to Proprietor Customers 1815 via Private or Extranet 1817. The AIP 1801 supports resale of any cataloged or registered service to any other service provider for resale to any customer. AIP 1801 is linked to IASA 1819 via Intranet 1821, which also links AIP 1801 to Proprietor 1813. IASA 1819 in turn is linked to Proprietor Enterprise Legacy system 1826 via Intranet 1823.

External customers may communicate with the AIP 1801 via the Internet 1821 over various carriers, for example, through VPN tunnels to ensure customer service delivery privacy. That is, the external service providers employ VPN tunnels, which connect them to the service aggregation capabilities of the AIP 1801. The AIP 1801 supports communications to internal projects (e.g., SIP, IASA, Web Center) over the Proprietor's own secure high-speed backbone the Intranet 1821. IASA 1819 communicates to legacy systems 1826 via an internal network (or Intranet) 1823.

When a new ASP 1813 is moved onto the AIP 1801, their services are registered into a service directory or catalog for resale to other ASPs 1803 and their customers 1805. This allows any ASP 1803, 1813 to leverage any service that is available for resale by customizing branding, billing plans, SLAs (etc) and presentation via an AIP support infrastructure to the selling ASP's customer specific portals. If the ASP 1803 resells a registered or cataloged service, then the revenue is shared (based upon the reseller's agreement) among the original service provider (GDP, ASP or ISV) 1813, the AIP 1801, and the selling ASP 1803.

The IASA also supports provisioning, billing and SLA Management of global services whereas the AIP supports these services for local ASPs. Global services run in the network as network elements and are not localized to AIP/ASP but can be subscribed to by customers through an AIP/ASP. A shared revenue scenario or model is presently described in detail. Therefore AIP 1801, SIP 1827, and WBIC 1825 interface with IASA 1819 to provision, bill and manage global services. SIP 1827 and WBIC 1825 interface with IASA via Intranet 1831. IASA 1819 in turn interfaces with Legacy systems 1826 to provision circuits and CPE.

Figure 19:
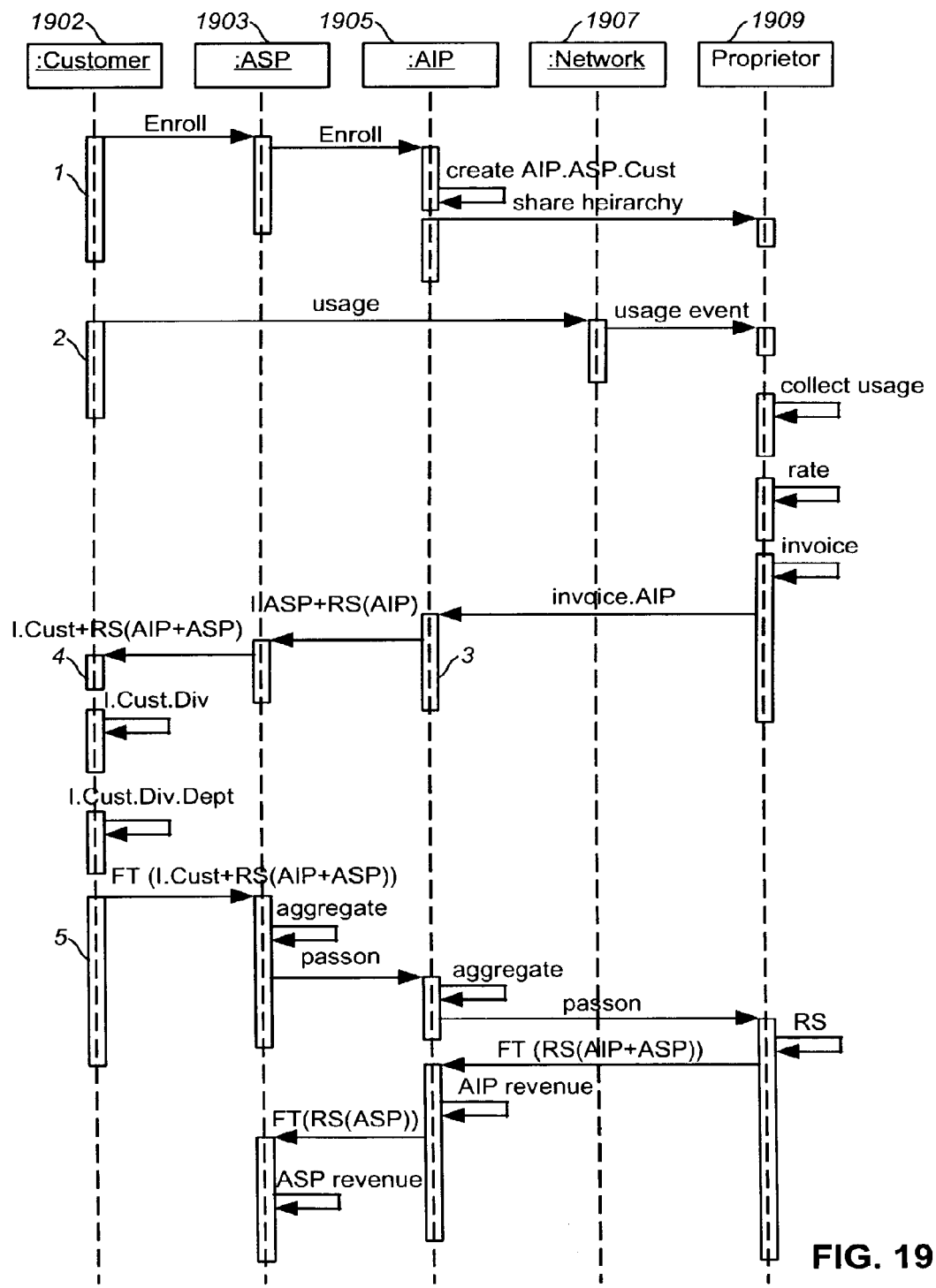
FIG. 19 is an event diagram of a Global Service Shared Revenue scenario, according to an embodiment of the present invention.

FIG. 19 is an event diagram of a Global Service Shared Revenue Scenario, showing the interaction among a customer 1901, an ASP 1903, an AIP 1905, and a Proprietor 1909. In step 1, an ASP 1903 signs on a new Corporate Customer 1901. To accomplish this, the AIP Administrator 1905 creates a new corporate hierarchy in the Profile Management system. This hierarchy is shared with the IASA (over a network 1907 of the Proprietor 1909) to have commonality and to get a Legacy Corporation (Proprietor) ID for the Corporation (if it exists). In step 2, when usage occurs, usage events are generated in the network (e.g., from routers which are instrumented) and reported back to IASA. The IASA aggregates these events, rates them based on pricing/billing plans with the corporate customers.

The invoice, as in step 3, is sent to the AIP 1905, where the invoice items for each service used by an ASP 1903 are aggregated into an ASP's bill. The AIP 1905 adds revenue sharing percentage (and/or flat rate) to the total per service charges being passed on to the ASP 1903 (I.ASP+RS(AIP)). The ASP 1903 adds their revenue sharing percentage and prepares a combined invoice for the customer listing many of the charges for services consumed (I.Cust+RS(AIP+ASP)); this is performed by the AIP 1905. In step 4, the customer receives the invoice and determines charges aggregations at divisions and department levels. Detailed reports may be made available at an ASP URL (as supported by the AIP 1905). In step 5, the Corporate Customer 1901 pays the Proprietor 1907 (e.g., funds transfer), who extracts revenue sharing totals and passes them down to the AIP 1905. The AIP

1905 takes their revenue share and passes the ASP revenue share to the ASP 1903. If Customer Corporation 1901 pays one bill for several corporate sites, the Proprietor can apportion revenue sharing across the correct AIP 1905 and ASP 1903 groups; this information being in the corporate hierarchy record storage.

Figure 20:
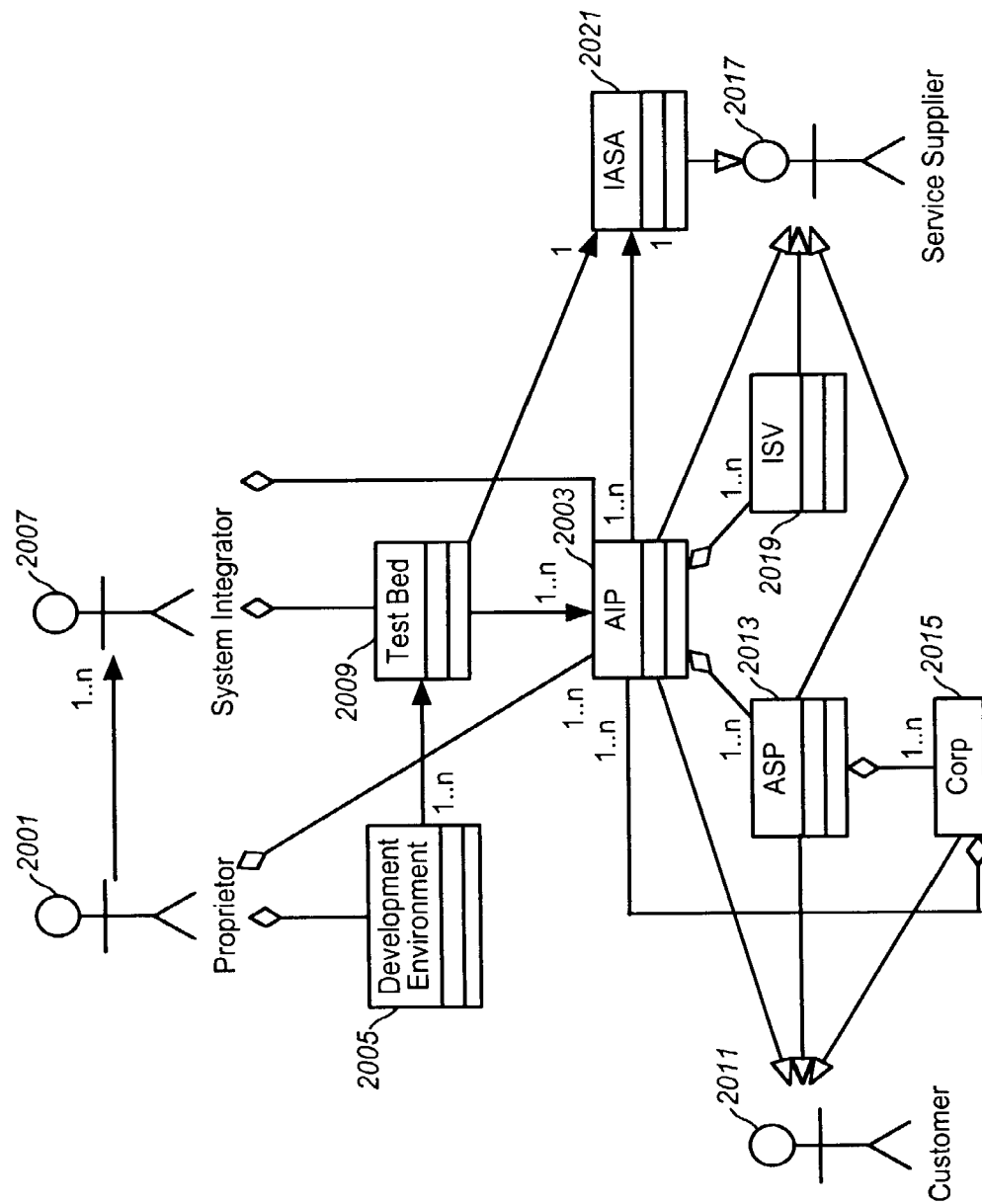
FIG. 20 is a relational diagram of the hierarchy of an AIP, according to an embodiment of the present invention.

FIG. 20 is a relational diagram of the hierarchy of an exemplary AIP, according to an embodiment of the present invention. As shown, a company (e.g., proprietor 2001) may provide one or more AIPs 2003 (shown as 1 . . . n) and a Development Environment 2005 and Test Bed 2009. The Proprietor 2001 is associated with one or more System Integrators (SIs) 2007. The System Integrator 2007 may be associated with none or multiple AIPs 2003. The customer (e.g., corporation) 2015 similarly may support multiple AIPs 2003; alternatively, the customer 2015 need not support any of its own AIPs 2003. As shown, one or more AIPs 2003 are associated with or has one IASA 2021, which is a Service Supplier. Additionally, one AIP has one or more ISVs 2019, which may include a Service Supplier 2017.

One AIP 2003 is a Customer of SI 2007 and/or a Corporation 2015. The AIP 2003 is associated with one or more ASPs 2013, one of which is a Customer 2011 of one or more AIPs 2003. Another ASP 2013 is a Service Supplier 2017 to (one or more) AIPs 2003. One ASP 2013 has one or more Corporate Customers 2015; one Corporation 2015 is a Customer 2011 of one or more ASPs 2013.

Figure 21:
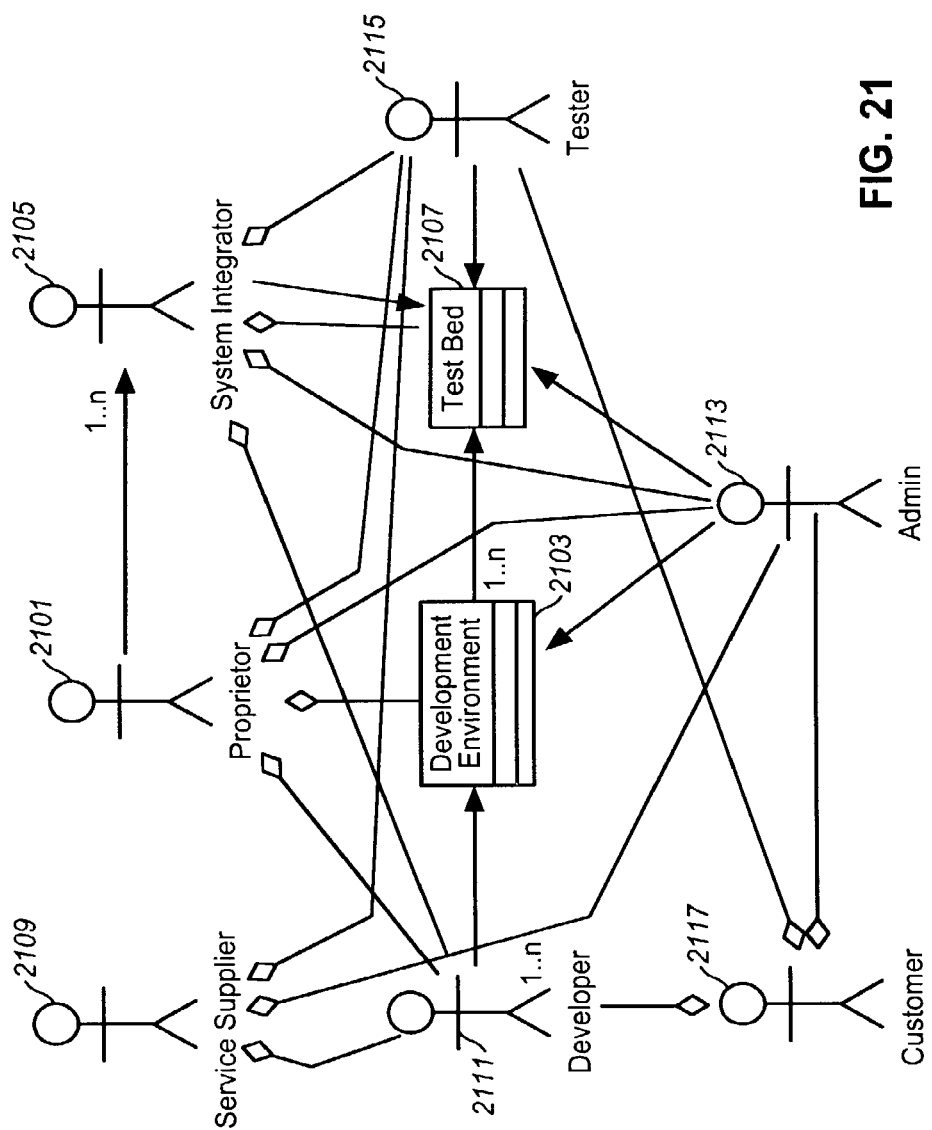
FIG. 21 is a diagram of a Development Environment (DE) and Testbed (TB), according to one embodiment of the present invention.

FIG. 21 provides a diagrammatic representation of Development Environment (DE)/Testbed (TB)/Administrator in DE/TB relationships. A Proprietor or company 2101 has a Development Environment 2103 and is associated with or has one or more SIs 2105. The SI 2105 has a Test Bed 2107, where integration and tests are executed. A Service Supplier 2109 may be an ASP or an ISV. The company 2101 or SI 2105 has one or more Developers 2111 that are associated with the Development Environment 2103. Service Supplier 2109 (e.g., ASP, ISV, the company, or SI) has one or more Testers 2115. Testers 2115 are associated with the Test Bed 2107, Service Supplier 2109 has one or more Administrators 2113. Customer 2117 has one or more Developers 2111, one or more Testers 2115, and one or more Administrators 2113.

Figure 22:
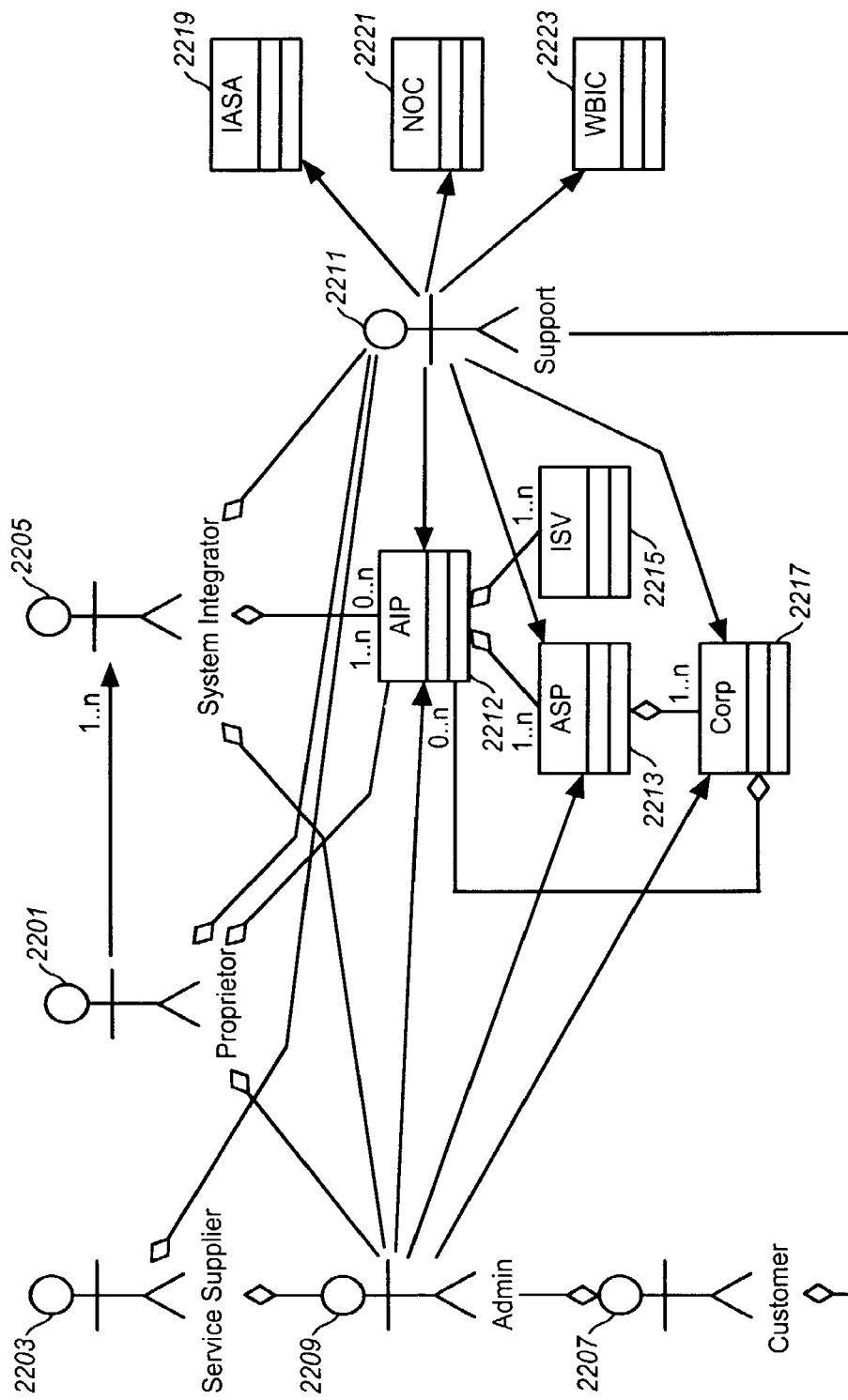
FIG. 22 is a diagram of the operational relationships associated with Administration and Support, according to an embodiment of the present invention.

FIG. 22 is a diagram of the operational relationships associated with Administration and Support, according to an embodiment of the present invention. A Proprietor or company 2201, Service Supplier 2203, SI 2205, Customer 2207 has one or more Administrators 2209 and one or more Support Entities 2211. Allocated Administration 2209 shares responsibilities for different activities. Thus, AIP 2211 has an Administrator 2209 for creating/enrolling a customer (e.g., corporation). An ASP 2213 has an Administrator 2209 to create service packages, and to assign to roles. The Corporate Customer 2217 may also have an Administrator; e.g., self subscription. As with the ASP 2213, an ISV 2215 has a many-to-one relationship with the AIP 2212.

A Support agent 2211 shares responsibilities for different activities of the system integrator 2205, the AIP 2212, the ASP 2213, and the corporate customer 2217. For example, with respect to the customer 2217, the support 2211 may receive problems, filters and passes ASP specific problems through to the ASP 2213. Similarly, in service of the ASP 2213, the Support 2211 assists customers of the ASP 2213 with its services, and filters and passes on AIP-related problems. The Support agent 2211 may communicate with an IASA 2219, a NOC 2221, and/or a WBIC 2223 in carrying out its support functions.

Figure 23:
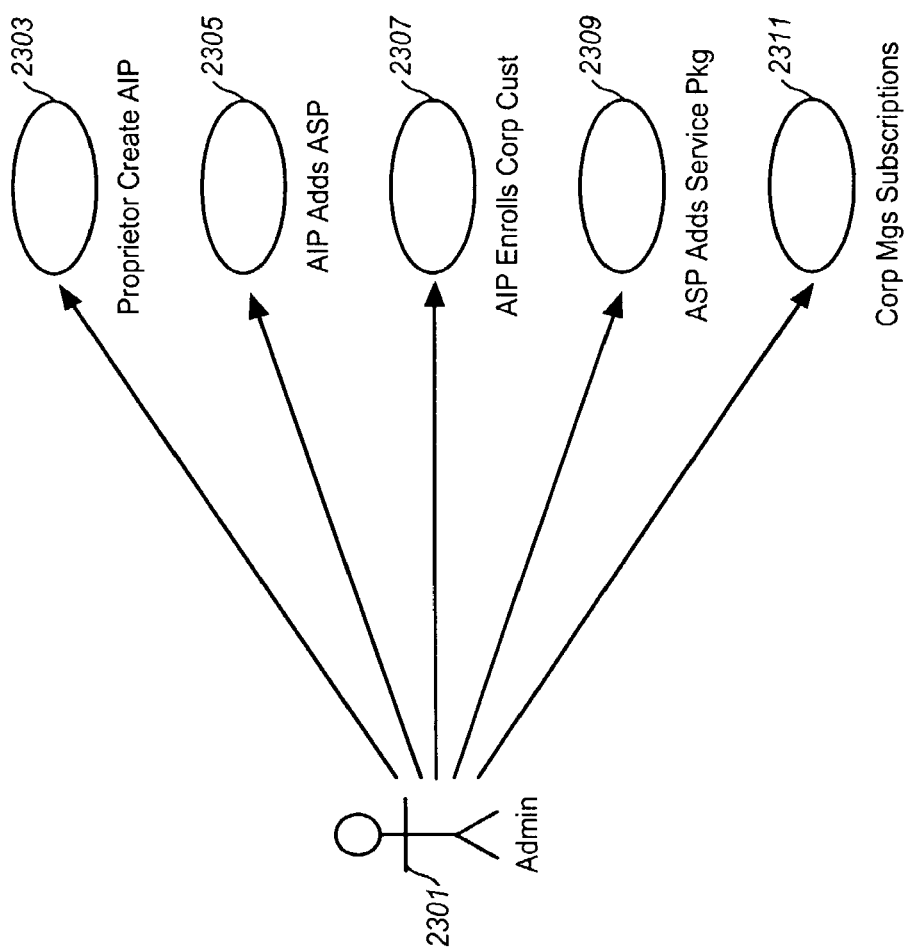
FIG. 23 is a diagram of a process for setting up of an AIP, according to an embodiment of the present invention.

FIG. 23 is a diagram of a process for setting up of an AIP, according to an embodiment of the present invention. The following diagrammatic examples illustrate the actions of the Proprietor Administrator or Administration, AIP Administrator, ASP Administrator, Corporate Administrator, and the Corporate end-users. The AIP five layer business model is evidenced in the way the activities of provisioning AIPs, ASPs, Corporations and end-users are apportioned among the various Administrator staff. FIG. 23 shows the responsibilities of the Administrator, according to one embodiment of the present invention. This figure is a relational flow diagram which provides a simplified diagrammatic illustration of a typical procedure or series of steps in the establishment of a Proprietor operated AIP according to one embodiment of the present invention.

The diagram illustrates the five layer model of Proprietor, AIP, ASP, Corporate Customers, and Users. An Administration agent 2301 controls the actions portrayed by this flow diagram. At 2303, the Proprietor creates an AIP. At 2305 the AIP adds an ASP. The AIP enrolls a Corporate Customer, who will utilize the services of the ASP (at 2307). At 2309, the ASP adds a Service Package selected from the AIP common services. This service package includes the services that the ASP will need in serving the corporate customer.

At 2311, the Corporation manages user subscriptions for the services of the ASP for which the corporation is enrolled and to which the user wishes to subscribe. The user may be any of the users discussed in connection with FIG. 11. One example of a user would be an employee of the corporation, while another would be a customer of the corporation, as described in the process of FIG. 24.

Figure 24:
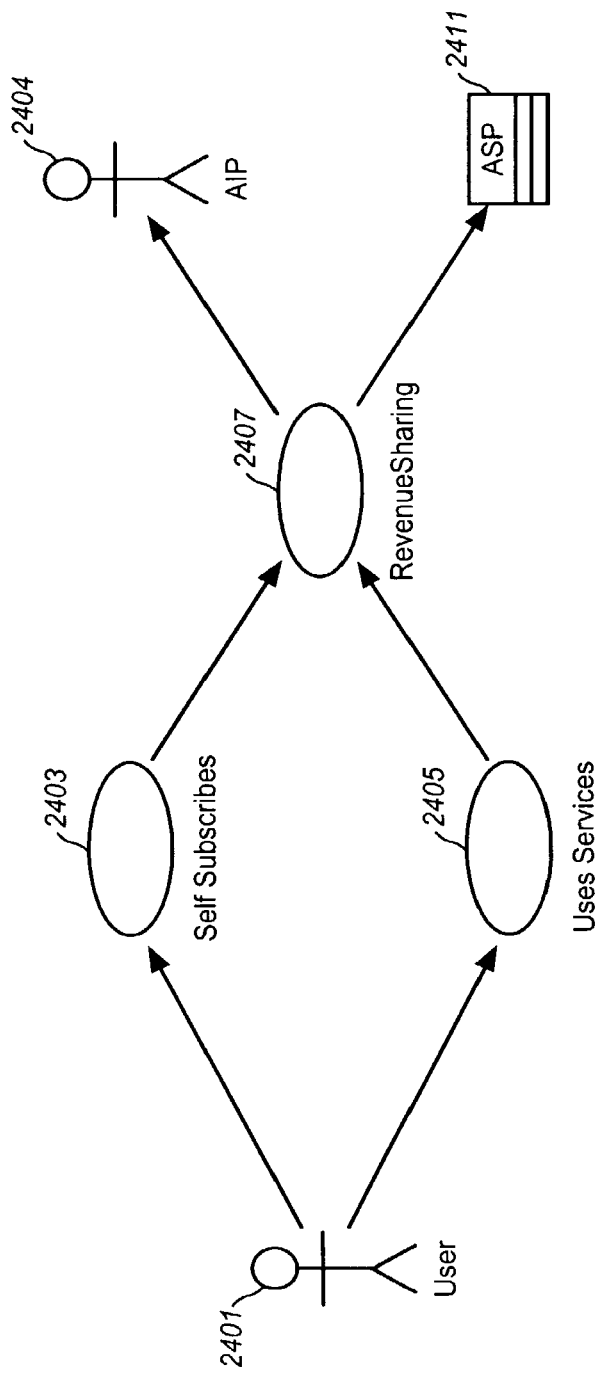
FIG. 24 is a diagram of a self-subscription process and use of AIP services by an end user, according to an embodiment of the present invention.

FIG. 24 is a diagram of a self-subscription process and use of AIP services by an end user, according to an embodiment of the present invention. A User 2401, who is authorized (or classified as a permissible user), may self subscribe at 2403. The user 2401 subscribes for those services of the ASP which the corporation offers for subscription to those which it classifies as permissible users. At 2405, the subscribed User 2401 can proceed to use the services. At 2417, as a subscriber, the User may utilize the services associated with the subscription. Revenues that are derived from this use of the service are shared by the AIP 2409 and the ASP 2411, at 2407.

Figure 25:
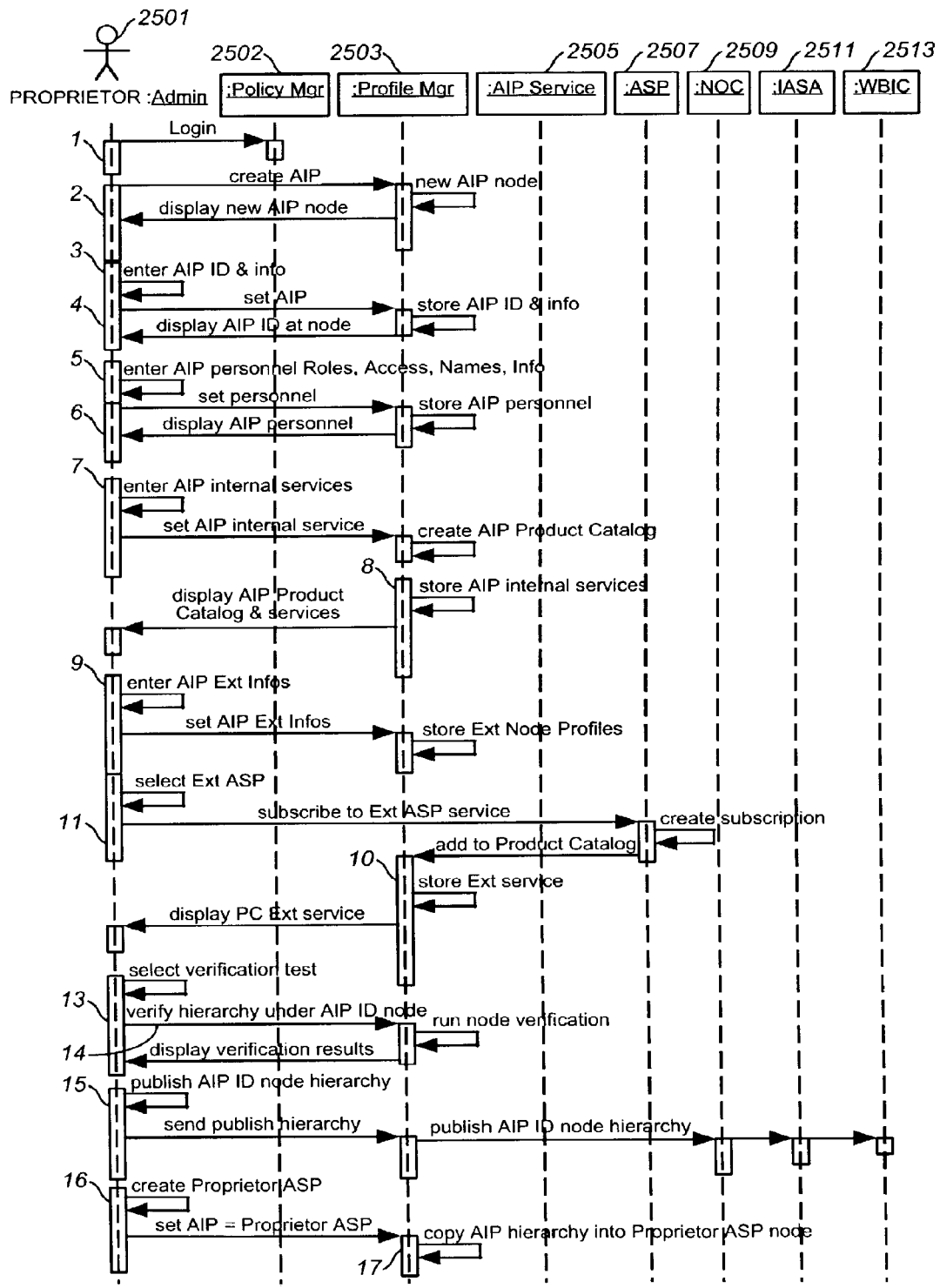
FIG. 25 is an event diagram showing the creation of an AIP, according to an embodiment of the present invention.

FIGS. 25-31 are event diagrams illustrating exemplary AIP operational activities. FIG. 25 is an event diagram showing the creation of an AIP. In this scenario, the agents or elements involved in the process are the Proprietor Administrator 2501, Policy Manager 2502, Profile Manager 2503, AIP Service 2505, ASP 2507, NOC 2509, IASA 2511, and WBIC 2513. In step 1, the company or Proprietor Administrator 2501 logs in and is validated by the Policy Manager 2502. The Proprietor Administrator 2501, as in step 2, invokes the "create AIP" function. Profile Manager 2503 returns the "create AIP" template, whereby exemplary default services and associated parameters are specified. Next, in step 3, the Proprietor Administrator 2501 fills in the template with the new AIP ID and the AIP NODE. Profile Manager 2503 stores the new AIP profile, per step 4. In step 5, the Proprietor Administrator 2501 sets up the company personnel, who will be able to manage the new AIP node. In step 6, the Profile Manger 2503 stores the personnel information in the AIP profile. The Proprietor Administrator 2501, as in step 7, then adds the company internal services to the AIP that the AIP (and its ASPs) can access. Profile Manager 2503 creates an AIP product catalog and stores the services in the product catalog (step 8).

In step 9, the Proprietor Administrator 2501 then enters external interface definitions and information associated with external AIP nodes (i.e., components not maintained by the proprietor). Next, Profile Manager 2503, as in step 10, stores the external interface definitions in the AIP's external node profiles, which enumerate service parameters and preferences corresponding to the particular AIP component. In step 11, the Proprietor Administrator 2501 adds external ASP/ISV services to the AIP. The Proprietor Administrator 2501 selects an external ASP, subscribes to its services, and the ASP 2505 creates the subscription. The Profile Manager 2503, per step 12, enters the subscription to the external services and adds the subscriptions to the AIP product catalog. In step 13, the Proprietor Administrator 2501 then runs a sequence of verification tests to prove that the AIP is fully functional. In step 14, Profile Manager 2503 verifies the hierarchy under the AIP Node profile and displays the verification results. In step 15, Profile Manager 2503 publishes the AIP node Hierarchy to the Network Operations Center (NOC) 2509, IASA 2511, and WBIC 2513. The Proprietor Administrator 2501, as in step 16, may optionally create a company ASP. Because of the five layer AIP business model, having a Proprietor ASP through which the Proprietor can directly offer its services, is desirable. Next, Profile Manager 2503 copies the AIP hierarchy into the Proprietor ASP node, per step 17.

Figure 26:
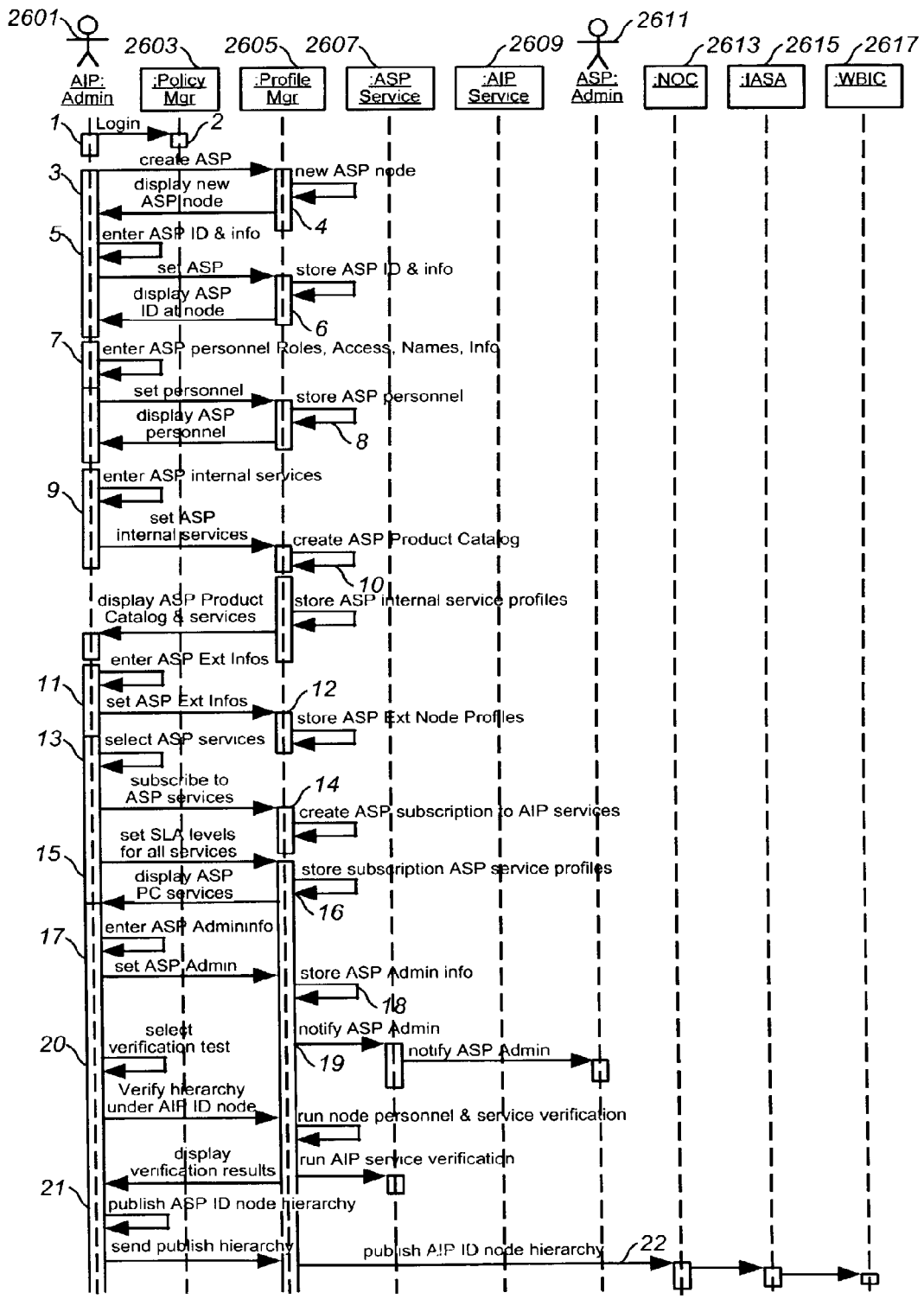
FIG. 26 is an event diagram showing the addition of an ASP to an AIP, according to an embodiment of the present invention.

FIG. 26 is an event diagram showing the addition of an ASP to an AIP. The involved agents are AIP Administrator 2601, Policy Manager 2603, Profile Manager 2605, ASP Service 2607, AIP Service 2609, ASP Administrator 2611, NOC 2613, IASA 2615, and WBIC 2617. In step 1, the AIP Administrator 2601 logs in, which is validated by the Policy Manager 2603 (step 2). In step 3, the AIP Administrator 2601 invokes the "new ASP" profile. In turn, the Profile Manager 2605 displays a "new ASP" template, per step 4. The AIP Administrator 2601, as in step 5, enters the new ASP ID into the template. In step 6, the Profile Manager 2605 stores the ASP ID in a new ASP profile, which is displayed at the node. The AIP Administrator 2601 then enters the AIP personnel who will be managing the new ASP, per step 7. This includes personnel, roles, names, access, and related information. In step 8, the Profile Manager 2605 stores the personnel information in the ASP profile. In step 9, the AIP Administrator 2601 enters and sets the ASP internal services; these are the services that the ASP offers. In step 10, the Profile Manager 2605 creates a product catalog for the ASP and enters the services into the ASP product catalog. The Profile Manager 2605 the ASP internal service profiles and displays the ASPs product catalog and services. The AIP Administrator 2601, as in step 11, enters the information on external interfaces and sets the interfaces. In step 12, the Profile Manager 2605 enters the external interfaces into the ASP's external node profiles. Next, in step 13, the AIP Administrator 2601 selects the AIP services the ASP will use and/or resell.

In step 14, the Profile Manger 2605 subscribes to the AIP services. The AIP Administrator 2601, as in step 15, specifies the details of the Service Level Agreements (SLA) agreed by the AIP and the ASP. In step 16, the Profile Manager 2605 adds the SLA to the Subscription Profiles. In step 17, the AIP Administrator 2601 adds the ASP Administrator personnel to the ASP. The Profile Manager 2605 updates the ASP profile with the ASP Administrator personnel, per step 18. In step 19, the AIP Administrator 2601 notifies the ASP Administrator 2611 that the ASP is ready to test; the notification may occur though an AIP service. In step 20, the AIP Administrator 2601 and ASP Administrator 2611 jointly run a sequence of verification tests. Upon completion of the tests, the AIP Administrator publishes the ASP node hierarchy to NOC 2613, IASA 2615, and WBIC 2617, per step 21. In step 22, the Profile Manager distributes the ASP node hierarchy to NOC, IASA, and WBIC.

Figure 27:
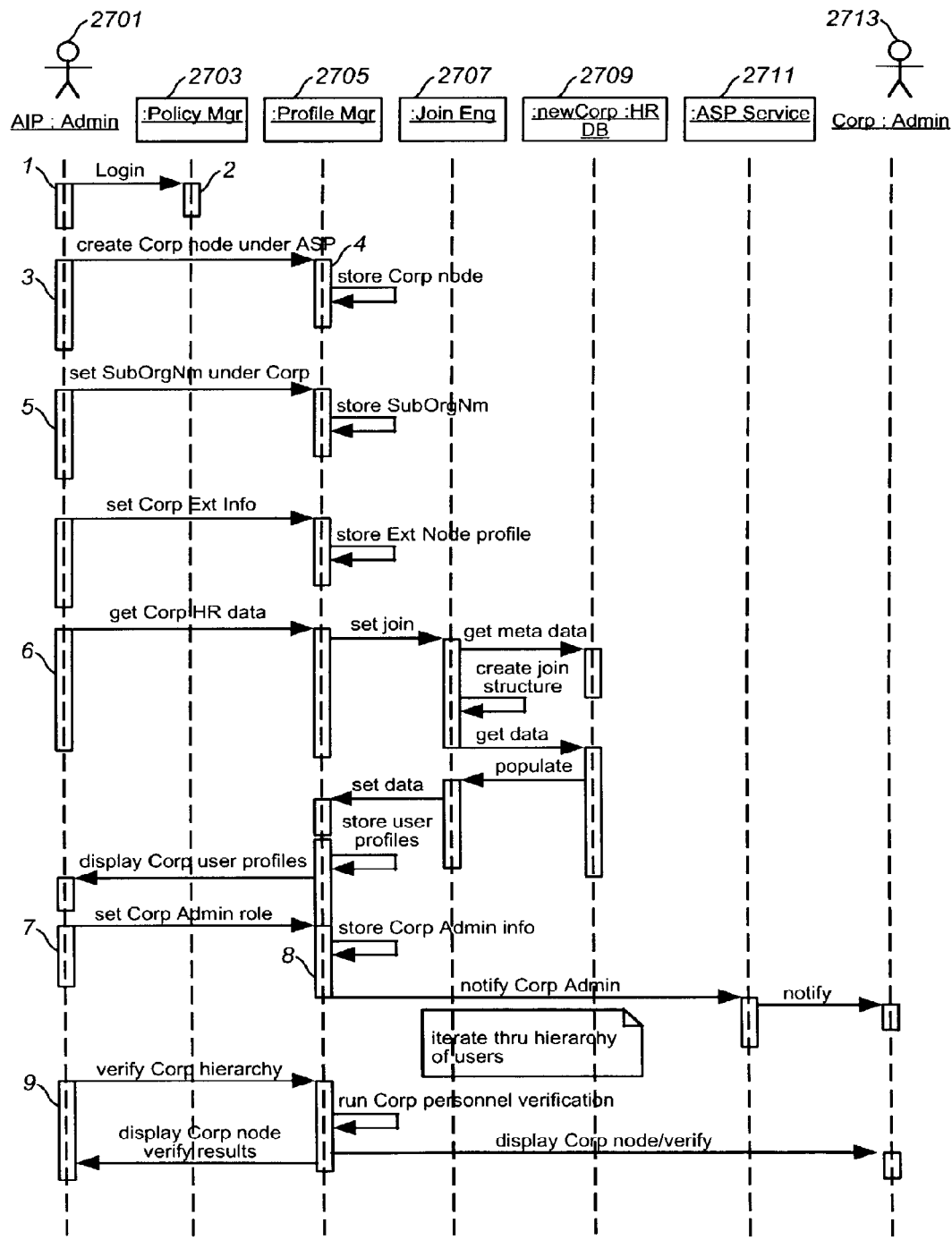
FIG. 27 is an event diagram showing the enrollment of a customer, according to an embodiment of the present invention.

FIG. 27 is an event diagram showing the enrollment of a Corporate Customer. Under this scenario, the involved agents are AIP Administrator 2701, Policy Manager 2703, Profile Manager 2705, Join Engine 2707, new Corporate Customer Human Resources (HR) database 2709, ASP Service 2711, and Corporate Administrator 2713. Each time an ASP "signs up" (or enrolls) a new customer, that customer can be provisioned into the supporting ASP's profile. Once the ASP's customer has a profile the ASP can manage the Customer. In step 1, the AIP Administrator 2701 logs in. The Policy Manager 2703 validates the login, per step 2. In step 3, the AIP Administrator 2701 creates a new Corporation Node under the ASP node. At this point, the Profile Manager 2705 adds the Corporation Node under the ASP profile, per step 4. In step 5, the AIP Administrator 2701 populates the ASP with the Corporation's employee data. In step 6, the Profile Manager 2705 retrieves meta-data from the Corporations Human Relations database, and creates a join structure with the Corporate Profile and then extracts the employee data from the Corporate HR database and populates the join structure. User profiles are created for each employee and stored.

In step 7, the AIP Administrator 2701 then modifies profiles of the Corporate Employees to include the role of Corporate Administration. The Profile Manager 2705, as in step 8, stores the modified employee profiles. In step 9, the AIP and Corporate Administrator verify the Employee profiles and the corporate hierarchy.

Figure 28:
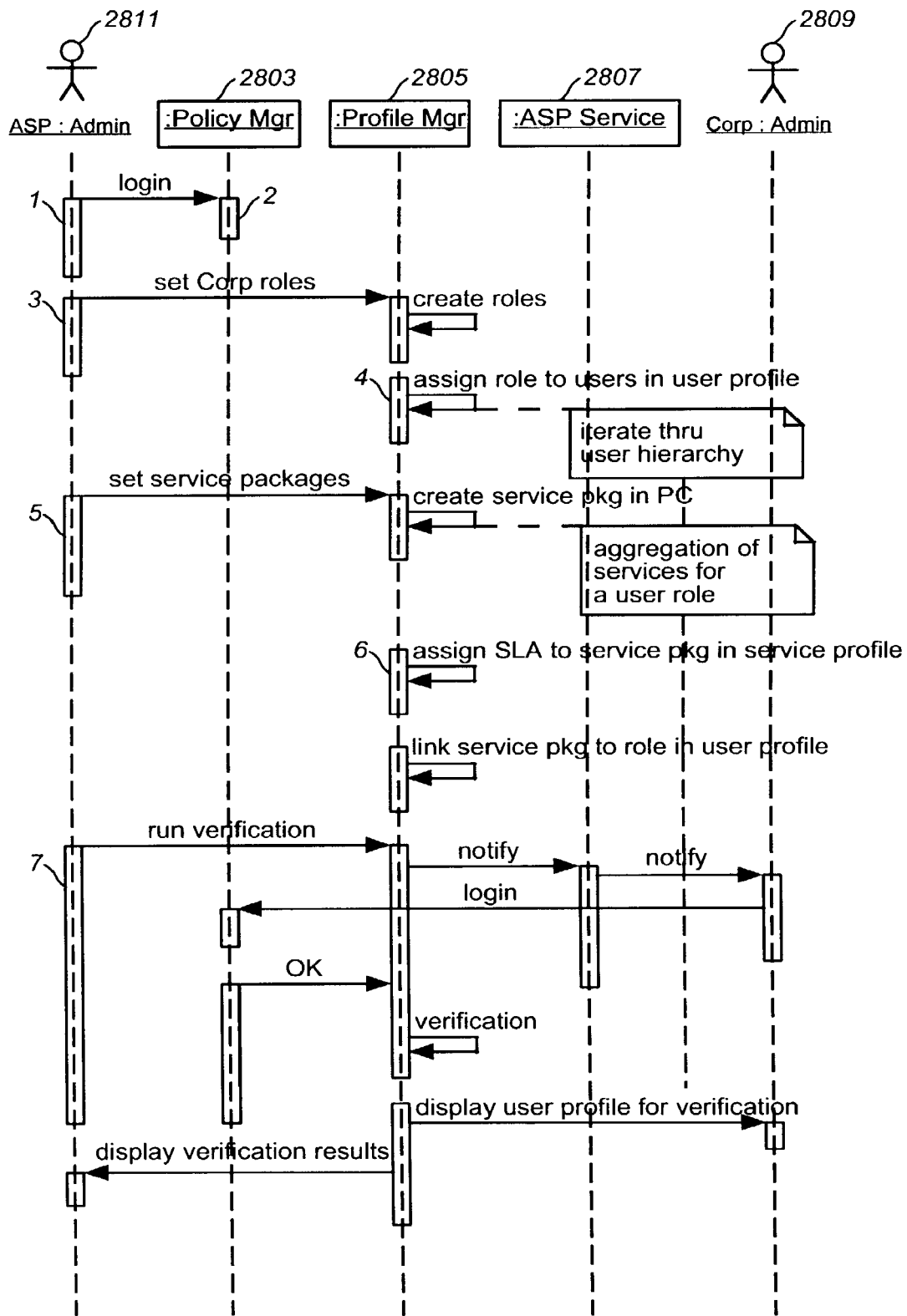
FIG. 28 is an event diagram showing an ASP adding service packs to a corporate portal, according to an embodiment of the present invention.

FIG. 28 is an event diagram showing an ASP adding service packs to a corporate portal. In this example, an ASP Administrator 2801 logs on, per step 1; the login is validated by a Policy Manager 2803 (step 2). In step 3, the ASP Administrator 2801 creates role definitions for the corporation. Next, in step 4, the Profile Manager 2803 creates the rolls and assigns specific users to the roles. This is iterated through the user hierarchy. In step 5, the ASP Administrator 2801 defines the service packages. Next, Profile Manager 2805, as in step 6, creates a service package, which is an aggregation of services for a user role, assigns the SLA terms and conditions to the service, and links the service package to roles in the user profile. Each user can access a set of services based on roles. In step 7, the ASP Administrator 2801 runs a sequence of verification tests and, together with the Corporate Administrator 2809, validates a selection of user roles.

Figure 29:
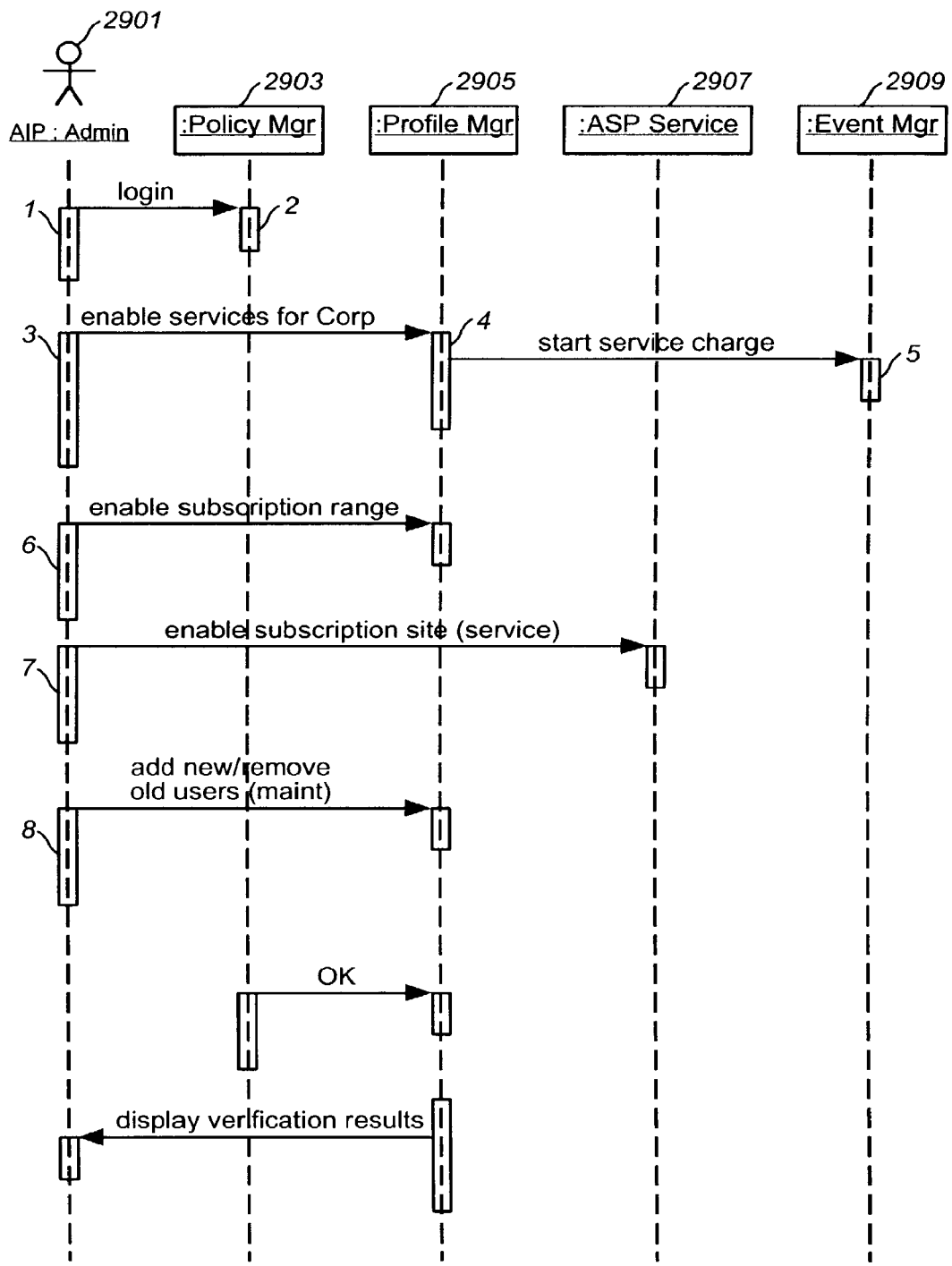
FIG. 29 is an event diagram showing a customer capable of managing user subscription, according to an embodiment of the present invention.

FIG. 29 is an event diagram showing a customer capable of managing user subscription—e.g., a Corporate Customer Managing Employee Subscription. In this process, the involved agents are ASP Administrator 2901, Policy Manager 2903, Profile Manager 2905, ASP Service 2907, and Event Manager 2909. In steps 1 and 2, the ASP Administrator 2901 logs on, which is validated by the Policy Manager 2903. In step 3, the ASP Administrator 2901 enables services for a corporation. The Profile Manager 2905, as in step 4, enables the services, starts the service charge, and generates an event. In step 5, the Event Manager 2909 receives the event and enables billing for services to the corporation. In step 6, the ASP Administrator 2901 enables a range of employees to be able to subscribe to services. This is representative of a phased enrollment in which groups of employees are allowed to subscribe on a time-phased schedule.

In step 7, the ASP Administrator 2901 enables some services by site. Next, the ASP Administrator 2901, as in step 8, performs some routine administrative duties such as adding new end-users and deleting those who have left the corporation.

Figure 30:
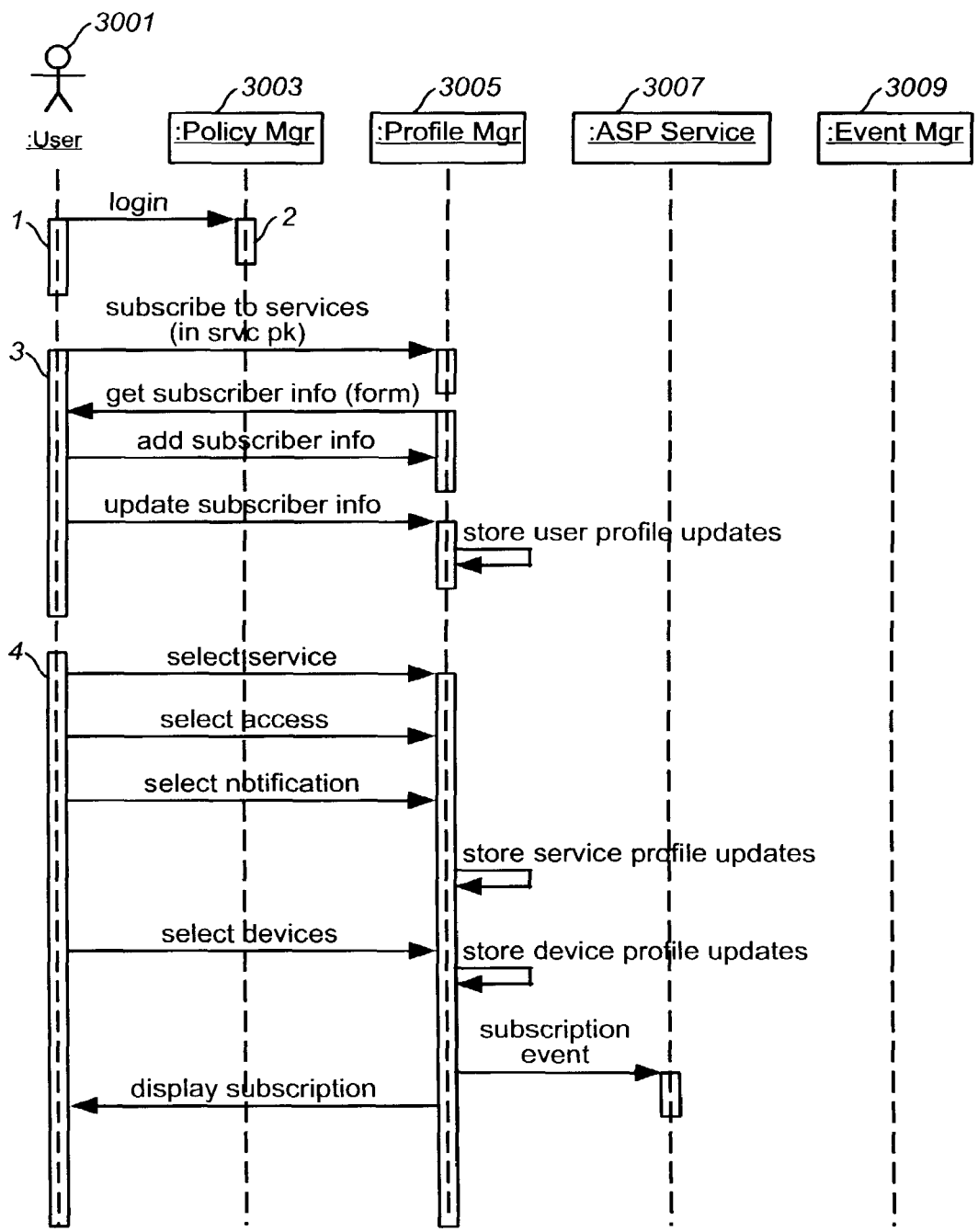
FIG. 30 is an event diagram showing a process in which a customer enables users to self-subscribe, according to an embodiment of the present invention.

FIG. 30 is an event diagram showing a process in which a customer enables users to self-subscribe. In this example, the customer is a Corporate Customer and provides its employees with the capability to perform self-subscription. The login process, as in steps 1 and 2, involves an End User 3001 logging in, and a Policy Manager 3003 validating the login. In step 3, the End User 3001 submits requests to subscribe to services to a Profile Manager 3005, which in turn obtains the subscriber information by way of a form and stores the updated User profile. In step 4, the End User 3001 selects the services, access, notification, and devices; this information is added to an End User Profile by the Profile Manager 3005, triggering a subscription event (per step 5). In step 6, the Event Manager 3009 receives the event and enables billing based on the services selected.

Figure 31:
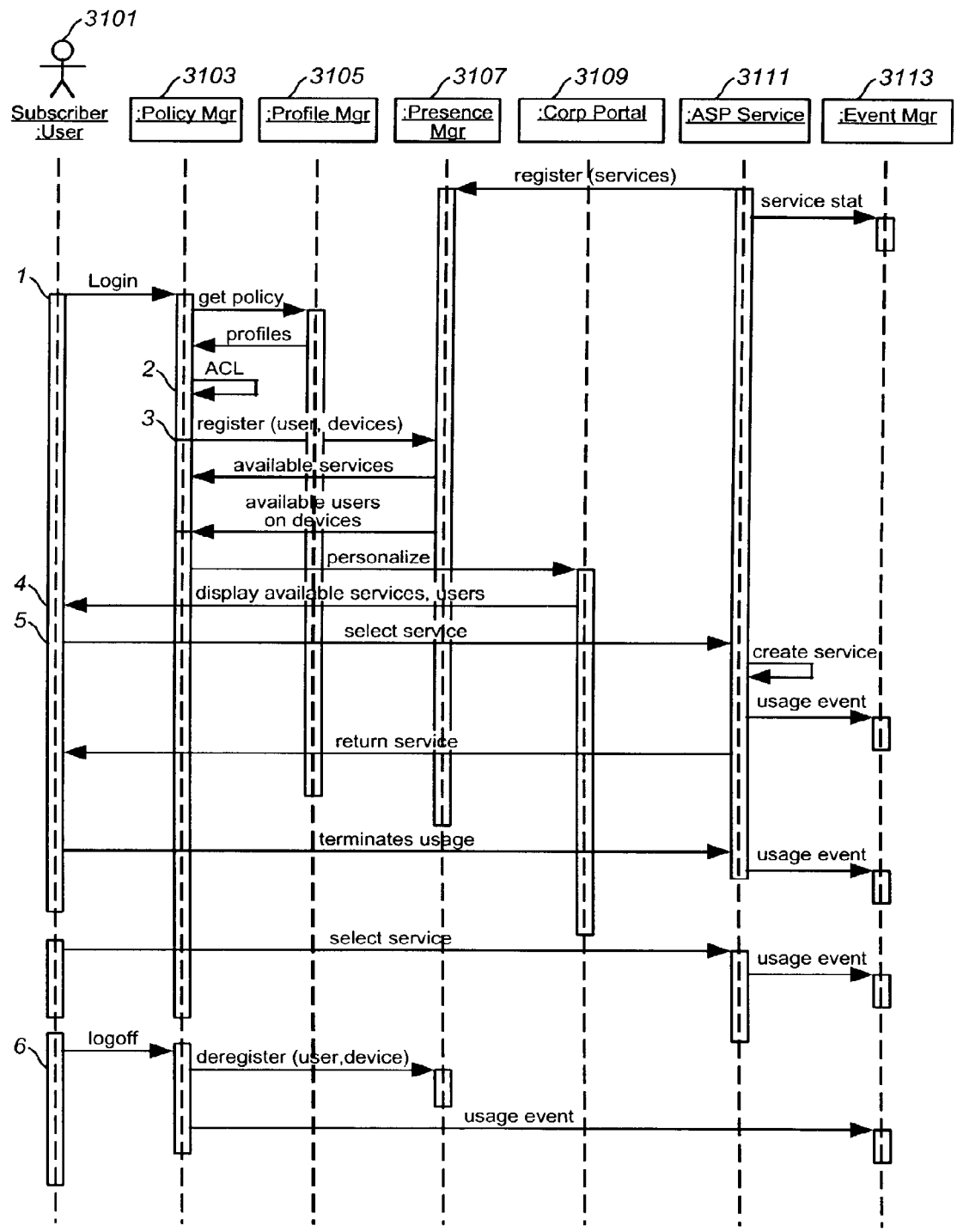
FIG. 31 is an event diagram showing an end user accessing a service, according to an embodiment of the present invention.

FIG. 31 is an event diagram showing an End User Accessing a Service. As with the previous processes, a Subscriber/End User 3101 logs in, per step 1. In step 2, a Policy Manager 3103 validates user using the Profile Manager 3105 to get the user's profile. In step 3, the user and devices used are then registered with the Presence Manager 3107. This records that the user is present and is available on at least one device. The device characteristics which the user is using are also recorded. The Policy Manager 3103, as in step 4, displays the services that the user can access via Corporate Portal 3109. In step 5, the End User selects a service. The ASP Service 3111 creates a service usage event and sends the event to the Event Manager 3113 for the purpose of generating usage, billing and SLA compliance data. ASP Service 3111 returns the service.

In step 6, the End User 3101 terminates the service and ASP Service 3111 sends a usage event to Event Manager 3113. End User 3101 selects the service, and ASP Service 3111 sends a usage event to the Event Manager 3113. Next, the End User logs off, per step 7. The Policy Manager 3103 de-registers the user and the user's device from the Presence Manager 3109. The Policy Manager 3103 also sends a logoff event to the Event Manager 3113.

Accordingly it is seen that one embodiment of the present invention provides an AIP, and provides an AIP associated with a Proprietor environment, and that these supply and meet the need for a vehicle to enable more efficient use of available capabilities and expertise and, at the same time, effectively provide a wide variety of selectable capabilities and services of a dynamic and scalable nature. The economic and technical burdens of independent ASPs are reduced, while at the same time enabling the ASPs to offer services and technologies which would heretofore have been beyond their capabilities. In addition, future growth, improvement, and enhancement are built-in with continuing benefits to the Proprietor, ASPs, XSPs, and their respective clienteles.

While the present invention has been described in connection with a number of embodiments and implementations, the present invention is not so limited but covers various obvious modifications and equivalent arrangements, which fall within the purview of the appended claims.

What is claimed is:

1. A method comprising:
    aggregating a plurality of services of, respectively, a plurality of application service provider systems that are operated by at least two or more different operators; and
    providing access, via a common infrastructure, to the services to one or more subscribers associated with the operators;
    wherein said common infrastructure is supported with common infrastructure storage of application service provider and common infrastructure data including product catalogs for presentation and management of application service provider products;
    wherein said product catalogs include applications provided to said application service providers from said common infrastructure and additional applications from said common infrastructure for offering to new application service providers.

2. A method according to claim 1, wherein the common infrastructure includes an application infrastructure platform, operated by a comprehensive service provider, to perform the aggregation, the method further comprising:
    further aggregating the services with a service of the comprehensive service provider.

3. A method according to claim 1, further comprising:
    creating a profile associated with the application infrastructure platform, wherein the profile specifies identity of the application infrastructure platform.

4. A method according to claim 1, further comprising:
    testing a new service for inclusion to the plurality of services provided to the one or more subscribers.

5. A method according to claim 1, further comprising:
    presenting one or more portals to provide the access to the services by the one or more subscribers.

6. A method according to claim 1, wherein the common infrastructure further includes an enrollment and subscription system, a work flow management system, a rules engine system, a subscriber rules management system, a profile management system, a service management system, an access system, or a combination thereof.

7. A method according to claim 6, wherein the rules of the work flow management system are defined centrally and stored in the rules engine system.

8. A method according to claim 6, wherein the access system is configured to provide either firewalling, load balancing, web proxying, caching, network address translation (NAT), security proxying, virtual private networking, or a combination thereof.

9. A method according to claim 1, further comprising:
    tracking use of one of the services by one of the subscribers; and
    accounting for usage of the tracked service to compensate the operator associated with the tracked service.

10. A method according to claim 1, wherein the services are offered as a product catalog to the one or more subscribers, the method further comprising:
    creating a new service for inclusion into the product catalog.

11. A system comprising:
    a common infrastructure configured to aggregate a plurality of services of, respectively, a plurality of application service provider systems that are operated by at least two or more different operators,
    wherein the common infrastructure is further configured to provide access to the services to one or more subscribers associated with the operators;
    wherein said common infrastructure is supported with common infrastructure storage of services and data including product catalogs for presentation and management of application service provider products;
    wherein said product catalogs include applications provided to the application service provider systems from said common infrastructure and additional applications from said common infrastructure for offering to new application service provider systems.

12. A system according to claim 11, wherein the common infrastructure includes an application infrastructure platform, operated by a comprehensive service provider, to perform the aggregation, the application infrastructure platform being configured to further aggregate the services with a service of the comprehensive service provider.

13. A system according to claim 11, wherein the application infrastructure platform is further configured to create a profile associated with the application infrastructure platform, wherein the profile specifies identity of the application infrastructure platform.

14. A system according to claim 11, wherein the application infrastructure platform is further configured to test a new service for inclusion to the plurality of services provided to the one or more subscribers.

15. A system according to claim 11, further comprising:

one or more portals configured to provide the access to the services by the one or more subscribers.

16. A system according to claim 11, wherein the common infrastructure further includes an enrollment and subscription system, a work flow management system, a rules engine system, a subscriber rules management system, a profile management system, a service management system, an access system, or a combination thereof.

17. A system according to claim 16, wherein the rules of the work flow management system are defined centrally and stored in the rules engine system.

18. A system according to claim 16, wherein the access system is configured to provide either firewalling, load balancing, web proxying, caching, network address translation (NAT), security proxying, virtual private networking, or a combination thereof.

19. A system according to claim 11, wherein the application infrastructure platform is further configured to track use of one of the services by one of the subscribers, and to account for usage of the tracked service to compensate the operator associated with the tracked service.

20. A system according to claim 11, wherein the services are offered in the product catalog to the one or more subscribers, the application infrastructure platform being further configured to create a new service for inclusion into the product catalog.

* * * * *